(12) United States Patent
Sasabayashi et al.

(10) Patent No.: US 7,910,924 B2
(45) Date of Patent: Mar. 22, 2011

(54) LIQUID CRYSTAL DISPLAY APPARATUS AND MANUFACTURING METHOD THEREFOR

(75) Inventors: Takashi Sasabayashi, Kawasaki (JP); Arihiro Takeda, Kawasaki (JP); Yoshio Koike, Kawasaki (JP); Takahiro Sasaki, Kawasaki (JP); Hidefumi Yoshida, Kawasaki (JP); Kazutaka Hanaoka, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 388 days.

(21) Appl. No.: 11/712,695

(22) Filed: Mar. 1, 2007

(65) Prior Publication Data
US 2007/0152221 A1 Jul. 5, 2007

Related U.S. Application Data

(62) Division of application No. 10/803,811, filed on Mar. 18, 2004, now Pat. No. 7,253,438.

(30) Foreign Application Priority Data

Mar. 20, 2003 (JP) .................................. 2003-76704
Mar. 31, 2003 (JP) .................................. 2003-96216
Mar. 31, 2003 (JP) .................................. 2003-97076

(51) Int. Cl.
H01L 29/04 (2006.01)
(52) U.S. Cl. ............... 257/59; 257/40; 257/49; 349/129
(58) Field of Classification Search ............ 257/40, 257/59, 49; 349/129
See application file for complete search history.

(56) References Cited

U.S. PATENT DOCUMENTS

| | | | |
|---|---|---|---|
| 5,539,547 A | 7/1996 | Ishii et al. | |
| 5,579,140 A | 11/1996 | Yamahara et al. | |
| 5,643,471 A * | 7/1997 | Onishi et al. | 216/23 |
| 5,729,312 A * | 3/1998 | Yamagishi et al. | 349/86 |
| 5,854,616 A * | 12/1998 | Ota et al. | 345/100 |
| 6,081,315 A | 6/2000 | Matsuyama | |
| 6,097,464 A | 8/2000 | Liu | |
| 7,253,438 B2 | 8/2007 | Sasabayashi et al. | |

FOREIGN PATENT DOCUMENTS

| | | |
|---|---|---|
| JP | 07-043689 | 2/1995 |
| JP | 07-084244 | 3/1995 |
| JP | 09-146068 | 6/1997 |
| JP | 10-147783 | 6/1998 |
| JP | 11-95221 | 4/1999 |
| JP | 2947350 | 7/1999 |
| JP | 11-271740 | 10/1999 |
| JP | 11-326927 | 11/1999 |
| JP | 11-343486 | 12/1999 |
| KR | 0130882 | 4/1998 |
| KR | 1998-015423 | 5/1998 |
| KR | 0166109 | 3/1999 |

* cited by examiner

*Primary Examiner* — Thinh T Nguyen
(74) *Attorney, Agent, or Firm* — Greer, Burns & Crain, Ltd.

(57) ABSTRACT

A liquid crystal apparatus is provided wherein the liquid crystal layer comprises a section formed by polymerizing a polymerizable compound in the presence of a liquid crystal by selectively irradiating active energy rays onto the substrate surface when no voltage is applied, or alignment control layers and bumps are formed by polymerizing a polymerizable compound which is added to said liquid crystal, or first electrodes with a vertical alignment control film and a second electrode with a horizontal alignment control film face each other and alignment control of the liquid crystal is performed by irradiating light from a direction tilted from the normal line direction on said liquid crystal display apparatus. A liquid crystal display apparatus which can implement high transmittance, high-speed response and a wide viewing angle can be provided.

3 Claims, 40 Drawing Sheets
(7 of 40 Drawing Sheet(s) Filed in Color)

OFF

ON

MVA PANEL

IPS PANEL

ABSORPOTION AXES OF POLARIGING ELEMENTS

100um

FIG. 15
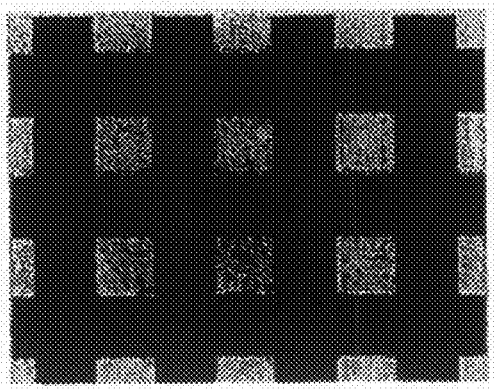
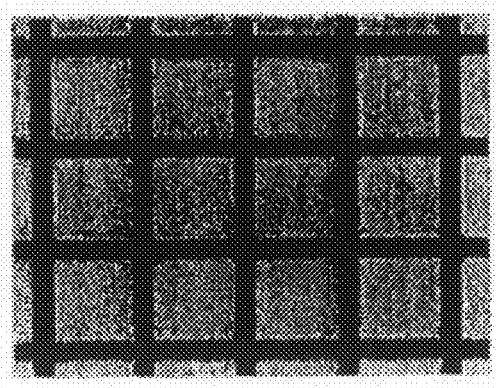
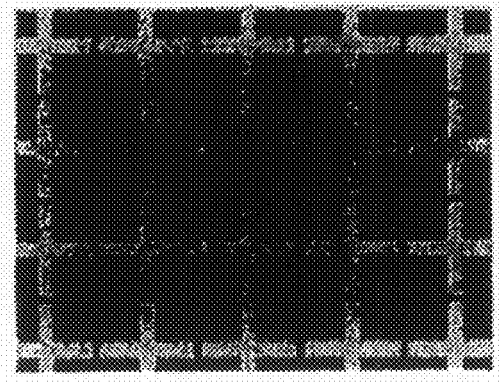
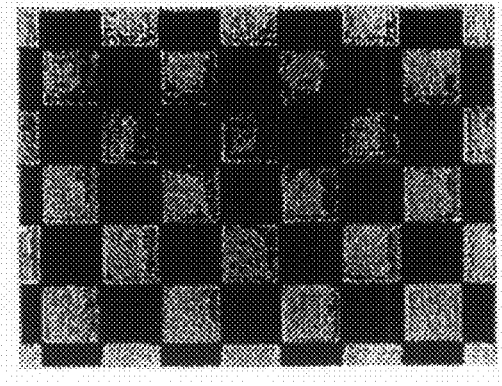

A: A GROUP SHOWING VERTICAL ALIGNMENT
B: A GROUP NOT SHOWING VERTICAL ALIGNMENT

FIG. 35A
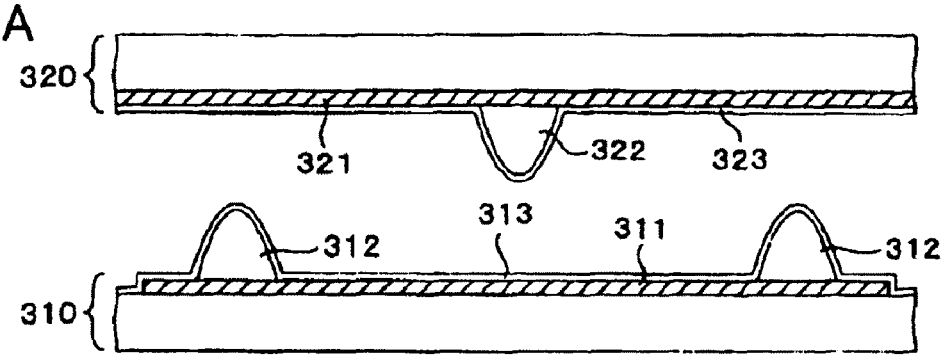
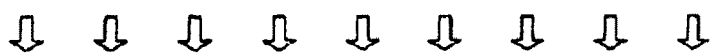
UV RAYS
FIG. 35B
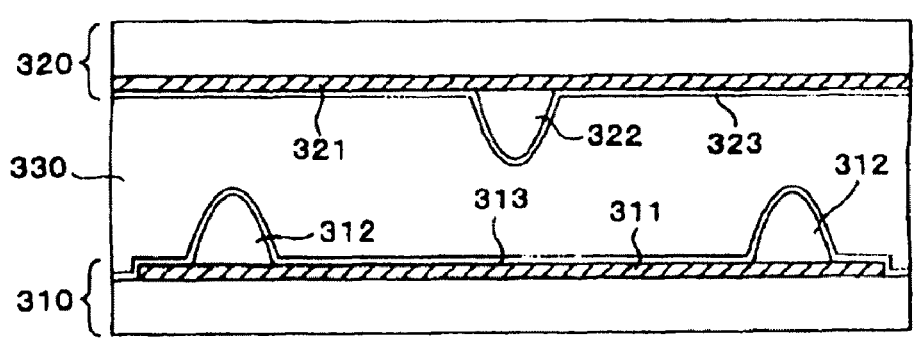

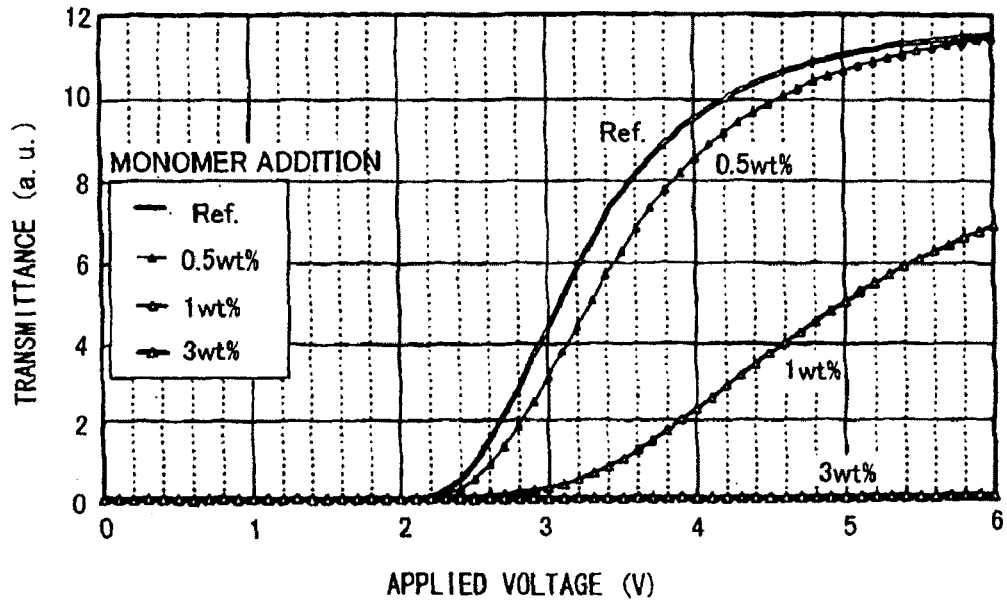
FIG. 36 ADDITION OF BIFUNCTIONAL MONONER
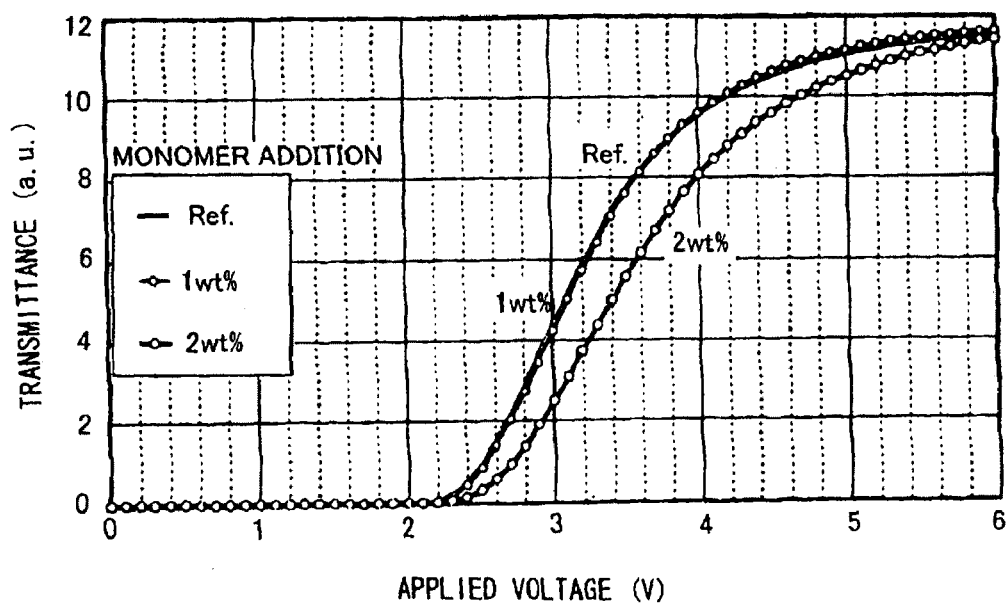
FIG. 37 ADDITION OF MONOFUNCTIONAL MONONER

FIG. 38

F010702(2wt%) 0V-cure 4000mJ/cm2

PROPAGATION MODE AND HIGH RESPONSE RATE

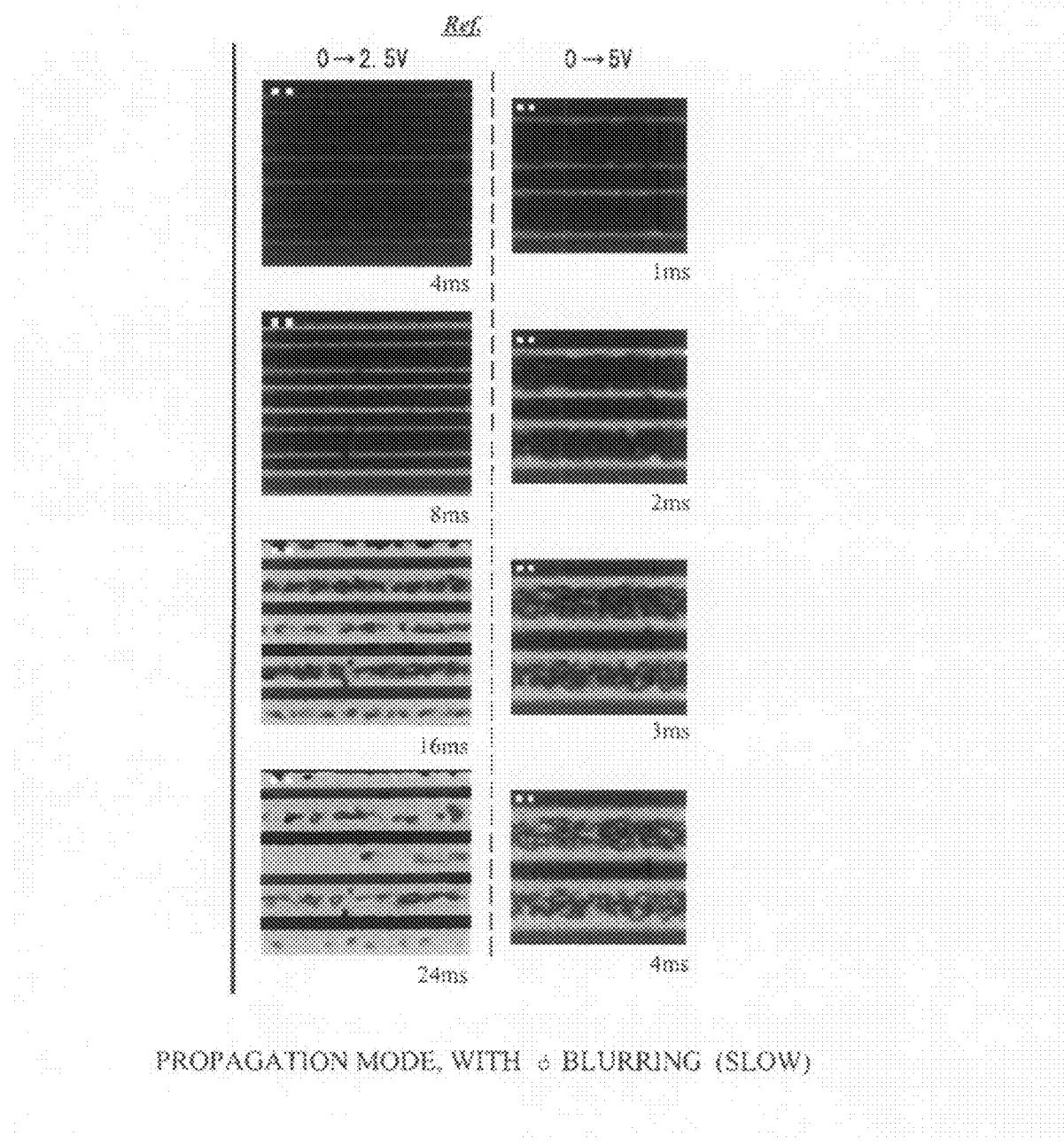
FIG. 39 COMPARATIVE EXAMPLE:
LIQUID CRYSTAL DISPLAY APPARATUS WHEREIN NO POLYMERIZABLE COMPONENT IS ADDED TO THE LIQUID CRYSTAL.
PROPAGATION MODE, WITH BLURRING (SLOW)

FIG. 40 CONVENTIONAL EXAMPLE:
LIQUID CRYSTAL DISPLAY APPARATUS WHEREIN
POLYMERIZABLE COMPONENT ADDED TO THE LIQUID CRYSTAL
WAS POLYMERIZED WHEN VOLTAGE WAS APPLIED

RM84 (5wt%) 5V 4000mJ/cm2

PROPAGATION MODE, WITH ɸ BLURRING (SLOW)

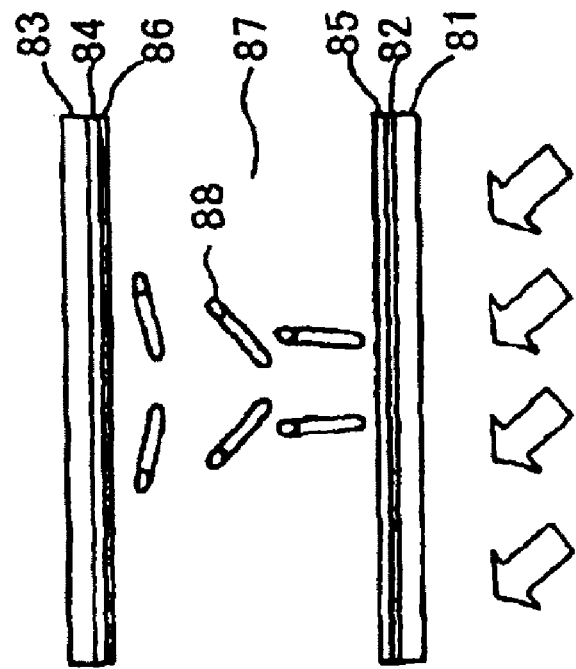
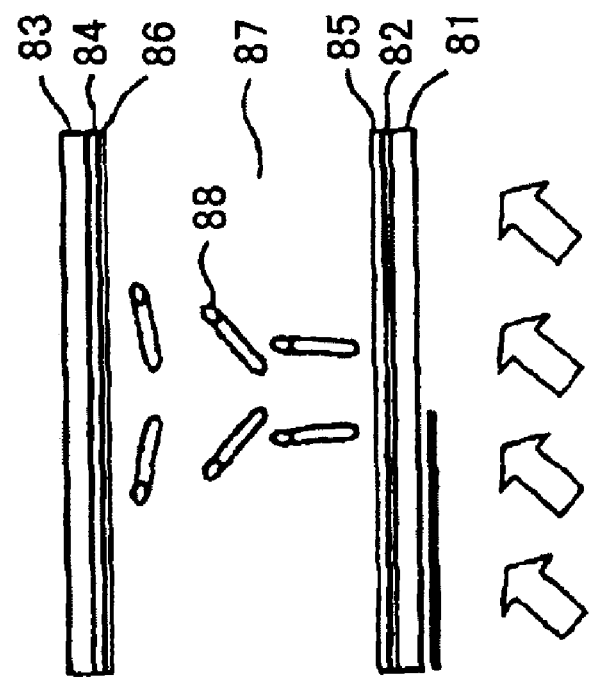

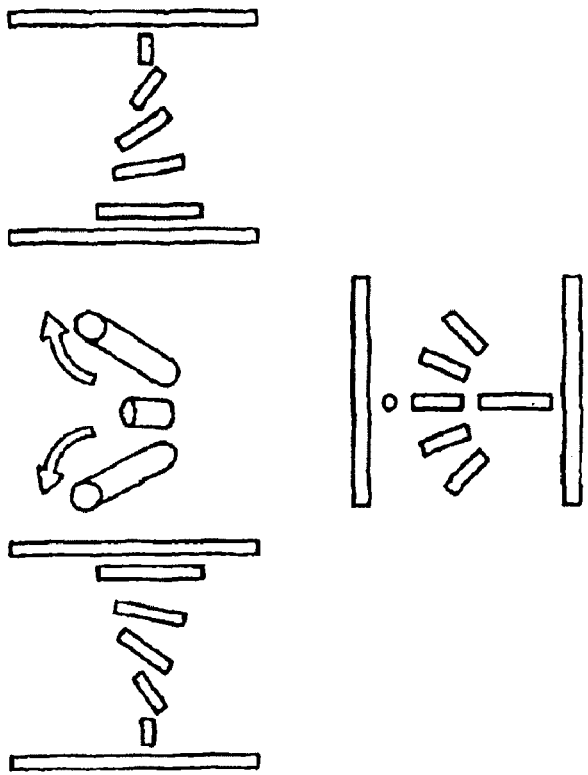
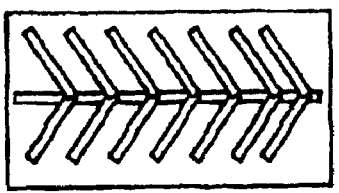
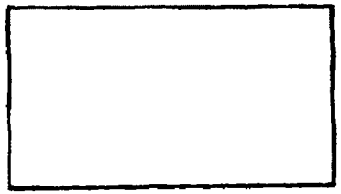
FIG. 42A
FIG. 42B
FIG. 42C

FIG. 45
(I) (II)
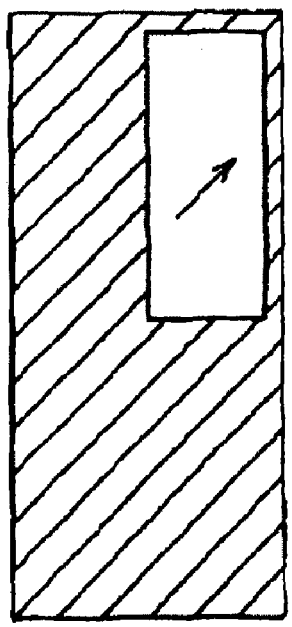 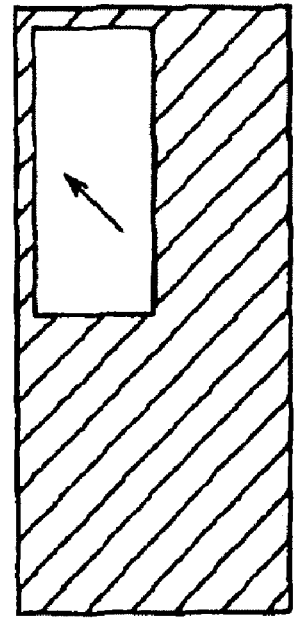
(IV) (III)
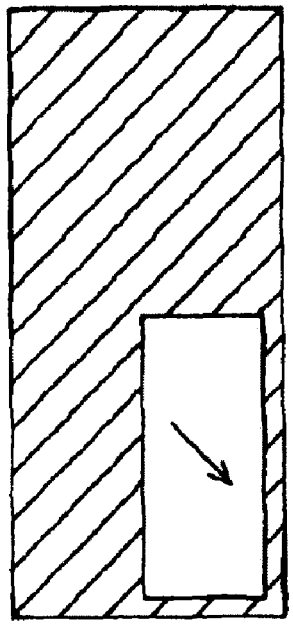 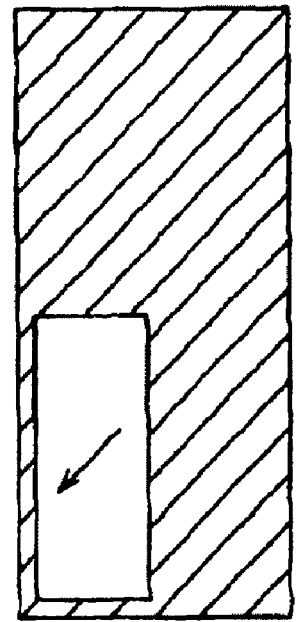

FIG. 46A
FIG. 46B
FIG. 46C
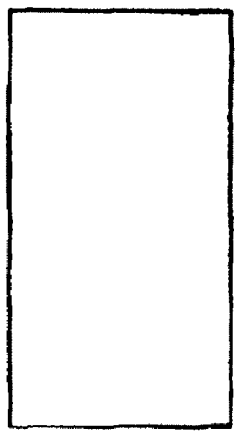
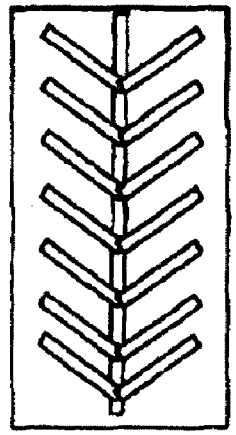
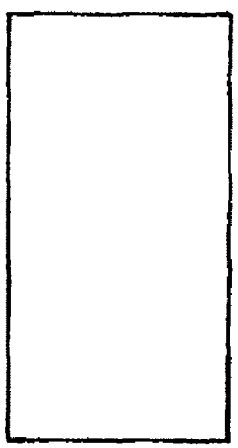
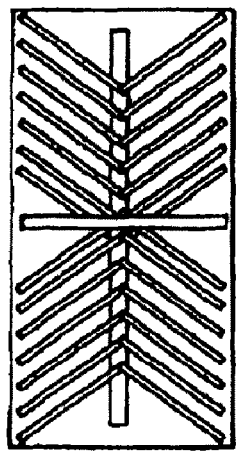
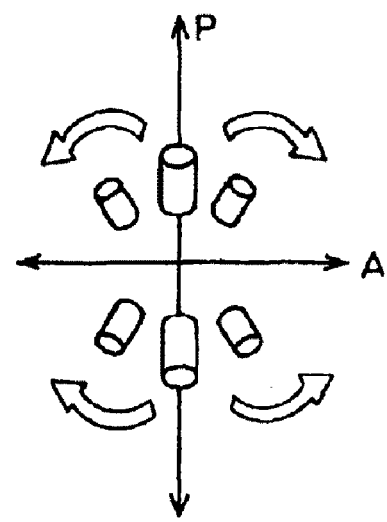
FIG. 47A
FIG. 47B
FIG. 47C

LIQUID CRYSTAL DISPLAY APPARATUS AND MANUFACTURING METHOD THEREFOR

This is a divisional of application Ser. No. 10/803,811, filed Mar. 18, 2004 now U.S. Pat. No. 7,253,438.

BACKGROUND OF THE INVENTION

1. Field of the Invention

The present invention relates to a liquid crystal display apparatus which can implement high transmittance, high-speed response and a wide viewing angle. More specifically, the present invention relates to a liquid crystal display apparatus where a liquid crystal is sealed in between two substrates, and the manufacturing method therefor, and particularly to a liquid crystal display apparatus where a liquid crystal, to which a polymerizable compound (polymer component) is added, is sealed between two substrates, then an alignment control layer or polymer network is formed by polymerizing the polymerizable compound, and the manufacturing method therefor. Also the present invention relates to a high image quality liquid crystal display apparatus which has characteristics in the movement mode of the liquid crystal.

2. Description of the Related Art

Recently liquid crystal display apparatus are being used in a variety of applications because of such features as thinness, light weight, low voltage driving and low power consumption. The display characteristics are now equivalent to those of a CRT, and are therefore used for such applications as monitors or TVs, where conventionally CRTs have been primarily used.

A general liquid crystal display apparatus has a structure where a liquid crystal is sealed between two substrates. On one of the substrates, thin film transistors (hereafter called TFT) and pixel electrodes are formed, and on the other substrate, a common electrode, color filters, etc. are formed. Hereafter a substrate where TFTs and pixel electrodes are formed is called a TFT substrate, and the substrate which faces the TFT substrate is called a counter substrate.

As a liquid crystal display apparatus which has superb viewing angle characteristics and contrast characteristics, an MVA (Mult-domain Vertical Alignment) liquid crystal display apparatus has been known (e.g. Japanese Patent No. 2947350). In an MVA liquid crystal display apparatus, a liquid crystal aligns in the vertical direction with respect to the substrate surface when no voltage is applied, and the orientation to which a liquid crystal is tilted is regulated by bumps or dents formed on the substrate face or by slits formed on electrodes, when voltage is applied.

FIG. 1 shows an example of a patterned pixel electrodes structure in an MVA liquid crystal display apparatus. This pixel electrode is comprised of a cross-shaped main region 1 and four branch regions which linearly extend in 45°, 135°, 225° and 315° orientations. In a branch section, the width of the electrode sections and the slit sections are about 3 µm, respectively. The electrode on the substrate facing this (not illustrated) is a one-plane electrode which is uniform on the entire surface.

If voltage is applied to electrodes where fine slits are formed, as shown in FIG. 1, a liquid crystal tends to tilt in the directions along the slits. In the case of FIG. 1, if voltage is applied, liquid crystal molecules 4 in the neighboring area 3 of the main region start to tilt along the slit directions as illustrated, the behavior of the liquid crystal molecules propagate to the liquid crystal molecules in the branch regions, which sequentially tilt along the slit directions. As a result, the liquid crystal layer forms a pattern according to the pattern provided by the electrodes which exist outside, and a four-domain alignment, where liquid crystal molecules tilt in four orientations (directions) respectively in the four branch regions, is implemented.

However, it takes time for all the liquid crystal molecules to finally tilt, since the behavior of the liquid crystal molecules near the main region propagate into the peripheral area when voltage is applied. Also if the branch region is long, liquid crystal molecules may tilt in the orientation B, that is the opposite of the proper orientation A to which the liquid crystal molecules are supposed to tilt, in a branch region away from the neighboring area of the main region. This is probably because the liquid crystal molecules tilt before the behavior of the liquid crystal molecules of the neighboring area of the main region propagate into the peripheral area. In this case, a boundary region is formed between A and B, and causes a drop in light transmittance since this boundary region does not transmit light when voltage is applied.

As a means of solving the above problem, a method of applying voltage on the liquid crystal layer, which has been formed by sealing a liquid crystal composition comprising a liquid crystal and a polymerizable compound so as to control the alignment, and irradiating active energy rays onto the substrate surface so as to polymerize the compound, has been proposed for MVA liquid crystal display apparatuses (see Japanese Unexamined Patent Application Publication No. H7-43689 (Claims), Japanese Unexamined Patent Application Publication No. H9-146068 (Claims), and Japanese Unexamined Patent Application Publication No. H10-147783 (Claims)).

In the case of sealing a liquid crystal composition, which comprises a liquid crystal and a polymerizable compound, in an MVA type liquid crystal display apparatus which has an electrode pattern shown in FIG. 1, for example, the generation of liquid crystal molecules which tilt in the opposite orientation, as shown in B in FIG. 1, can be prevented by gradually increasing the applied voltage over time when the voltage is applied to implement the four-domain alignment, as described above. So the compound is polymerized by irradiating active energy rays onto the panel face in this status. Then the compound is polymerized and the tilting orientation or tilting direction of the liquid crystal in the voltage applied status is fixed.

In the liquid crystal display apparatus manufactured in this way, the liquid crystal is somewhat inclined (tilted) in the tilting direction with respect to the vertical direction, even when no voltage is applied. Therefore the response speed is improved when voltage is applied, and a uniform and consistent alignment status is implemented. For this type of liquid crystal display apparatus, a liquid crystal display apparatus with high transmittance is implemented because bumps, etc., which cause the drop in transmittance, need not be formed. In other words, in the case of such an MVA liquid crystal apparatus, high transmittance, high-speed response and uniform and consistent alignment status can be implemented compared with conventional MVA type liquid crystal apparatuses.

However in this system, it is necessary to pattern the electrodes to regulate the tilting direction of the liquid crystal, which can be the cause of fluctuation in quality, complicated processing, dropping the yield and increasing cost. Particularly in the case of forming fine slits as shown in FIG. 1, transmittance is changed by a slight fluctuation of patterning, so a very high precision manufacturing process is demanded.

Now the MVA liquid crystal display apparatus will be more fully described. FIG. 2 is a cross-sectional model view depicting an example of a conventional MVA type liquid crystal display apparatus. This MVA liquid crystal display apparatus has a structure where a liquid crystal 70, of which the dielectric constant anisotropy is negative, is sealed between a TFT substrate 50 and a counter substrate 60. Polarizing plates (not illustrated) are disposed respectively under the TFT substrate 50 and on the counter substrate 60 such that the polarization axes are perpendicular to each other.

The TFT substrate 50 is comprised of a glass substrate 51, pixel electrodes 52, which are formed on the liquid crystal 70 side surface (top surface in FIG. 2) of the glass substrate 51, and a vertical alignment control film 53 which covers the surface of the pixel electrodes 52. The pixel electrodes 52 are made of a transparent conductor, such as ITO (Indium-Tin Oxide), and the vertical alignment control film 53 is made of a polyimide, a polyamic acid or the like.

The counter substrate 60, on the other hand, is comprised of a glass substrate 61, a common electrode 62, which is formed on the liquid crystal 70 side surface (bottom surface in FIG. 2) of the glass substrate 61, bumps for domain regulation 63 which are formed on the common electrode 62, and a vertical alignment control film 64 which covers the surface of the common electrode 62 and the bumps 63. The common electrode 62 is made of a transparent conductor such as ITO, and the vertical alignment control film 64 is made of a polyimide, a polyamic acid or the like. The bumps for domain regulation 63 are formed by a photoresist, for example.

FIG. 3A and FIG. 3B are model diagrams depicting the operation of the MVA liquid crystal display apparatus. As FIG. 3A shows, when no voltage is applied between the pixel electrodes 52 and the common electrode 62, liquid crystal molecules 70a align roughly vertically from the surface of the alignment control films 53 and 64. In this status, light, which transmitted through the polarizing plate under the TFT substrate 50 and entered the liquid crystal layer, transmits through the liquid crystal layer as it is, and is shielded by the polarizing plate on the counter substrate 60. In other words, this is the case of a dark display.

On the other hand, if sufficient voltage is applied between the pixel electrodes 52 and the common electrode 62, as shown in FIG. 3B, liquid crystal molecules 70a align in roughly a vertical direction with respect to the electric field. In this status, the light, which transmitted through the polarizing plate under the TFT substrate 50 and entered the liquid crystal layer, is double-refracted because of the dielectric constant anisotropy of the liquid crystal molecules, and transmits through the polarizing plate on the counter substrate 60. In other words, this is the case of a bright display. In this way, by controlling the voltage between the pixel electrodes 52 and the common electrode 62 for each pixel, desired images can be displayed on the liquid crystal display apparatus.

In the case of an MVA liquid crystal display apparatus, if voltage is applied between the pixel electrodes 52 and the common electrode 62, the tilting directions of the liquid crystal molecules differ between each side of a bump 63 as shown in FIG. 3B, and a so called "alignment division (multi-domain)" is formed. By this, the leaking of light in diagonal directions from the substrate face is decreased remarkably, and good viewing angle characteristics and contrast characteristics can be implemented.

The above described example is the case when the bumps 63 are formed as domain regulation means, but the domain regulation means may be implemented by forming slits on one or on both of the pixel electrodes and the common electrode. In a normal MVA liquid crystal display apparatus, slits are formed on the electrodes of one of the TFT substrate and the counter substrate, and bumps are formed on the other substrate. Also dents may be formed instead of bumps or slits as the domain regulation means.

Japanese Unexamined Patent Application Publication No. H7-84244 and Japanese Unexamined Patent Application Publication No. H11-343486 disclose a manufacturing method of a liquid crystal display apparatus where a member for regulating the liquid crystal domains is formed by polymerizing a photoreactive monomer, which is added to the liquid crystal. With the method disclosed in Japanese Unexamined Patent Application Publication No. H11-343486, however, a step of forming a vertical alignment control film is required, just as with conventional methods. And with the method disclosed in Japanese Unexamined Patent Application Publication No. H7-84244, the portions to be the boundary of domains cannot be set at arbitrary positions.

Now a comparison between the MVA liquid crystal display apparatus and the horizontal electric field switching type liquid crystal display apparatus, called "In-Plane" switching (hereafter called IPS), will be described. FIG. 4 is a view depicting an MVA type vertically aligned liquid crystal display apparatus based on the prior art, and FIG. 5 is a view depicting a horizontal electric field switching type liquid crystal display apparatus based on the prior art. The MVA liquid crystal apparatus and IPS liquid crystal apparatus are well known for superb characteristics thereof.

SUMMARY OF THE INVENTION

These excellent liquid crystal display panels however are still not perfect, and in the former case, for example, the viewing angle characteristics when the gradation is changed may not be sufficient, and in the latter case, the front face contrast may not be sufficient.

In the gradation-related viewing angle characteristics in the former case, MVA, images displayed in half tones may look whitish from the diagonal viewing angle, and tones viewed from the diagonal direction may be different from those viewed from the front. In the latter case, IPS, on the other hand, the front face contrast is limited to 200-300, because of horizontal alignment. Contrast from the diagonal 45° angle is not sufficient compared with MVA, and improvement is also desired for transmittance. Coloring in the black status when viewed from the diagonal direction is also a problem. In this way, even in the above two excellent liquid crystal movement modes, that is, the MVA mode which is characterized by alignment control, and the IPS mode which is characterized by the placement of the electrodes, have both advantages and disadvantages.

With the foregoing in view, it is an object of the present invention to provide a liquid crystal display apparatus which excels in high transmittance, high-speed response, wide viewing angle characteristics, etc., and a manufacturing method of the liquid crystal display apparatus.

To solve the above problem, according to one aspect of the present invention, provided is a liquid crystal apparatus having a liquid crystal layer and a pair of electrodes disposed on both sides of the liquid crystal layer for applying voltage on the liquid crystal enclosed between a pair of substrates, wherein the liquid crystal layer comprises a section formed by polymerizing a polymerizable compound in the presence of a liquid crystal by selectively irradiating active energy rays onto the substrate surface when no voltage is applied. By this embodiment of the present invention, a liquid crystal display apparatus which excels in high transmittance, high-speed response, wide viewing angle characteristics, etc. can be provided.

For this embodiment of the aspect of the present invention, it is preferable that the liquid crystal layer comprises a section polymerized by irradiating active energy rays onto the entire surface of the substrate in a voltage applied status after active energy rays are selectively irradiated, that at least one of the two active energy ray irradiations is from the direction tilted from the normal line direction of the substrate face, that the liquid crystal layer presents a light shielding pattern based on a specific liquid crystal alignment when voltage is applied after the active energy rays are irradiated, that the light shielding pattern by a specific liquid crystal alignment includes a lattice pattern or a pattern which is comprised of a cross-shaped main region and branch regions which linearly extend in the peripheral directions, that the liquid crystal has a negative dielectric constant anisotropy, and aligns in the vertical direction from the substrate face when no voltage is applied after the active energy rays are irradiated, and that first and second polarizing elements are disposed on both sides of the pair of substrates such that the absorption axes thereof are perpendicular to each other; a first ¼ wavelength plate is disposed between one of the substrates and the first polarizing element; a second ¼ wavelength plate is disposed between the other substrate and the second polarizing element; and the absorption axis of the first polarizing element and the slow axis of the first ¼ wavelength plate form a 45° angle, the absorption axis of the second polarizing element and the slow axis of the second ¼ wavelength plate form a 45° angle, and the slow axes of the first ¼ wavelength plate and the second ¼ wavelength plate are perpendicular to each other.

According to this aspect of the present invention, also provided is a manufacturing method of a liquid crystal display apparatus having a liquid crystal layer and a pair of electrodes on both sides of the liquid crystal layer for applying voltage on a liquid crystal disposed between a pair of substrates, wherein the liquid crystal layer is formed from a liquid crystal composition comprising the liquid crystal and a polymerizable compound, a part of the polymerizable compound is polymerized by selectively irradiating active energy rays onto the substrate face when no voltage is applied, then the rest of the polymerizable compound is polymerized by irradiating active energy rays onto the entire face of the substrate in a voltage applied status. By this embodiment of the present invention, a simplification of the manufacturing process can be implemented, and the causes for fluctuation in quality, complication of processing, drop in yield and increase of cost in prior art can be eliminated.

For this embodiment of this aspect of the present invention, it is preferable that a photomask is used for the selective irradiation of active energy rays, that the width of the light shielding section and the width of the opening section of the photomask are in a 2-100 μm range, respectively, that the active energy rays are UV rays, that the energy active ray irradiation is performed such that the liquid crystal layer presents a light shielding pattern based on a specific liquid crystal alignment when voltage is applied after the active energy rays are irradiated, and that at least one of the two active energy ray irradiations is performed from the direction tilted from the normal line direction of the substrate face.

According to this aspect of the present invention, a liquid crystal display apparatus, which excels in high transmittance, high-speed response, wide viewing angle characteristics, etc., can be provided. The manufacturing method can also be simplified.

In an MVA liquid crystal display apparatus, the directions to which liquid crystal molecules tilt when voltage is applied can be determined by bumps or slits of the electrodes, so in such a case, it is unnecessary to perform alignment processing on the alignment control films 53 and 64 as shown in FIG. 2.

However it is usually still necessary to form the alignment control films 53 and 64 on the surfaces of the TFT substrate and the counter substrate.

The alignment control film is normally formed by printing a polyimide or a polyamic acid on the surface of a substrate, and then baking at a temperature of about 200° C. Since the sizes of liquid crystal display apparatuses are increasing recently, a large printer and furnace are required to form alignment control films, and replacing printing plates also contribute to enormous costs, causing increases in manufacturing cost.

To solve such problems, a manufacturing method of a liquid crystal display apparatus which can omit the step of coating an alignment control film (e.g. Japanese Patent Application No. 2002-40721) has been proposed. In this method, a liquid crystal mixed with a bifunctional monomer and a photopolymerization initiator is sealed between a pair of substrates, for example. Then the monomer attaches to the surface of the substrate (surface of an ITO film or an insulation film) and grows. When UV rays are irradiated onto this, the monomer is polymerized and also chemically bonded to the surface of the substrate, where a stable alignment control layer is formed. This alignment control layer has a controlling ability to align the liquid crystal molecules in a roughly vertical directions from the substrate face. However, the direction to which the liquid crystal molecules tilt when voltage is applied are not determined if the alignment control layer is simply formed by polymerizing a monomer, resulting in random alignment (schlieren alignment).

Also in a conventional MVA liquid crystal display apparatus, the contrast characteristics are better than a TN (Twisted Nematic) liquid crystal display apparatus, but as FIG. 3A shows, the liquid crystal molecules align diagonally from the substrate face in the area near the bumps 63 when no voltage is applied, so the leaking of light occurs in this area, causing dropping of the contrast characteristics.

Also in a conventional MVA liquid crystal display apparatus, the areas above the bumps or slits become boundaries of alignment division where dark lines are generated, causing dropping of the transmittance in a white display (bright display). Transmittance can be improved by increasing the spaces between the bumps or slits sufficiently, but for areas away from the bumps or slits, it takes a long time from applying voltage between the electrodes to the stabilization of the alignment of liquid crystal molecules, which drops the response speed considerably.

To solve these problems, proposed here is a liquid crystal display apparatus, where a liquid crystal to which a polymerizable compound such as a monomer or an oligomer is added, is sealed between a TFT substrate and a counter substrate, voltage is applied between the electrodes, and the alignment directions of liquid crystal molecules are stabilized, then UV rays are irradiated so that the polymerizable compound is polymerized to form a polymer network. This type of a liquid crystal display apparatus is called a polymer stabilized liquid crystal display apparatus. In the polymer stabilized liquid crystal apparatus, the liquid crystal molecules tilt in directions which are determined by the polymer network, at the same time as voltage is applied, so the response characteristics are improved.

However, it is believed that a conventional polymer stabilized liquid crystal display apparatus has the following problems.

That is, in the case of a polymer stabilized liquid crystal display apparatus, UV rays are irradiated while applying voltage between the pixel electrodes and the common electrode after the electrode disposed on the TFT substrate or the counter substrate and the external drive circuit are electrically connected, so the processing steps are complicated and mass production ability is poor. Also, if UV rays are irradiated when TFT's are driven, the characteristics of the TFT's may be changed by the UV rays, and normal voltage may not be applied to the pixel electrodes. And if the polymerizable compound is polymerized in this status, the alignment controlling ability by the polymer network becomes different depending on the pixel, and the T-V (Transmittance-voltage) characteristics of the liquid crystal cells disperse. This causes display defects, such as unevenness in display.

With the foregoing in view, it is an object of the present invention to provide a liquid crystal display apparatus comprising bumps for domain regulation and an alignment control layer, whereby the manufacturing steps can be more simplified compared with prior art, and a manufacturing method therefor.

It is another object of the present invention to provide a liquid crystal display apparatus whereby the contrast characteristics are better than prior art, and a manufacturing method therefor.

It is still another object of the present invention to provide a manufacturing method of a liquid crystal display apparatus which excels in mass production ability, and does not disperse the T-V characteristics depending on the pixel.

The above problem is solved by one aspect of the present invention, that is, a liquid crystal display apparatus comprising a first and second substrates which are disposed facing each other, a liquid crystal sealed between the first and second substrates, a first electrode formed on the liquid crystal side surface of the first substrate, a second electrode formed on the liquid crystal side surface of the second substrate, alignment control layers which cover the surfaces of the first and second electrodes and control the alignment direction of the liquid crystal molecules when no voltage is applied to be roughly vertical from the substrate face, and bumps which are formed on at least one surface of the first and second substrates and determine the tilting directions of the liquid crystal molecules when voltage is applied, wherein both the alignment control layers and the bumps are formed by polymerizing a polymerizable compound which is added to the liquid crystal, and the alignment direction of the liquid crystal molecules near the bumps when no voltage is applied is roughly vertical from the substrate face.

It is preferable that both of the first and second substrates and both of the first and second electrodes are transparent and that at least part of the bumps contacts the first and second substrates.

It is preferable that at least part of the bumps contacts the first and second substrates.

The above problem is also solved by another embodiment of this aspect of the present invention, that is, a manufacturing method of a liquid crystal display apparatus, comprising sealing a liquid crystal to which a polymerizable compound is added, between a first and second substrates, and polymerizing the polymerizable compound in the liquid crystal, forming alignment control layers for controlling the alignment direction of the liquid crystal molecules when no voltage is applied to be roughly vertical from the substrate face, on the surfaces of the first and second substrates and forming bumps protruding to the liquid crystal side.

In the present invention, not only an alignment control layer but bumps for domain regulation are also formed by polymerizing the polymerizable compound (or oligomer). For example, a monomer which is added to the liquid crystal is polymerized by irradiating UV rays onto the bump forming areas, with an energy that is higher than the energy irradiated onto other areas. By this, monomer molecules in the bump forming areas are polymerized preferentially to form the bumps, and in other areas an alignment control layer with a thin film thickness is formed. In this case, the liquid crystal molecules are aligned to be vertical from the substrate face in the initial stage of bump formation. Since bumps grow while maintaining this alignment status, the liquid crystal molecules near the bumps become roughly vertical from the substrate face when no voltage is applied, even after the bumps are completed. By this, leaking of light is controlled even more compared with conventional MVA liquid crystal display apparatus, and the contrast characteristics are improved.

It is preferable that the polymerizable compound is polymerized by light, that light irradiation at a higher energy density is performed on bump formation areas than the other areas for forming the bumps, that the liquid crystal is sealed between the first and second substrates after a treatment is performed to make the surface energy of bump formation areas of at least one of said first and second substrates higher than the other areas, that spacers are selectively disposed at the bump formation areas between the first and second substrates, and the bumps are formed using the spacers as cores, and that at least part of the bumps are allowed to grow from one of the first and second substrates to contact the other substrate.

The above problem is solved by still another embodiment of this aspect of the present invention, that is, a liquid crystal display apparatus comprising a first and second substrates which are disposed facing each other, a liquid crystal sealed between the first and second substrates, tilt control sections which are disposed on at least one of the first and second substrates and determine the tilting directions of the liquid crystal molecules when voltage is applied, and alignment control layers which are formed on the liquid crystal side faces of the first and second substrates and control the alignment direction of the liquid crystal molecules when no voltage is applied to be roughly vertical from the substrate face, wherein the alignment control layers are formed by polymerizing a polymerizable compound which is added to the liquid crystal.

It is preferable that the tilt control sections are bumps or dents installed on at least one of the first and second substrates, that the tilt control sections are sections formed by a rubbing treatment on the bases of the alignment control layers, and that the tilt control sections are formed by changing the surface energy of the bases of the alignment control layers.

Also the above problem is solved by still another embodiment of this aspect of the present invention, that is, a manufacturing method of a liquid crystal display apparatus, comprising forming bumps or dents on at least one of the first and second substrates, disposing the first and second substrates facing each other with the faces where the bumps or dents are formed to be inside, sealing the polymerizable compound-added liquid crystal between these substrates, and polymerizing the polymerizable compound in the liquid crystal and forming alignment control layers, for controlling the alignment direction of the liquid crystal molecules when no voltage is applied to be roughly vertical from the substrate face, on the first and second substrates and on the surface of the bumps or dents.

In the present invention, tilt control sections, such as bumps or dents for determining the direction for the liquid crystal molecules to tilt when voltage is applied, are formed on at least one of the first and second substrates.

If the alignment control layer is formed merely by a reactive monomer added to the liquid crystal, directions to which the liquid crystal molecules tilt when voltage is applied are not determined, and a plurality of small domains, made from a set of liquid crystal molecules of which the alignment direction is the same, are formed in the liquid crystal. Since the alignment directions of the adjacent domains are not the same, a dark line is generated at the boundary section of the domain due to alignment abnormalities. And the locations where the dark lines are generated are not consistent. This becomes a cause of a drop in display quality.

In the present invention, however, the tilt control sections are disposed on at least one of the first and second substrates, so the directions to which the liquid crystal molecules tilt when voltage is applied are determined by the tilt control sections. By this, good display characteristics are implemented.

The tilt control sections are not limited to the above-mentioned bumps or dents, but may be those formed by a rubbing treatment on the base of the alignment control layer, for example, or those formed by performing processing to partially change the surface energy on the surface of a substrate. If such processing is performed, the processing performed on the base influences the alignment control layers, which can control the directions to which the liquid crystal molecules tilt when voltage is applied.

Accordingly, the above problem is also solved by still another embodiment of this aspect of the present invention, that is, a manufacturing method of a liquid crystal display apparatus, comprising performing a rubbing treatment on a first and second substrates, disposing the first and second substrates facing each other with the face where the rubbing treatment is performed to be inside, sealing a polymerizable compound-added liquid crystal between the substrates, and polymerizing the polymerizable compound in the liquid crystal and forming alignment control layers, for controlling the alignment direction of the liquid crystal molecules when no voltage is applied to be roughly vertical from the substrate face, on the first and second substrates.

Also the above problem is solved by still another embodiment of this aspect of the present invention, that is, a manufacturing method of a liquid crystal display apparatus, comprising partially changing the surface energy of the surface of at least one of first and second substrates, sealing a polymerizable compound-added liquid crystal between the first and second substrates, and polymerizing the polymerizable compound in the liquid crystal and forming alignment control layers, for controlling the alignment direction of the liquid crystal molecules when no voltage is applied to be roughly vertical from the substrate face, on at least one of the first and second substrates.

It is preferable that light is selectively irradiated on the substrate surface via a mask in the partial changing of the surface energy of the substrate surface.

The above-mentioned problem is also solved by still another embodiment of this aspect of the present invention, that is, a manufacturing method of a liquid crystal display apparatus, comprising disposing a pair of substrates, on which surface alignment control films are formed, facing each other with the alignment control films to be inside, sealing a liquid crystal to which a polymerizable compound is added, between these substrates, and polymerizing the polymerizable compound by irradiating UV rays when no voltage is applied, and forming a polymer network near the surface of the alignment control films, wherein the anchoring energy for the liquid crystal molecules on the substrate surface is controlled by controlling the composition, the adding amount and the polymerizing conditions of the polymerizable compound.

In the present invention, the polymerizable compound added to the liquid crystal is polymerized when no voltage is applied between the electrodes, to form the polymer network. By this polymer network, the controlling ability (anchoring energy) to align the liquid crystal molecules in the vertical direction becomes strong.

The liquid crystal molecules near bumps or slits align in specific directions, which are determined by the bumps or slits almost at the same time when voltage is applied. The alignment directions of these liquid crystal molecules influence on the peripheral liquid crystal molecules, and the alignment directions of the peripheral liquid crystal molecules are determined. In this way, the alignment directions of the liquid crystal molecules are propagated, and the alignment directions of the liquid crystal molecules at locations away from bumps or slits are determined.

In the case of an MVA liquid crystal apparatus which does not have a polymer network, the liquid crystal molecules at locations away from bumps or slits align in random directions almost at the same time when voltage is applied, and when the alignment directions of the liquid crystal molecules near bumps or slits are propagated, they change direction to the alignment directions. However, it takes time to change the alignment direction of liquid crystal molecules which have already been aligned to a different direction, causing poor response characteristics of liquid crystal display apparatus which do not have a polymer network.

If the alignment controlling ability in the vertical direction of the liquid crystal molecules is increased as in this invention, the response time is decreased compared with liquid crystal display apparatuses which do not have a polymer network, since liquid crystal molecules are aligned vertically until the alignment directions of the liquid crystal molecules near bumps or slits are propagated, and the liquid crystal molecules align in specific directions after the alignment directions are propagated. Also according to the present invention, the polymer network is formed when no voltage is applied between the electrodes, so the fluctuation of the T-V characteristics can be avoided.

In other words, whereas in the conventional polymer stabilized liquid crystal display, the technology is for implementing a vertically aligned liquid crystal without a rubbing treatment, by controlling the pre-tilt angle of the liquid crystal molecules and the tilting direction when voltage is applied, the present invention is for controlling the anchoring strength, which can be applied to both a vertically aligned liquid crystal display apparatus and a horizontally aligned liquid crystal display apparatus. The present invention can also be applied to liquid crystal display apparatuses which involve a rubbing treatment.

As described above, according to this aspect of the present invention, not only an alignment control layer but also bumps for domain regulation are formed by polymerizing the polymerizable compound. For example, when a monomer added to a liquid crystal is polymerized, UV rays, which energy is higher than the energy used for other areas, are irradiated onto the bump formation areas. By this, the monomer is preferentially polymerized in the bump formation areas to form bumps, and in the other areas, a thin alignment control layer is formed. In this case, in the initial stage of the bump formation, liquid crystal molecules are aligned vertically from the substrate surface. Bumps grow while maintaining this alignment status, so the liquid crystal molecules near the bumps are aligned almost vertically from the substrate surface when no voltage is applied, even after the bumps are completed.

Because of this, the leaking of light is further controlled, and the contrast characteristics improve compared with conventional MVA liquid crystal apparatus.

According to this aspect of the present invention, tilt control sections, such as bumps or dents, for determining directions to which the liquid crystal molecules tilt when voltage is applied, are disposed on at least one of the first and second substrates.

By merely forming an alignment control layer by a reactive monomer added to a liquid crystal, the directions to which the liquid crystal molecules tilt when voltage is applied are not determined, and a plurality of small domains, each from a set of liquid crystal molecules with the same alignment direction, are formed in the liquid crystal. Since the alignment directions of adjacent domains are not the same, a dark line is generated at the boundary sections of domains due to alignment abnormalities. Also the generation locations of the dark lines are not constant. This drops the display quality.

However, in the present invention, where the tilt control sections are disposed on at least one of the first and second substrates, the directions to which the liquid crystal molecules tilt when voltage is applied are determined by the tilt control sections. Therefore good display characteristics are implemented. Also the T-V characteristics and the threshold values of the liquid crystal cells can be controlled by controlling the composition, the adding amount and the polymerizing conditions of the polymerizable compound.

It is preferable that the anchoring energy is controlled on each pixel, and that a plurality of areas having different anchoring energies are formed in a pixel.

In the present invention it is also possible to combine different aspects. Accordingly, the present invention also provides a liquid crystal display apparatus according to the first aspect of the present invention, the apparatus comprising a first and second substrates which are disposed facing each other, a liquid crystal sealed between the first and second substrates, a first electrode formed on the liquid crystal side surface of the first substrate, a second electrode formed on the liquid crystal side surface of the second substrate, alignment control layers which cover the surfaces of the first and second electrodes and control the alignment direction of the liquid crystal molecules when no voltage is applied to be roughly vertical from the substrate face, and bumps which are formed on at least one surface of the first and second substrates and determine the tilting directions of the liquid crystal molecules when voltage is applied, wherein both of the alignment control layers and the bumps are formed by polymerizing a polymerizable compound which is added to the liquid crystal, and the alignment direction of the liquid crystal molecules near the bumps when no voltage is applied is roughly vertical from the substrate face.

The present invention also provides a manufacturing method of a liquid crystal display apparatus according to the first aspect of the present invention, the method comprising sealing a liquid crystal to which a polymerizable compound is added, between a first and second substrates, polymerizing the polymerizable compound in the liquid crystal, forming alignment control layers for controlling the alignment direction of the liquid crystal molecules when no voltage is applied to be roughly vertical from the substrate face, on the surfaces of the first and second substrates, and forming bumps protruding to the liquid crystal side.

The present invention also provides a liquid crystal display apparatus according to the first aspect of the present invention, the apparatus comprising a first and second substrates which are disposed facing each other, a liquid crystal sealed between the first and second substrates, tilt control sections which are disposed on at least one of the first and second substrates and determine the tilting directions of the liquid crystal molecules when voltage is applied, and alignment control layers which are formed on the liquid crystal side faces of the first and second substrates and control the alignment direction of the liquid crystal molecules when no voltage is applied to be roughly vertical from the substrate face, wherein the alignment control layers are formed by polymerizing a polymerizable compound which is added to the liquid crystal.

The present invention also provides a manufacturing method of a liquid crystal display apparatus according to the first aspect of the present invention, the method comprising disposing a pair of substrates, on which surface alignment control films are formed, facing each other with the alignment control films to be inside, sealing a liquid crystal to which a polymerizable compound is added, between these substrates, polymerizing the polymerizable compound by irradiating UV rays when no voltage is applied, and forming a polymer network near the surface of the alignment control films, wherein the anchoring energy for the liquid crystal molecules on the substrate surface is controlled by controlling the composition, the adding amount and the polymerizing conditions of the polymerizable compound.

It is an object of still another aspect of the present invention to provide a liquid crystal display apparatus which solves the above-mentioned problems of prior art, has a new liquid crystal movement mode which is different from that of the liquid crystal display apparatus based on prior art, and is brighter and excels in color gradation characteristics compared with a liquid crystal display based on prior art, and a manufacturing method therefor.

The liquid crystal display apparatus according to this aspect of the present invention for solving the above-mentioned problems is a liquid crystal display apparatus wherein a first substrate on which surface first electrodes with a vertical alignment control film are formed and a second substrate on which surface a second electrode with a horizontal alignment control film is formed face each other at the alignment control film side, the facing substrates are sealed with a space in between, a liquid crystal comprising a functional monomer is sealed in this space, and a plurality of roughly rectangular pixel electrodes made of the first electrodes are arrayed on the first substrate, for performing the alignment control of the liquid crystal by irradiating light from a direction tilted from the normal line direction on the liquid crystal display apparatus to polymerize the monomer, wherein the first substrate has a structure for regulating the alignment of the liquid crystal molecules in the liquid crystal when voltage is applied between the pixel electrodes and the second electrode.

In the above-mentioned liquid crystal display apparatus, it is preferable that the above-mentioned structure is a fine ITO pattern formed in the pixel electrodes.

In the above-mentioned liquid crystal display apparatus, it is preferable that the above-mentioned structure is an insulating pattern formed on the pixel electrodes.

In the above-mentioned liquid crystal display apparatus, it is preferable that the above-mentioned functional monomer has two or more functional groups.

In the above-mentioned liquid crystal display apparatus, it is preferable that UV rays are used for the above-mentioned light irradiation.

In the above-mentioned liquid crystal display apparatus, it is preferable that the above-mentioned functional monomer is an acrylate.

In the above-mentioned liquid crystal display apparatus, it is preferable that the above-mentioned functional monomer is a methacrylate.

In the above-mentioned liquid crystal display apparatus, it is preferable to perform the above-mentioned light irradiation by irradiating with light from a first direction, which is tilted from the normal line direction on the liquid crystal display apparatus face, onto partial areas of the pixel electrode faces, and by irradiating with light again from a second direction, which is different from the first direction, onto the entire areas of the pixel electrode faces, for each one of the pixel electrodes.

In the above-mentioned liquid crystal display apparatus, it is preferable that the above-mentioned liquid crystal is of a negative type.

In the above-mentioned liquid crystal display apparatus, it is preferable that the above-mentioned liquid crystal is of a positive type.

In the above-mentioned liquid crystal display apparatus, it is preferable that the above-mentioned liquid crystal is in a normally black mode, and the alignment of the liquid crystal molecules is regulated so as to switch to the direction of the light irradiation by applying voltage.

In the present invention it is also possible to combine different aspects. Accordingly, the present invention also provides a liquid crystal display apparatus according to the first aspect, wherein a first substrate on which surface first electrodes with a vertical alignment control film are formed and a second substrate on which surface a second electrode with a horizontal alignment control film is formed face each other at the alignment control film side, the facing substrates are sealed with a space in between, a liquid crystal comprising a functional monomer is sealed in this space, and a plurality of roughly rectangular pixel electrodes made of the first electrodes are arrayed on the first substrate, for performing the alignment control of the liquid crystal by irradiating light from a direction tilted from the normal line direction on the liquid crystal display apparatus to polymerize the monomer, wherein the first substrate has a structure for regulating the alignment of the liquid crystal molecules in the liquid crystal when voltage is applied between the pixel electrodes and the second electrode.

The present invention also provides a liquid crystal display apparatus according to the first aspect, wherein the light irradiation is performed by irradiating with light from a first direction, which is tilted from the normal line direction on the liquid crystal display apparatus face, onto partial areas of the pixel electrode faces, and by irradiating with light again from a second direction, which is different from the first direction, onto the entire areas of the pixel electrode faces, for each one of the pixel electrodes.

By the above aspect of the present invention, a liquid crystal display apparatus, which has a new liquid crystal movement mode different from that of the liquid crystal display apparatus based on prior art, and is brighter and excels in color gradation characteristics compared with the liquid crystal display apparatus based on prior art, is provided.

Other objects and advantages of the present invention will be clarified by the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 15 shows various photomask patterns;

FIG. 35A is a model view illustrating, in a step-wise way, a method for manufacturing a liquid crystal display apparatus according to an embodiment of the present invention;

FIG. 35B is another model view illustrating, in a step-wise way, a method for manufacturing a liquid crystal display apparatus according to an embodiment of the present invention;

FIG. 36 is a graph showing T-V characteristics of a liquid crystal display apparatus in which a bifunctional monomer in the capacity of a polymerizable compound was added in amounts of 0.5, 1 and 3 wt. %;

FIG. 37 is a graph showing T-V characteristics of a liquid crystal display apparatus in which a monofunctional monomer in the capacity of a polymerizable compound was added in amounts of 1 and 2 wt. %;

FIG. 38 is a collection of figures showing the transient response characteristics from an unlighted state to a lighted state of a liquid crystal display apparatus of an embodiment of the present invention;

FIG. 39 is a collection of figures showing the transient response characteristics from an unlighted state to a lighted state of an MVA liquid crystal display apparatus (comparative example) that does not have a polymer network, at the time when the pixels are lighted;

FIG. 40 is a collection of figures showing the transient response characteristics from an unlighted state to a lighted state of an MVA liquid crystal display apparatus (conventional apparatus example) with a polymer network formed by irradiating UV rays while a voltage was applied between the electrodes;

FIG. 41A is a view for illustrating the steps for manufacturing a liquid crystal display apparatus according to an embodiment of the present invention;

FIG. 41B is another view for illustrating the steps for manufacturing a liquid crystal display apparatus according to an embodiment of the present invention;

FIG. 42A is a view for illustrating the electrode constitution of a liquid crystal display panel according to an embodiment of the present invention;

FIG. 42B is another view for illustrating the electrode constitution of a liquid crystal display panel according to an embodiment of the present invention;

FIG. 42C is another view for illustrating the electrode constitution of a liquid crystal display panel according to an embodiment of the present invention;

FIG. 45 illustrates the manufacturing steps of a liquid crystal display panel according to an embodiment of the present invention, in which (I) shows a step of irradiating ¾ of the panel surface except the first domain from a first tilted direction through a mask with a light, (II) shows a step of irradiating ¾ of the panel surface except the second domain from a second tilted direction through a mask with a light, (III) shows a step of irradiating ¾ of the panel surface except the third domain from a third tilted direction through a mask with a light, and (IV) shows a step of irradiating ¾ of the panel surface except the fourth domain from a fourth tilted direction through a mask with a light;

FIG. 46A is a view for illustrating the structure of the electrodes and the movement of the liquid crystal molecules in a liquid crystal display panel according to an embodiment of the present invention;

FIG. 46B is another view for illustrating the structure of the electrodes and the movement of the liquid crystal molecules in a liquid crystal display panel according to an embodiment of the present invention;

FIG. 46C is another view for illustrating the structure of the electrodes and the movement of the liquid crystal molecules in a liquid crystal display panel according to an embodiment of the present invention;

FIG. 47A is a view for illustrating the structure of the electrodes and the movement of the liquid crystal molecules in a liquid crystal display panel according to an embodiment of the present invention;

FIG. 47B is another view for illustrating the structure of the electrodes and the movement of the liquid crystal molecules in a liquid crystal display panel according to an embodiment of the present invention;

FIG. 47C is another view for illustrating the structure of the electrodes and the movement of the liquid crystal molecules in a liquid crystal display panel according to an embodiment of the present invention;

DESCRIPTION OF THE PREFERRED EMBODIMENTS

Figure 1:
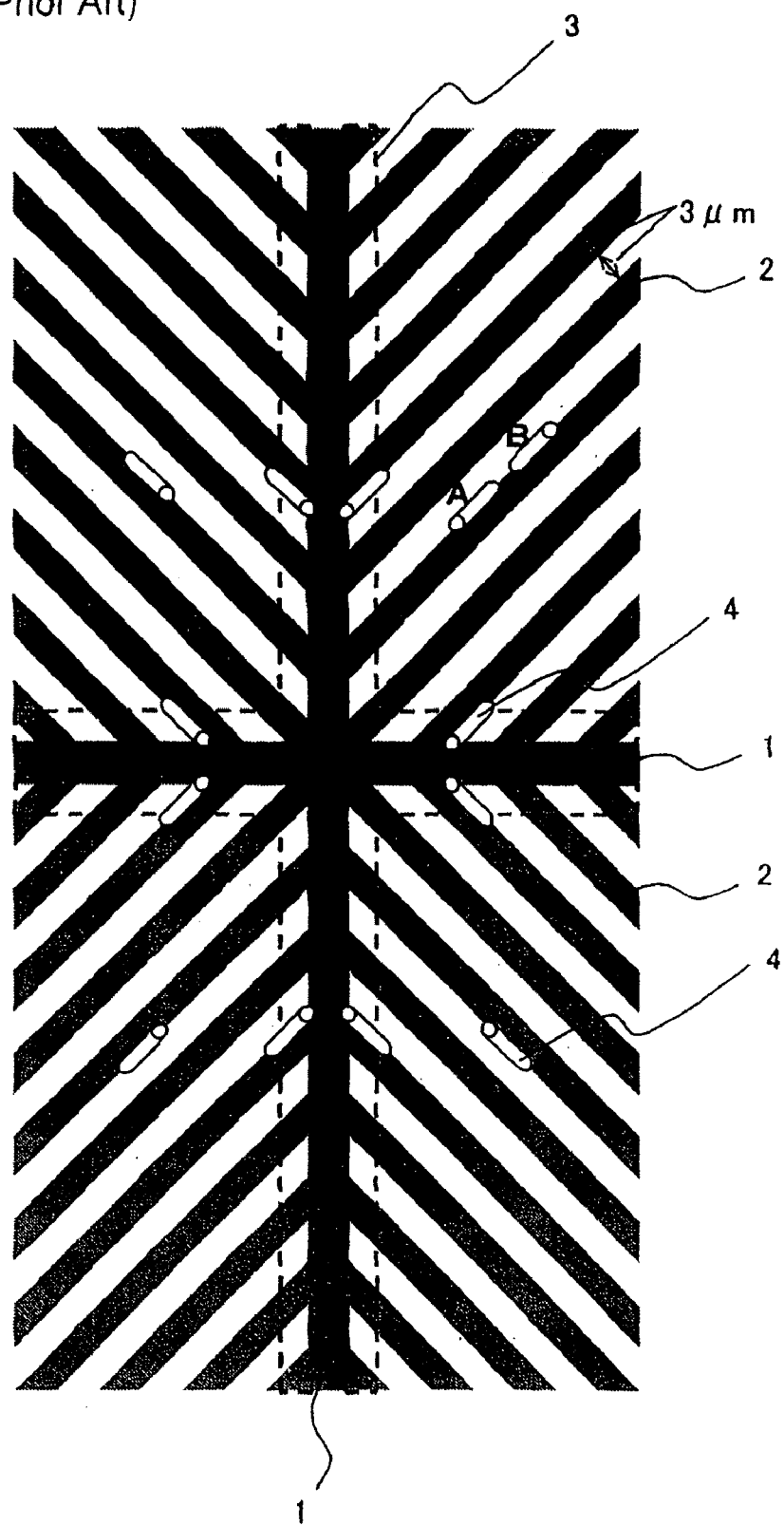
FIG. 1 is a top model view illustrating an example of a patterned pixel electrodes structure in an MVA liquid crystal display apparatus.
Figure 2:
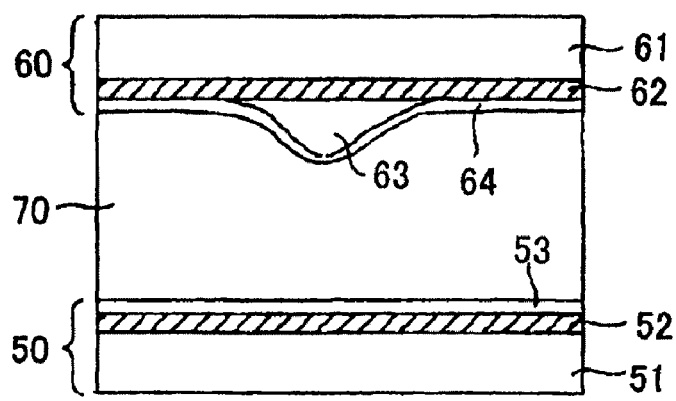
FIG. 2 is a model cross-sectional view depicting an example of a conventional MVA type liquid crystal display apparatus.
Figure 3A:
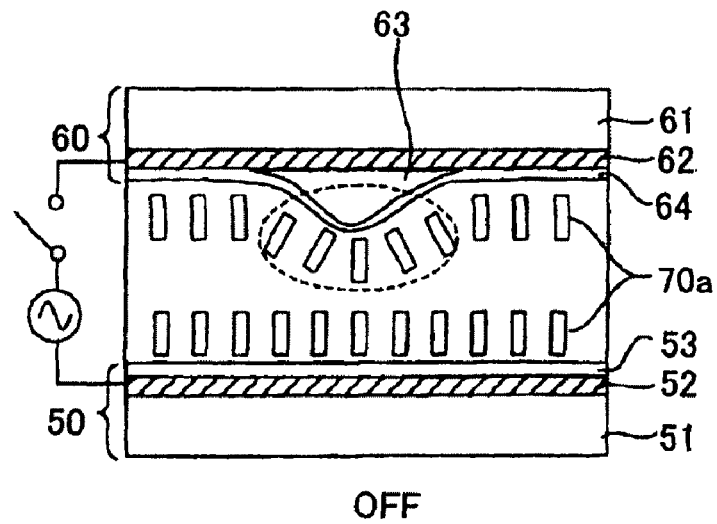
FIG. 3A is a model view depicting the operation of an MVA liquid crystal display apparatus.
Figure 3B:
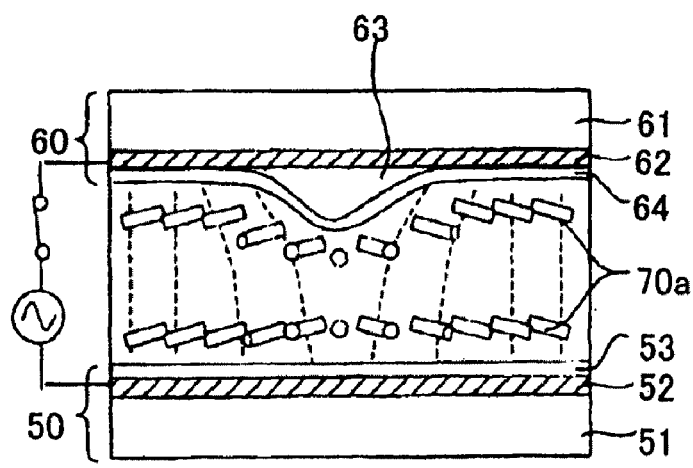
FIG. 3B is a model view depicting the operation of an MVA liquid crystal display apparatus.
Figure 4:
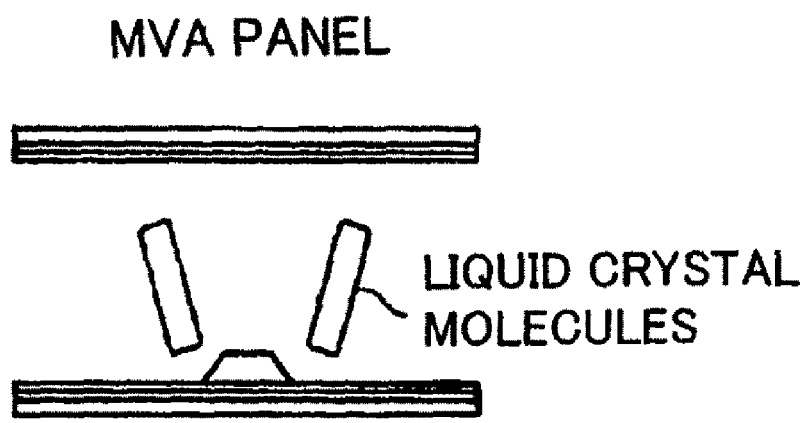
FIG. 4 is another view depicting an MVA type vertically aligned liquid crystal display apparatus based on the prior art.
Figure 5:
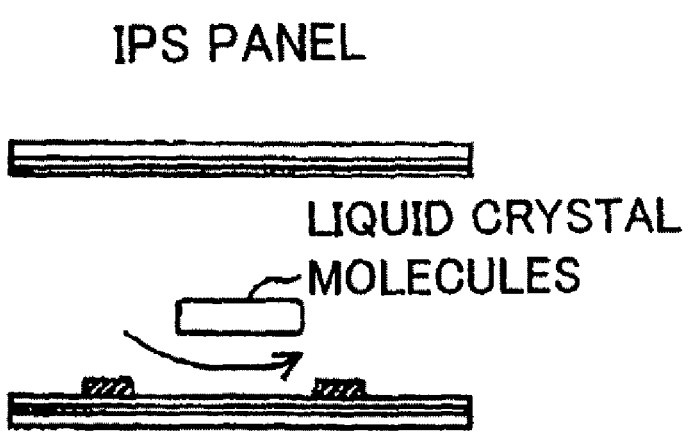
FIG. 5 is a view depicting a horizontal field switching type liquid crystal display apparatus based on the prior art.

Embodiments according to the present invention will be described with reference to the following figures, formulae, examples, etc. It is to be understood that these figures, formulae, examples, etc., plus the explanation below are for the purpose of illustrating the present invention, and do not limit the scope of the present invention. It goes without saying that other embodiments should also be included in the category of the present invention as far as they conform to the gist of the present invention. In the figures, the same sign indicates the same element.

A liquid crystal display apparatus according to the present invention has a liquid crystal layer and a pair of electrodes installed at both sides of the liquid crystal layer for applying voltage to a liquid crystal, sandwiched between a pair of substrates wherein the liquid crystal layer has a portion obtained by polymerizing a polymerizable compound in the presence of the liquid crystal, by selectively irradiating the substrate surface with an active energy ray at no voltage application, that is in a state in which no voltage is applied between the electrodes. This selective irradiation with an active energy ray will be called a "selective active energy ray irradiation". It is simple and easy to use a so-called photomask for the selective active energy ray irradiation, and the reliability is high. In addition, There is no particular limitation to the type of an active energy ray for use. Various rays such as UV rays can be used favorably. Other types of energy such as heat can be used together.

The liquid crystal layer before an active energy ray is irradiated onto the substrates is composed of a composition (liquid crystal composition) comprising a liquid crystal and a polymerizable compound, in which the liquid crystal and the polymerizable compound are coexisting. In contrast to this, when the polymerizable compound in the liquid crystal layer is selectively polymerized, the portions that reflect the pattern of the exposed areas turn to be a polymerized liquid crystal composition, and the portions that reflect the pattern of the shielded areas remain as a nonpolymerized liquid crystal composition, when observed from a direction vertical to the substrate.

Selective active energy ray irradiation is performed at no voltage application. Accordingly, the polymerizable compound in the liquid crystal composition that have been subjected to selective active energy ray irradiation is cross-linked (cured) while the liquid crystal is vertically aligned, which contributes to the final alignment and conformation of the liquid crystal in the liquid crystal layer. It was found that when such a pattern caused by a polymerized liquid crystal composition exists in a liquid crystal composition, a liquid crystal is aligned as being tilted towards the direction along the pattern.

Utilizing this, it is possible to regulate the tilting direction of a liquid crystal in domains other than the patterned domains by the polymerized liquid crystal composition, even without known technologies such as patterning of electrodes, installation of uneven parts and rubbing of a alignment control film. However, the present technology can be used together with patterning of electrodes, installation of uneven parts, rubbing of a alignment control film, etc.

Polymerization of the unpolymerized liquid crystal composition can be performed by irradiating with an active ray the entire surface of the substrate (entire surface active energy ray irradiation) at voltage application after the selective active energy ray irradiation. Accordingly, the unpolymerized liquid crystal composition polymerizes and the alignment with tilting towards the direction along the pattern of the polymerized liquid crystal composition is implemented.

There is no particular limitation to the polymerizable compound as long as it is polymerizable. So-called monomers and oligomers are acceptable. In the present invention, the term "monomer" can be constructed as such a polymerizable compound, as long as it is not out of the gist of the present invention.

This polymerization is mostly polymerization with cross-linking. However, other types of polymerization can be utilized. The polymerizable compound may be a mixture of plural types of compounds. If catalysts and other additives are needed, they can be used as components of the liquid crystal composition.

Whether a liquid crystal composition has been polymerized, and whether a necessary pattern has been acquired, can be determined by observing whether the liquid crystal shows alignment with tilting towards the direction along a specific pattern, when the unpolymerized liquid crystal composition is polymerized later. This "whether the liquid crystal shows alignment with tilting towards the direction along a specific pattern" can be determined by observing whether the liquid crystal layer after the irradiation with an active ray shows a light shielding pattern caused by alignment of specific liquid crystal molecules at voltage application.

For example, in one of the preferred embodiment of the present invention, that is, a liquid crystal display apparatus having a structure wherein a first polarizing element and a second polarizing element are installed on both surfaces of a pair of substrates with their absorption angles perpendicular to each other, a liquid crystal having a negative dielectric constant anisotropy is used for the liquid crystal layer, and the liquid crystal is aligned in the direction vertical to the substrate surface at no voltage application, the light that has passed the first polarizer is shielded by the second polarizer so that no light passes through the liquid crystal display apparatus, owing to the fact that the liquid crystal is aligned in the direction vertical to the substrate surface at no voltage application. On the other hand, when a voltage is applied, the portions where the liquid crystal is aligned with tilting in appropriate directions against the substrate surface, forming birefringence and the light can pass the apparatus.

At this stage, the portions polymerized by the entire surface active energy ray irradiation have a liquid crystal molecule alignment with tilting towards the pattern of the polymerized composition. Accordingly, if the pattern of the polymerized composition is appropriate, the portions where alignment with tilting towards proper directions transmit the light, while, in the areas polymerized by the selective active energy ray irradiation, portions having liquid crystal molecules with different tilting directions are present in a random manner, as such a pattern is not present for the liquid crystal molecules to go along, and light is not transmitted. In this way, there will appear a pattern that do not transmit light (light shielding pattern caused by liquid crystal alignment) in the areas corresponding to the selective active energy ray irradiation and part of the areas corresponding to the entire surface active energy ray irradiation.

The conditions for the voltage application to cause such a light shielding pattern by liquid crystal alignment in the liquid crystal layer are determined by whether the liquid crystal has a positive or negative dielectric constant anisotropy, whether the alignment control film is a vertical or horizontal alignment control film, etc. For example, if a liquid crystal has a negative dielectric constant anisotropy, and an alignment control film is a vertical alignment control film, the light shielding pattern of a liquid crystal layer caused by liquid crystal alignment appears when voltage is applied as described above. In this specification, explanation is sometimes made on a preferable embodiment case in which a liquid crystal having a negative dielectric constant anisotropy is used, and vertical alignment to the substrate occurs at no voltage application by installation of a vertical alignment control film, etc.

Figure 12A:
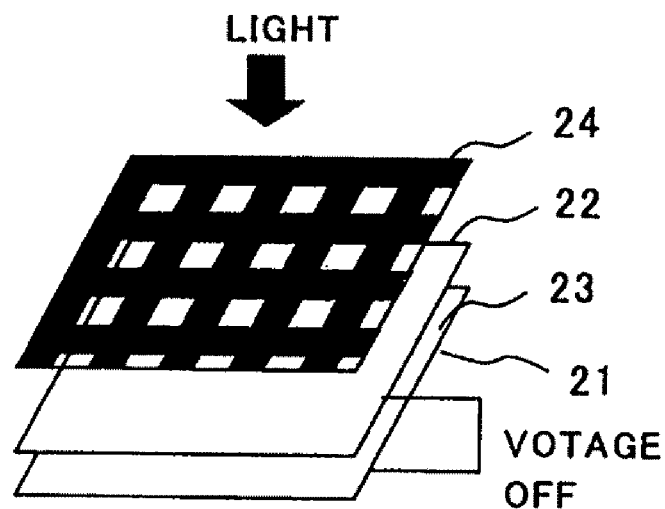
FIG. 12A is a model view for explaining an active energy ray irradiation treatment.
Figure 12B:
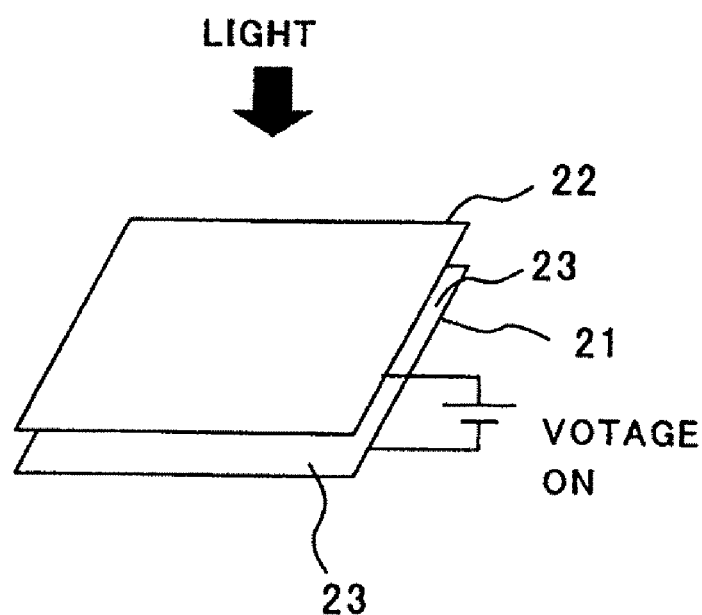
FIG. 12B is another model view for explaining an active energy ray irradiation treatment.

Such an active energy ray irradiating treatment can be performed by, in the case of manufacturing a liquid crystal display apparatus having a liquid crystal layer 23 and a pair of electrodes (not shown) installed at both sides of the liquid crystal layer sandwiched between a pair of substrates 21, 22, forming the liquid crystal layer by enclosing a liquid crystal composition comprising a liquid crystal and a polymerizable compound into the space between the substrates, selectively irradiating the substrate surface with an active energy ray at no voltage application to polymerize part of the polymerizable compound as shown in FIG. 12A, and by irradiating the entire substrate surface with an active energy ray at a voltage application to polymerize the polymerizable compound as shown in FIG. 12B.

According to the present invention, factors for quality fluctuation, complicated processes, lowered yield and high costs caused by employing fine-width electrode patterns can be eliminated by such a simple manufacturing method.

UV rays are simple and easy to handle and are preferable as an active energy ray. It is convenient and effective, for example, to apply a photomask 24 for the selective active energy ray irradiation.

Figure 13A:
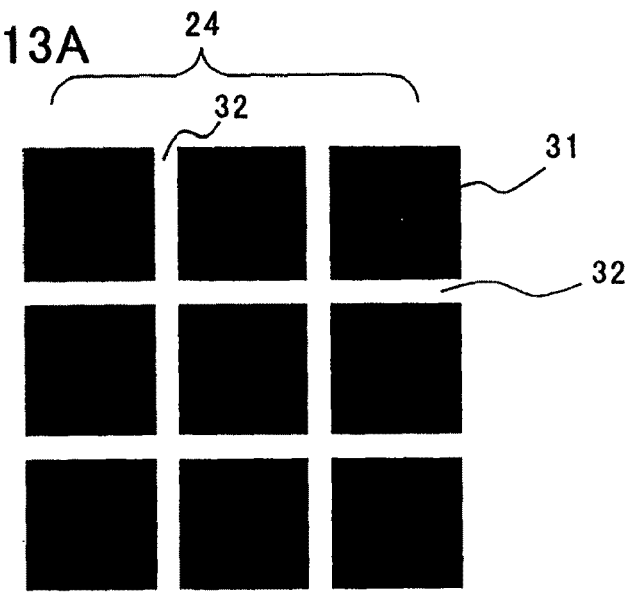
FIG. 13A is a model plan view depicting a photoresist.
Figure 13B:
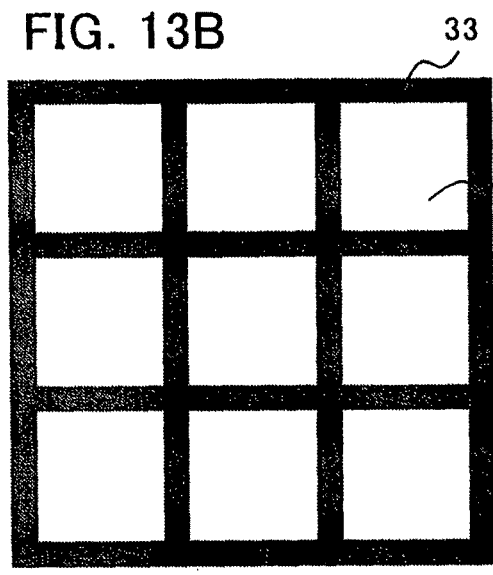
FIG. 13B is a model plan view depicting areas of polymerized liquid crystal composition corresponding to the openings by a photoresist.

For example, selective active energy ray irradiation is performed onto the substrate surface through a photomask 24 having light shielding parts 31 and openings 32 shown in FIG. 13A. By this, the compound in the areas corresponding to the openings 32 of the photoresist is polymerized and the areas 33 of the polymerized liquid crystal composition are formed as shown in FIG. 13B.

Figure 13C:
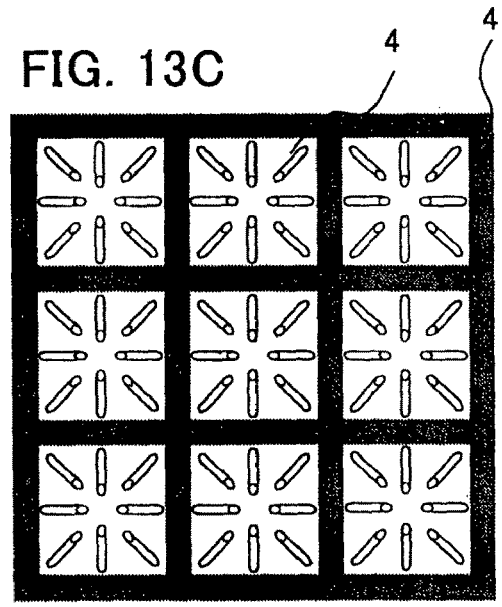
FIG. 13C is a model plan view depicting a state of liquid crystal molecules when the entire surface is irradiated with an active energy ray.

After that, when a voltage is applied, the liquid crystal is harder to be tilted in the areas 33 of the polymerized liquid crystal composition, than in the areas that have been located under the light shielding parts, that is, areas 34 of the unpolymerized liquid crystal composition. The crystal molecules 4 in the areas where the compound has not been polymerized are tilted mostly symmetrically about the light shielding parts, as shown in FIG. 13C. The compound is subjected to polymerization in this state by entire surface active energy ray irradiation.

Figure 14A:
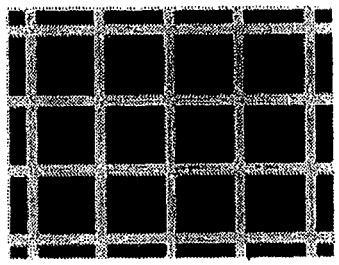
FIG. 14A is another model plan view depicting a photoresist.
Figure 14B:
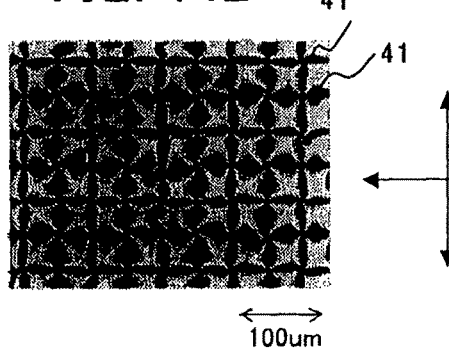
FIG. 14B is a model plan view depicting a state of alignment of a liquid crystal when a voltage is applied to a liquid crystal display apparatus.

A liquid crystal display apparatus was manufactured according to the present invention, actually using the photomask shown in FIG. 14A. FIG. 14B shows an alignment state of the liquid crystal when a voltage was applied to the liquid crystal display apparatus. It is to be noted that first and second polarizing element are installed so that the absorption angles are at right angles to each other. The black areas 41 correspond to the light shielding pattern of the liquid crystal layer caused by liquid crystal alignment.

Figure 16:
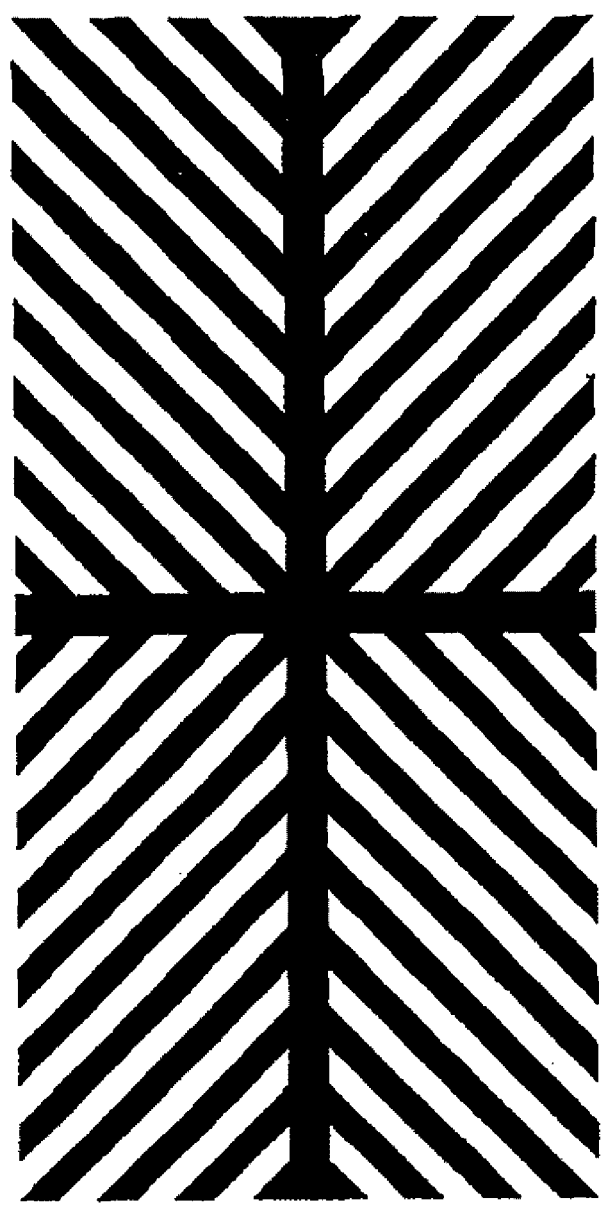
FIG. 16 shows another photomask pattern.

Various variations are possible for the photomask pattern, and can be chosen appropriately according to the purposes. For example, masks as shown in FIG. 15 having a latticework pattern so that the light shielding pattern of the liquid crystal layer by liquid crystal alignment comprises a similar latticework pattern are preferable. Also, as sown in FIG. 16, masks having a fine slit pattern composed of cross-shape basic parts and branching parts extending linearly to the periphery so that the light shielding pattern of the liquid crystal layer by the liquid crystal alignment comprises a similar pattern, are preferable. The pattern is used for patterning the electrodes in a conventional MVA liquid crystal apparatus. It is to be noted that the dark parts are the light shielding patterns and the bright (white) parts are openings in FIGS. 15 and 16.

It is preferable to choose the conditions of the above-described selective active energy ray irradiation so that the liquid crystal layer shows the above-described specific light shielding patterns by liquid crystal alignment when a voltage is applied after the active energy ray irradiation. Although a specific pattern can be chosen appropriately according to the practices, those comprising a latticework patterns and/or a pattern composed of cross-shape basic parts and branching parts extending linearly to the periphery, can be enumerated as preferable light shielding patterns of the liquid crystal layer caused by liquid crystal alignment. As conditions for the selective active energy ray irradiation to obtain such a specific light shielding pattern of the liquid crystal layer caused by liquid crystal alignment, types of active energy rays, intensity of active energy rays, irradiation angle of active energy rays, irradiation duration of active energy rays, pattern shapes of a photomask, position of a photomask to be installed, etc. can be enumerated.

When the active energy ray is a UV ray, an intensity of 0.5-10 J/cm$^2$ is preferable for the selective active energy ray irradiation, while an intensity of 2-40 J/cm$^2$ is preferable for the entire surface active energy ray irradiation. In this way, alignment with a specific tilting direction is realized quickly and precisely.

The widths of the light shielding parts and openings of a photomask are preferably in the range of from 2 to 100 μm, respectively. In this way, alignment with an appropriate tilting direction according to the present invention is easily realized.

When the irradiation with an active energy ray is performed along a direction tilted against the normal line direction of the substrates, a liquid crystal tends to be tilted along the direction of the active energy ray irradiation. When the above-described active energy ray irradiation is performed along a specific direction tilted against the normal line direction of the substrates, the tilting direction of a liquid crystal is more easily regulated and may be preferable. A specific direction thus tilted can be arbitrarily set according to the practice. The active energy ray irradiation along a specific tilted direction can be applied to the selective active energy ray irradiation as well as the entire surface active energy ray irradiation.

Figure 17:
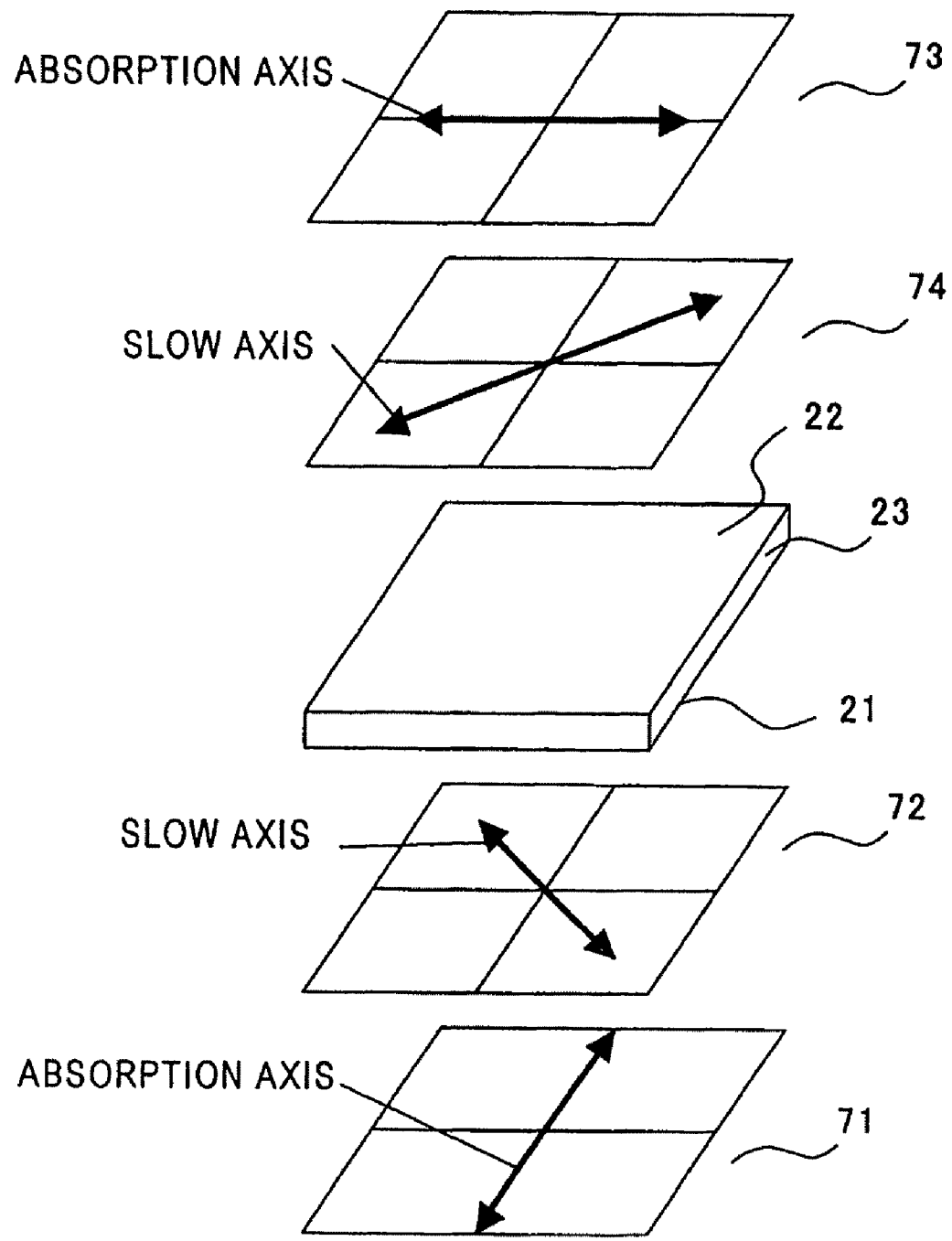
FIG. 17 shows how polarizing elements and ¼ wavelength plates are placed.

There are cases in which areas with a lowered light transmittance come to appear by active energy ray irradiation along a specific tilted direction or the like. However, the lowered light transmittance can be improved, as shown in FIG. 17, by installing a first ¼ wavelength plate 72 between one of the substrates 21 and a first polarizing element 71, installing a second ¼ wavelength plate 74 between the other substrate 22 and a second polarizing element 73, installing the absorption axis of the first polarizing element 71 and the slow axis of the first ¼ wavelength plate 72 so that they form an angle of 45 degrees to each other, installing the absorption axis of the second polarizing element 73 and the slow axis of the second ¼ wavelength plate 74 so that they form an angle of 45 degrees to each other, and installing the slow axis of first ¼ wavelength plate 72 and the slow axis of the second ¼ wavelength plate 74 so that they are perpendicular to each other (Iwaki, Togo, and Iimura, 2000 year Nihon Liquid Crystal Gakkai, Toronkai, Yoko-shu, PCa02, 2,000), and as a result, it was possible to improve the light transmittance as a whole. For example, the transmittance of the areas having a low transmittance as shown in shaded parts in FIG. 14B, can be improved by applying such ¼ wavelength plates.

In the arrangement shown in FIG. 17, when the intensity of an incident ray is $I_{in}$, the intensity of a transmitted ray is $I_{out}$ and the retardation of a liquid crystal layer is $R_{LC}$, the following relationship holds. That is, the intensity of a transmitted ray is determined only by $R_{LC}$ and is not dependent on the tilting direction of the liquid crystal.

$$I_{out} = \frac{1}{2} I_{in} \sin^2(R_{LC}/2)$$

There is no particular limitation to the polymerizable compound for use in the liquid crystal composition according to the present invention, and any known polymerizable compound that is used together with a liquid crystal in a liquid crystal display apparatus can be applied. Cross-linkable, polymerizable compounds are generally preferable. Diacrylate compounds are examples.

There is no particular limitation to the liquid crystal for use in the liquid crystal composition according to the present invention, and any known liquid crystal can be used, as long as it is not out of the gist of the present invention. Nematic liquid crystals having a negative dielectric constant anisotropy as have already been explained are exemplified for a favorable liquid crystal.

Accordingly, the liquid crystal display apparatus according to the present invention can realize the same levels of high transmittance, high speed response and wide visual angle characteristics as, or higher levels than those of the liquid crystal display apparatus by the conventional technologies such as patterning of electrodes, uneven parts and rubbing of the alignment control film.

Also, according to the method for manufacturing a liquid crystal display apparatus according to the present invention, simplified production processes can be realized, and factors for quality fluctuation, complicated processes, lowered yield and high costs can be removed.

A liquid crystal display apparatus according to the present invention can be utilized as a liquid crystal display apparatus, most typically, such as a display apparatus for a personal computer and a television receiver, by attaching drive units, etc. It goes without saying that the liquid crystal display apparatus can be utilized for any other applications where the function to control the manner of light transmission by means of a liquid crystal is needed. For example, liquid crystal shutters, liquid crystal projectors, photochromic glasses and displays for portable information terminals are enumerated.

It is to be noted that this aspect according to the present invention is also effective when a horizontal alignment control film is used and a liquid crystal having a positive dielectric constant anisotropy is used.

EXAMPLES

The following are detailed descriptions of examples regarding the first aspect of the present invention.

Example 1

Figure 18A:
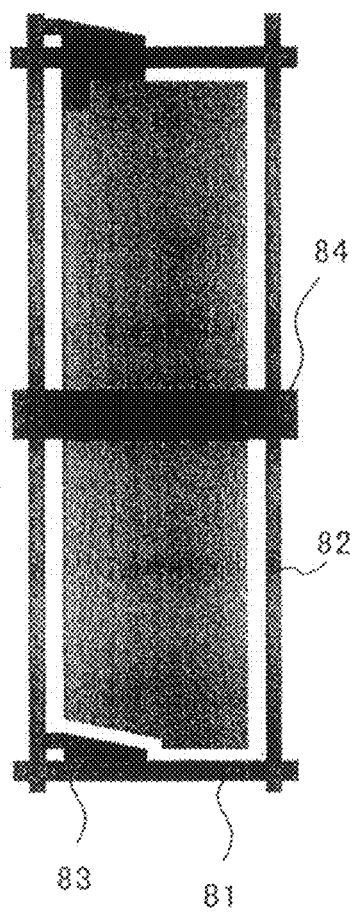
FIG. 18A is a plan view illustrating the pixel structure of a liquid crystal display apparatus according to an embodiment of the present invention.

FIG. 18A is a plan view illustrating the pixel structure of a liquid crystal display apparatus according to the first aspect of the present invention. Gate bus lines 81 and data bus lines 82 arranged in the shape of a matrix are formed, wherein the gate bus lines 81, the data bus lines 82 are connected to pixel electrodes through TFT elements 83. Auxiliary capacity electrodes 84 are formed across the centers of pixel electrode. Color filters and a common electrode that cover the whole display region (both being not shown) are formed on the other substrate (not shown).

First, vertical alignment control films were formed on both substrates. Patterning of the electrodes, installation uneven parts and rubbing of the alignment control films were not employed.

Then, both substrates are bonded together with spacers in between, a liquid crystal composition obtained by mixing 0.3% by weight of a diacrylate polymerizable compound in a nematic liquid crystal having a negative dielectric constant anisotropy is introduced into the space to form a liquid crystal display apparatus.

Figure 18B:
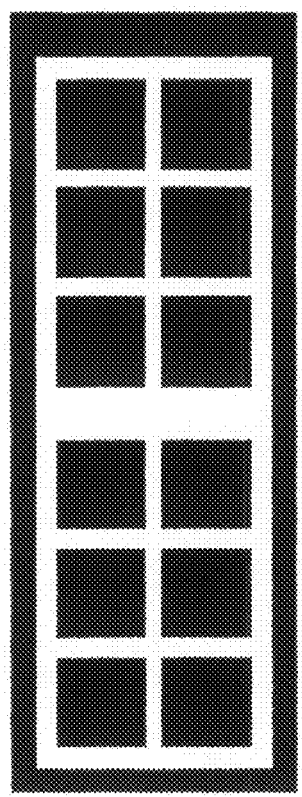
FIG. 18B is a model plan view depicting a photoresist for an example according to the present invention.
Figure 18C:
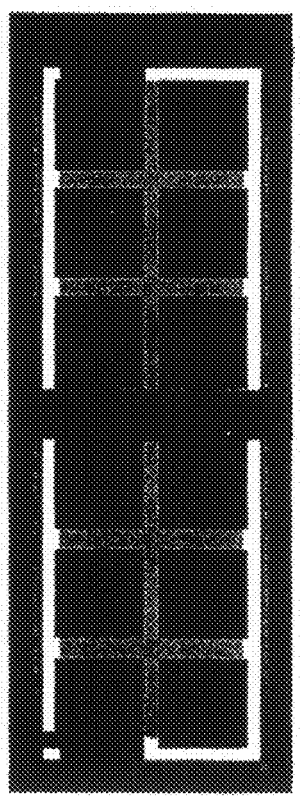
FIG. 18C is a model plan view depicting a liquid crystal display apparatus and a photomask overlaid thereon.

Next, a photomask shown in FIG. 18B was placed over the liquid crystal display as shown in FIG. 18C, UV rays were irradiated selectively on the substrate surface through the photomask at 2 J/cm², while no voltage was applied to the liquid crystal layer so as to polymerize part of the polymerizable compound.

After that, the photomask was removed, UV rays were irradiated on the whole substrate surface at 4 J/cm², while a voltage of 20 V was applied to the liquid crystal layer so as to polymerize the polymerizable compound.

Polarizing elements were arranged on both the sides of the liquid crystal display apparatus so that their absorption axes were perpendicular to each other, a ¼ wavelength plate was placed between the liquid crystal display apparatus and each polarizing element so that each of the slow axes of the ¼ wavelength plates and each of the absorption axes of the adjacent polarizing elements made 45 degrees, and both of the slow axes of the ¼ wavelength plates were perpendicular each other.

Example 2

Figure 19A:
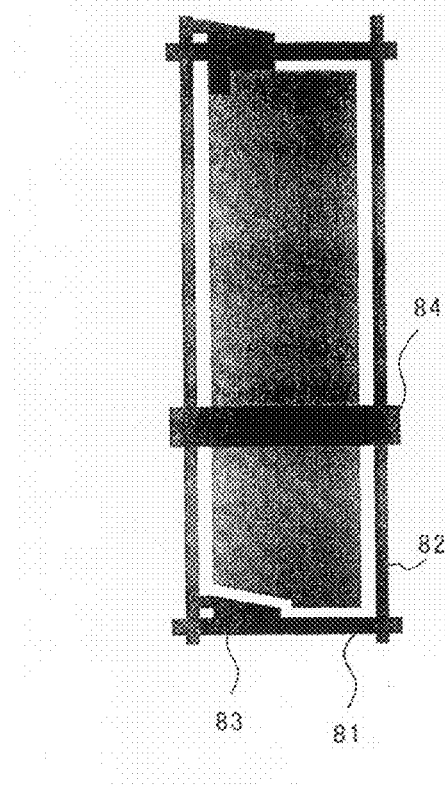
FIG. 19A is another plan view illustrating the pixel structure of a liquid crystal display apparatus according to an embodiment of the present invention.
Figure 19B:
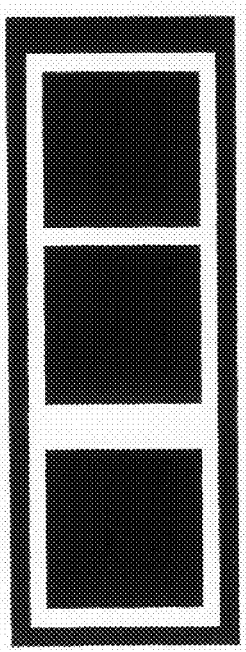
FIG. 19B is another model plan view depicting a photoresist for an example according to an embodiment of the present invention.
Figure 19C:
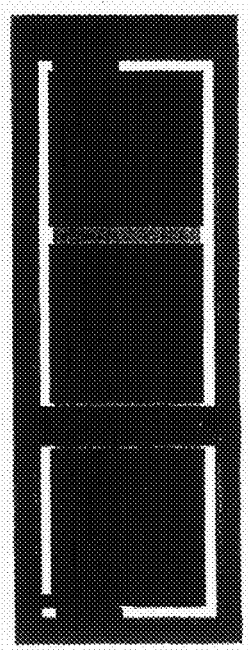
FIG. 19C is another model plan view depicting a liquid crystal display apparatus and a photomask overlaid thereon.

The same experiment as for EXAMPLE 1 was performed except that the pixel structure of FIG. 19A was employed instead of the pixel structure of FIG. 18A, the photomask of FIG. 19B was employed instead of the photomask of FIG. 18B and the overlaying according to FIG. 19C was performed instead of the overlaying according to FIG. 18C, so as to form a liquid crystal display apparatus.

Example 3

Figure 20A:
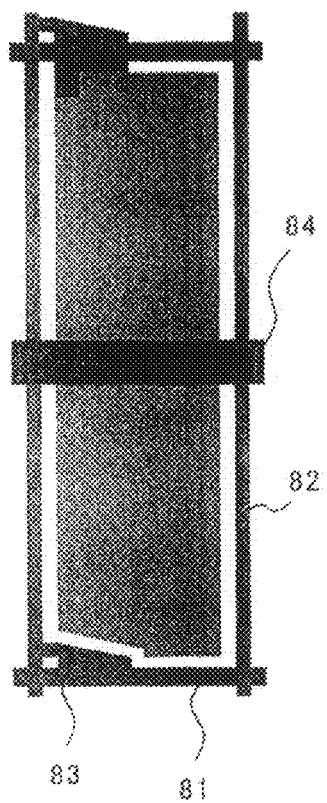
FIG. 20A is another plan view illustrating the pixel structure of a liquid crystal display apparatus according to an embodiment of the present invention.
Figure 20B:
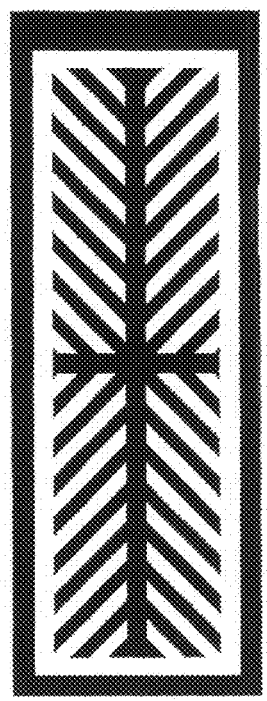
FIG. 20B is another model plan view depicting a photoresist for an example according to an embodiment of the present invention.
Figure 20C:
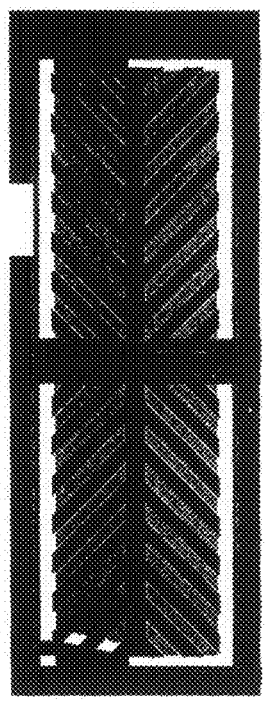
FIG. 20C is another model plan view depicting a liquid crystal display apparatus and a photomask overlaid thereon.

The same experiment as for EXAMPLE 1 was performed except that the pixel structure of FIG. 20A was employed instead of the pixel structure of FIG. 18A, the photomask of FIG. 20B was employed instead of the photomask of FIG. 18B and the overlaying according to FIG. 20C was performed instead of the overlaying according to FIG. 18C, so as to form a liquid crystal display apparatus. The photomask shown in FIG. 20B had a light shielding part width/opening width of 3 μm/3 μm.

As a result of the above-described experiments, in all the cases, the switching response velocities at rising/descending between white color and black color were 20 milliseconds, compared with 25 milliseconds of the conventional MVA system in which patterning of electrodes were employed, the overall transmittance was 1.3 times the value of the conventional system, and the wide visual angle properties were on the same level or better. That is, a liquid crystal display apparatus was realized that had the same levels of high transmittance, high speed response and wide visual angle characteristics as, or higher levels than those of the liquid crystal display apparatus by the conventional technologies such as patterning of electrodes, uneven parts and rubbing of the alignment control film.

Embodiments of the second aspect of the present invention will now be described with reference to the accompanying drawings.

Embodiment 1

Figure 6:
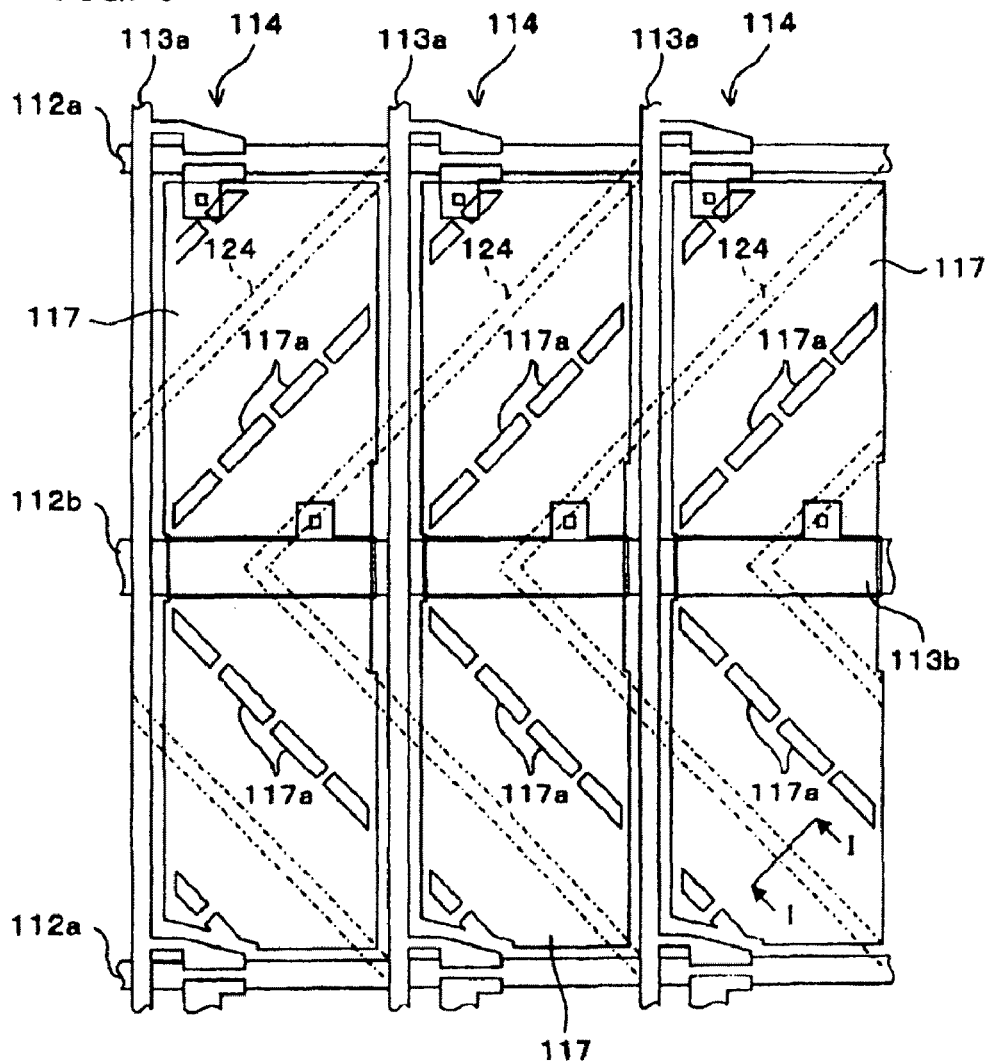
FIG. 6 is a plan view depicting a liquid crystal display apparatus (MVA liquid crystal apparatus) according to an embodiment of the present invention.
Figure 7:
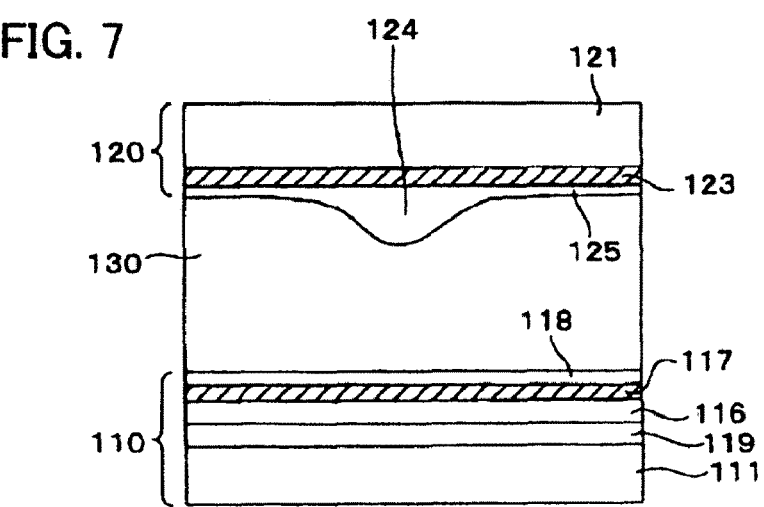
FIG. 7 is a cross-sectional view along the I-I line in FIG. 6.

FIG. 6 is a plan view depicting a liquid crystal display apparatus (MVA liquid crystal apparatus) according to EMBODIMENT 1 of the second aspect of the present invention, and FIG. 7 is a cross-sectional view along the I-I line in FIG. 6.

As FIG. 7 shows, the MVA liquid crystal apparatus of the present embodiment is comprised of a TFT substrate 110 and a counter substrate 120, between which a liquid crystal 130, of which the dielectric constant anisotropy is negative, is sealed. Under the TFT substrate 110 and above the counter substrate 120, polarizing plates (not illustrated) are disposed respectively such that the polarizing axes are perpendicular to each other.

The TFT substrate 110 is comprised of a glass substrate 111, a gate bus line 112a, an auxiliary capacity bus line 112b, a data bus line 113a, an auxiliary capacity electrode 113b, TFT 114 and pixel electrodes 117, which are formed on the glass substrate 111, as shown in FIG. 6 and FIG. 7. As FIG. 6 shows, the gate bus line 112a extends in the horizontal direction and the data bus line 113a extends in the vertical direction. The gate bus line 112a and the data bus line 113a are electrically separated by a gate insulation film (not illustrated) which exists between them. The area partitioned by the gate bus line 112a and the data bus line 113a is a respective sub-pixel. As mentioned later, one color filter, red (R), green (G) or blue (B) is disposed in one sub-pixel, and one pixel is comprised of three adjacent sub-pixels of red, green and blue.

The auxiliary capacity bus line 112b is formed on the same wiring layer as the gate bus line 112a, so as to cross the center section of the pixels.

In each pixel, the TFT 114, pixel electrodes 117 and auxiliary capacity electrode 113b are formed. The TFT 114 is disposed near the section where the gate bus line 112a and the data bus line 113a cross, the source electrode thereof is electrically connected to the pixel electrodes 116 via a contact hole, and the drain electrode is electrically connected to the data bus line 113a.

The auxiliary capacity electrode 113b is formed on the same wiring layer as the data bus line 113a, and is disposed on the auxiliary capacity bus line 112b via the insulation film. The auxiliary capacity electrode 113b as well is electrically connected to the pixel electrodes 117 via the contact hole.

The pixel electrodes 117 is made of a transparent conductor, such as ITO, and is formed on the insulation film 116, which covers the gate bus line 112a, data bus line 113a, auxiliary capacity electrode 113b and TFT 114 as shown in FIG. 7. On this pixel electrodes 117, slits 117a for domain regulation are formed. These slits 117a are formed along the zigzag lines on the gate bus line 112a and auxiliary capacity bus line 112b, as shown in FIG. 6. The surfaces of the pixel electrodes 117 are covered with an alignment control layer 118, which is formed by reacting and polymerizing the reactive monomer added to the liquid crystal 130.

The counter substrate 120, on the other hand, is comprised of a glass substrate 121 and a black matrix (not illustrated), color filters, 122, and a common electrode 123 which are formed under the glass substrate 121, as shown in FIG. 7. There are three types of color filters 122: red (R), green (G) and blue (B), and one of the color filters 122, red (R), green (G) or blue (B) is disposed in each pixel.

The surface of the color filter 122 is covered with the common electrode 123, which is made of a transparent conductor, such as ITO. Under the common electrode 123, bumps 124 for domain regulation are formed. These bumps 124 are disposed between the rows of slits 117a of the pixel electrodes 117, as shown by the dash and dotted line in FIG. 6.

The surface of the common electrode 123 is covered with the alignment control layer 125. The bumps 124 and the alignment control layer 125 are both formed by polymerizing a reactive monomer added to the liquid crystal 130.

Now the manufacturing method of a liquid crystal display apparatus of the present embodiment will be described. At first, the creation of the TFT substrate 120 will be described.

Initially, a glass substrate (e.g. OA-2 made by Nippon Electric Glass Co. Ltd.) 111 having a thickness of 0.7 mm, for example, is prepared. And a first metal film is formed on the glass substrate 111 by a PVD (Physical Vapor Deposition) method, then the first metal film is patterned by a photolithography method to form the gate bus line 112a and the auxiliary capacity bus line 112b. Then the gate insulation film is formed on the entire top face of the glass substrate 111, and on top of this, the first silicon film to be the operation layer of the TFT 114 and a SiN film to be a channel protective film are formed sequentially. Then the SiN film is patterned by a photolithography method to form the channel protective film for protecting the channels of the TFT 114 at a specific area above the gate bus line 112a.

Then on the entire top face of the glass substrate 111, the second silicon film, to be an ohmic contact layer where impurities are introduced at high density, is formed, and on the second silicon film, the second metal film is formed. And by a photolithography method, the second metal film, second silicon film and first silicon film are patterned to define the shape of the silicon film to be the operation layer of the TFT 114, and to form the data bus line 113a, auxiliary capacity electrode 113b, and source electrode and drain electrode of the TFT 114.

Then the insulation film 116 is formed on the entire top face of the glass substrate 111, and a contact hole, to reach the auxiliary capacity electrode 113b and the source electrode of TFT 114, is formed respectively at a specific position of the insulation film 116. Then on the entire top face of the glass substrate 111, a film made of a transparent conductor, such as ITO, is formed. And by patterning this transparent conductor film, the pixel electrodes 117, which are electrically connected to the auxiliary capacity electrodes 113b and the source electrodes of the TFT 114 via the contact hole, are formed. At this time, the slits 117a for domain regulation are also formed in the pixel electrodes 117. In this way, the TFT substrate 110 is completed.

Now the manufacturing method of the counter substrate 120 will be described. At first, a metal film made of Cr, for example, is formed on the glass substrate 121, which thickness is 0.7 mm, for example, and this metal film is patterned to form a black matrix. Then the color filters 122 are formed on the glass substrate 121. At this time, it is designed such that one color of the color filters 122, red, green or blue, is disposed on each pixel Then on these color filters 122, the common electrode 123 is formed using a transparent conductor such as ITO. In this way, the counter substrate 120 is completed.

Then the liquid crystal 130 having a negative dielectric constant anisotropy, to which a photo-reactive monomer having a liquid crystal aligning capability is added, is introduced between the TFT substrate 110 and the counter substrate 120 by a vacuum injection method or dropping injection method. In this case, resin spacers which diameter is 4 µm, for example, are placed between the TFT substrate 110 and the counter substrate 120, so as to maintain a constant space (cell gap) between the TFT substrate 110 and the counter substrate 120.

For the reactive monomer having a liquid crystal aligning capability, a photo-reactive acrylate or methacrylate which has an alkyl side chain or fluorine group can be used. The adding amount of the reactive monomer which have a liquid crystal aligning capability is several percent by weight (e.g. 2% by weight). In the liquid crystal 130, a photopolymerization initiator or a monomer which does not have a vertical aligning capability may be used. In this specification, the structure formed by bonding the TFT substrate and the counter substrate is called a "panel".

Figure 8A:
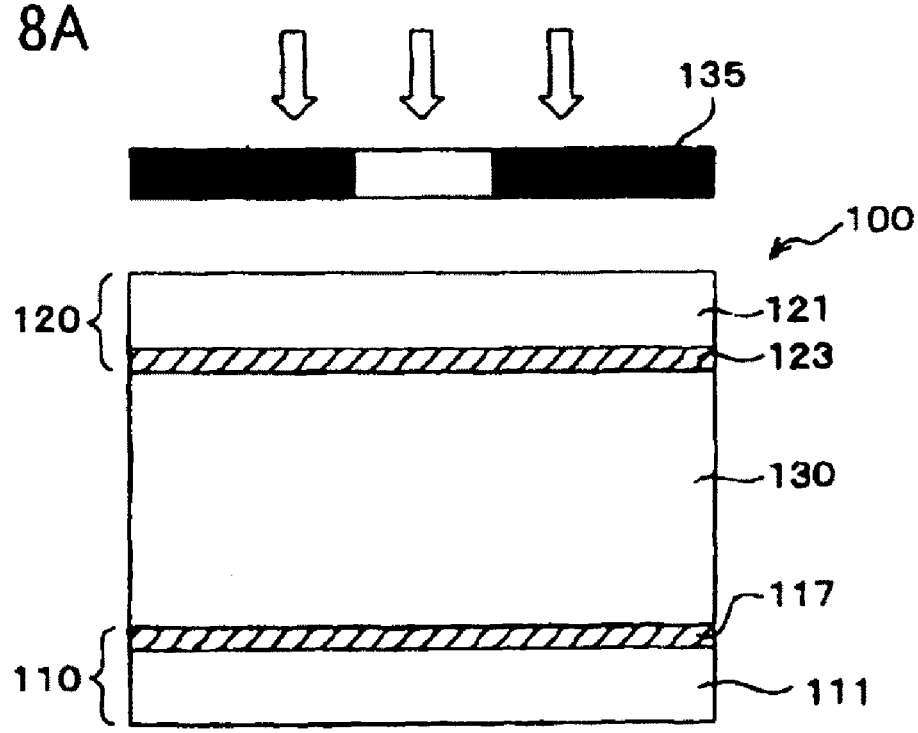
FIG. 8A is a cross-sectional view for explaining the process for forming bumps and alignment control films.
Figure 8B:
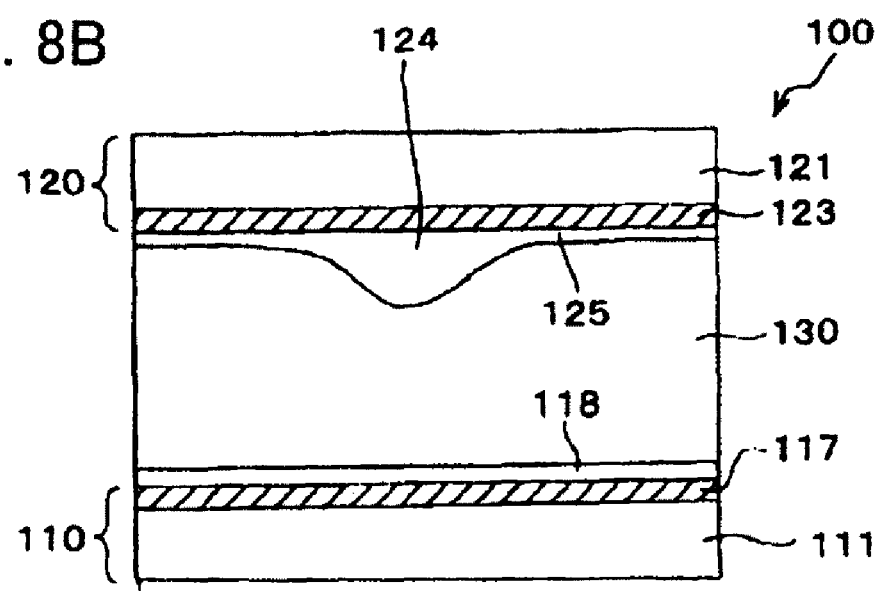
FIG. 8B is another cross-sectional view for explaining the process for forming bumps and alignment control films.
Figure 9:
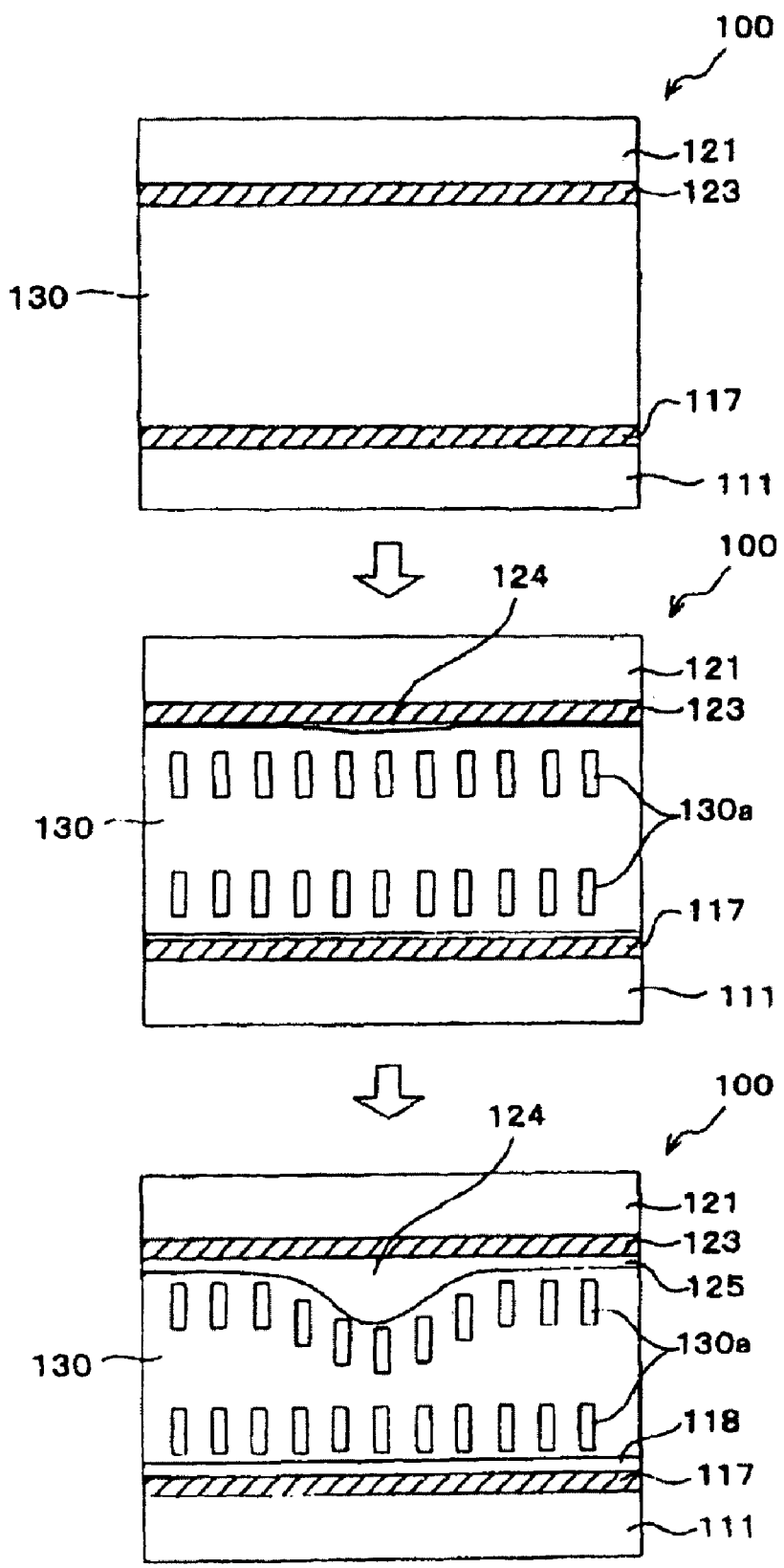
FIG. 9 is a set of model views depicting the manufacturing method of a liquid crystal display apparatus according to an embodiment of the present invention.

Now a step of forming the bumps 124 and the alignment control layers 118 and 125 will be described with reference to FIGS. 8A, 8B and 9. In FIGS. 8A, 8B and 9, the insulation film 116 and the color filters 122 are omitted.

As FIG. 8A shows, after the liquid crystal 130 to which a reactive monomer is added is sealed in a panel 100, UV rays are irradiated onto the panel 100 at a 500 mJ/cm$^2$ energy density, for example, using a filter (mask) 135, on which light transmission parts with a stripe pattern, where the width is 10 µm and the pitch is 25 µm, for example, are formed. By this, monomer molecules at the portions where UV rays are irradiated are polymerized preferentially and grow, and the bumps 124 as shown in FIG. 8B are formed.

In this case, as FIG. 9 shows, the liquid crystal molecules 130a align roughly vertically from the substrate face at the initial stage of the bump 124 formation, and the bumps 124 grow, maintaining this alignment status. Therefore even after the bumps 124 are completed, the liquid crystal molecules 130a near the bumps 124 are aligned roughly vertically from the substrate face.

Then UV rays are irradiated onto the entire surface of the panel 100 at an energy weaker than the first irradiation. By this, the remaining monomer molecules in the liquid crystal 130 are polymerized, and the thin alignment control layers 118 and 125 are formed on the entire surface of the TFT substrate 110 and the counter substrate 120.

Depending on the monomer, the alignment control layer may be formed without irradiating UV rays, since it polymerizes naturally over time, so a second UV rays irradiation is not an essential step. Instead of the filter 135, a filter, where the portions corresponding to the bump formation areas are transparent and the rest of it is translucent, may be used so that the bumps 124 and the alignment control layers 118 and 125 are formed at the same time.

In the above embodiment, after sealing the liquid crystal 130, to which the reactive monomer is added, between the TFT substrate 110 and the counter substrate 120, the bumps 124 are formed at specific areas by selectively irradiating UV rays, as described above, so the manufacturing step is simplified compared with prior art, which forms bumps using a photoresist. Also the liquid crystal molecules 130a near the bumps 124 align in a roughly vertical direction from the substrate face when no voltage is applied, so the leaking of light can be decreased remarkably. By this, the contrast characteristics can be further improved.

In the case of an MVA liquid crystal apparatus according to the present embodiment, alignment division (multi-domain) is implemented using the difference of dielectric constants between the liquid crystal 130 and the bumps 124. In other words, when no voltage is applied, the liquid crystal molecules near the bumps 124 align roughly vertically from the substrate face, but if voltage is applied between the pixel electrodes 117 and the common electrode 123, the electric field near the surface of the bumps 124 distorts since the dielectric constants are different between the liquid crystal 130 and the bumps 124, and the direction of the electric field becomes diagonal with respect to the substrate face. Since the cross-section of a bump 124 is roughly symmetrical with respect to the center line thereof, the tilting directions of the liquid crystal molecules differ depending on which side of the bump 130 the liquid crystal molecules exist, and alignment division (multi-domain) is implemented. As a result, the liquid crystal display apparatus of the present embodiment can provide good viewing angle characteristics similar to that of conventional MVA liquid crystal display apparatus.

Embodiment 2

Figure 10A:
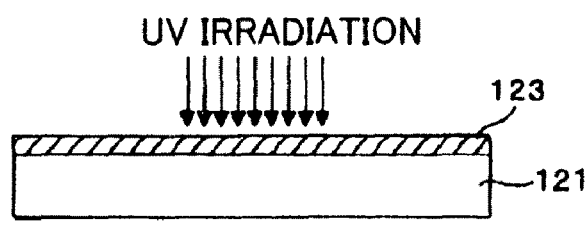
FIG. 10A is a model cross-sectional view showing the manufacturing method of the liquid crystal display according to an embodiment of the present invention.
Figure 10B:
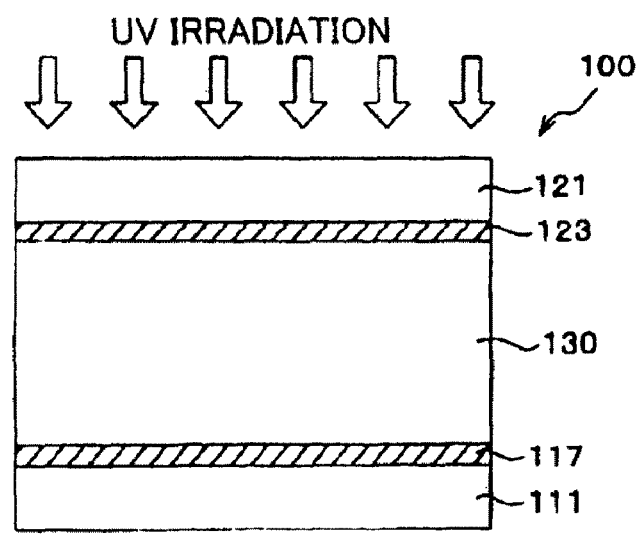
FIG. 10B is another model cross-sectional view showing the manufacturing method of the liquid crystal display according to an embodiment of the present invention.
Figure 10C:
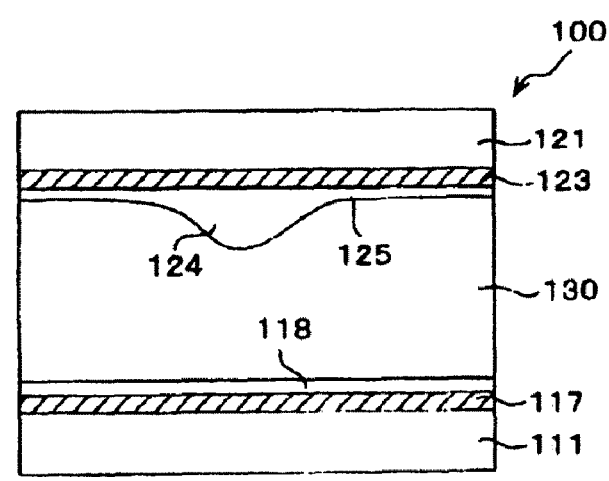
FIG. 10C is another model cross-sectional view showing the manufacturing method of the liquid crystal display according to an embodiment of the present invention.

FIGS. 10A-10C are model diagrams depicting the manufacturing method of the liquid crystal display apparatus according to EMBODIMENT 2 of the second aspect of the present invention.

At first, just like EMBODIMENT 1, the TFT substrate 110 and the counter substrate 120 are formed. And as FIG. 10A shows, UV rays are irradiated onto the bump formation areas of the TFT substrate 110 and the counter substrate 120 (only the counter substrate is shown in FIG. 10A) at high energy density. In the present embodiment, it is assumed that UV rays with a central wavelength of 254 nm are irradiated onto the bump formation areas at a 5000 mJ/cm² energy density. By this, the surface energy (surface tension) at the areas where UV rays were irradiated becomes higher than the surface energy of the other areas.

Then, as FIG. 10B shows, the panel 100 is formed by disposing the TFT substrate 110 and the counter substrate 120 with spacers in between, just like EMBODIMENT 1, and sealing the liquid crystal 130 having a negative dielectric constant anisotropy to which a reactive monomer is added, between the substrates. Then on the entire surface of the panel 100, UV rays, of which the central wavelength is 365 nm are irradiated at 500 mJ/cm², for example.

By this, as FIG. 10C shows, the monomer in the liquid crystal 130 deposits on the surface of the TFT substrate 110 and the counter substrate 120, and is polymerized by UV rays, and the alignment control layers 118 and 125 are formed. In this case, the deposition amount of the monomer is higher in the areas where the surface energy is high compared with other areas, and as a result, the bumps 124 are formed on the alignment control layers 118 and 125 simultaneously. In the present embodiment as well, the same effect as EMBODIMENT 1 can be implemented.

In the above example, UV rays are irradiated at a higher energy density so that the surface energy of the bump formation areas of the substrate becomes higher than the surface energy of the other areas, but the surface energy of the bump formation areas may be changed by other methods. For example, the surface energy of the bump formation areas can be made higher than the other areas by such a method as exposing to plasma or by contacting a chemical such as an acid.

Embodiment 3

Figure 11A:
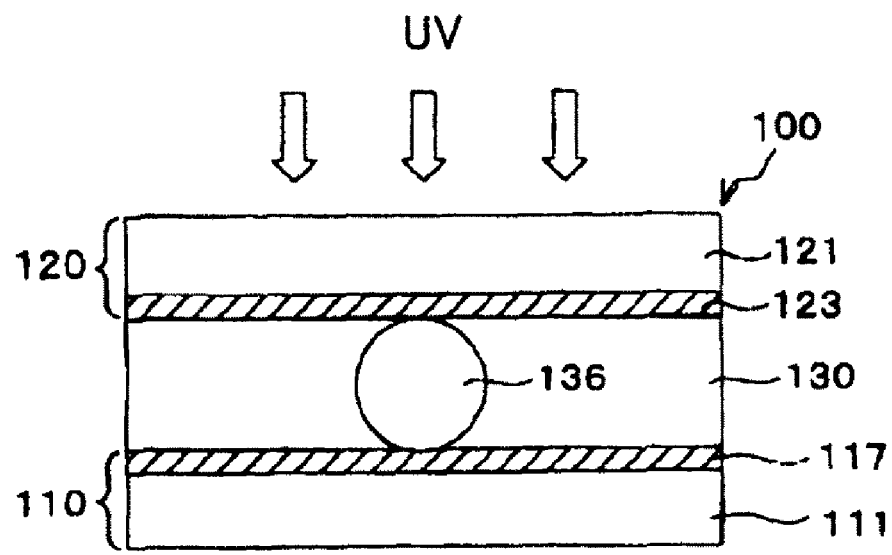
FIGS. 11A is a model cross-sectional view showing the manufacturing method of the liquid crystal display according to an embodiment of the present invention.
Figure 11B:
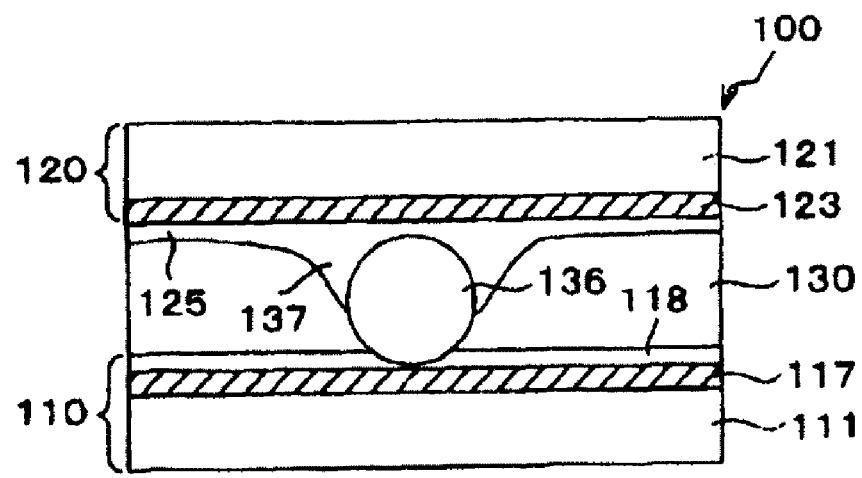
FIGS. 11B is another model cross-sectional view showing the manufacturing method of the liquid crystal display according to an embodiment of the present invention.

FIGS. 11A and 11B are model cross-sectional views showing the manufacturing method of the liquid crystal display according to EMBODIMENT 3 of the second aspect of the present invention.

In the present embodiment, the resin spacers 136 are selectively disposed at the bump formation areas, as shown in FIG. 11A. For example, if electrodes in a pattern shape of the bump formation areas are disposed under the substrate (TFT substrate 110 or counter substrate 120), and spacers are dispersed on the substrates while applying voltage to these electrodes, the spacers 136 can be disposed only at the electrode sections by static electricity.

Also the spacers 136 may be added to an ink, so that the spacers 136 are disposed at specific sections by ejecting this ink from the head of an inkjet printer to the surface of the substrate (TFT substrate or counter substrate). Also an adhesive may be coated in a specific pattern on the substrate so that the spacers 136 are dispersed, then spacers which are not fixed with the adhesive are removed.

In this way, the spacers 136 are disposed at the bump formation areas, then the panel 100 is formed by sealing the liquid crystal 130, to which a reactive monomer is added, between the TFT substrate 110 and the counter substrate 120, just like EMBODIMENT 1. Then UV rays with a central wavelength of 365 nm are irradiated onto the entire panel at 500 mJ/cm² energy density, for example. Since the reactive monomer has the nature to easily attach to the surface of resin spacers, the monomer is polymerized with the spacers 136 as cores, and the bumps 137 are formed, as FIG. 11B shows. Also by irradiating UV rays, thin alignment control layers 118 and 125 are formed on the surfaces of the pixel electrodes 117 and the common electrode 123. In the present embodiment as well, the same effect as EMBODIMENT 1 is implemented.

Embodiment 4

Figure 48A:
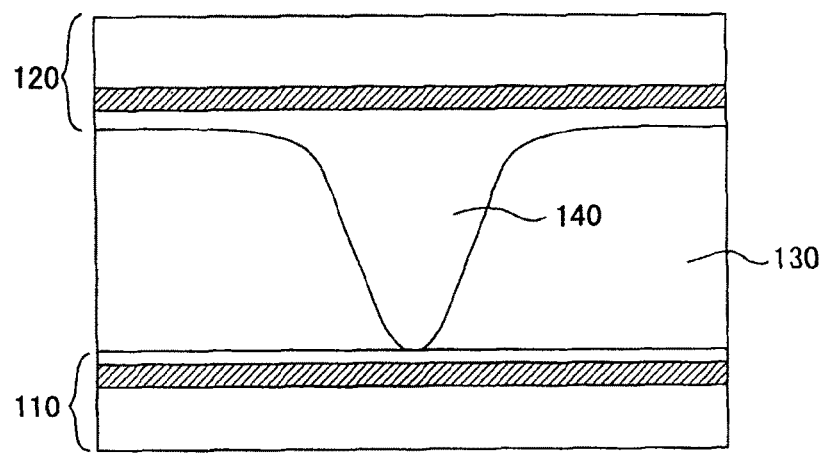
FIG. 48A is a cross-sectional view illustrating a method for manufacturing a liquid crystal display apparatus according to one embodiment of the present invention.
Figure 48B:
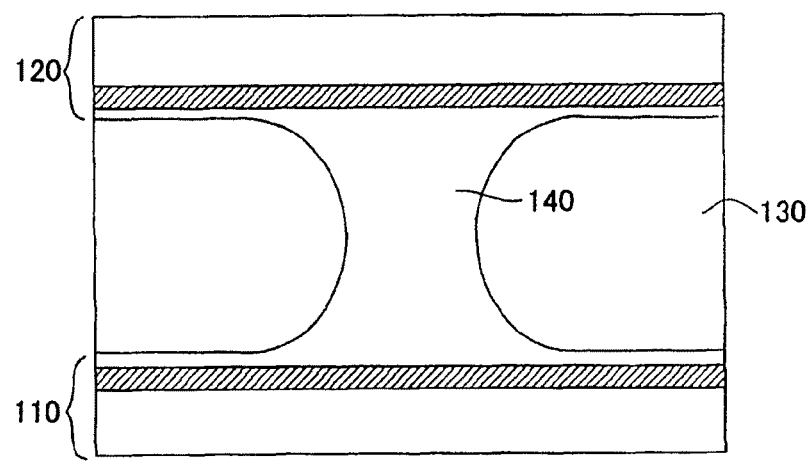
FIG. 48B is another cross-sectional view illustrating a method for manufacturing a liquid crystal display apparatus according to one embodiment of the present invention.
Figure 49:
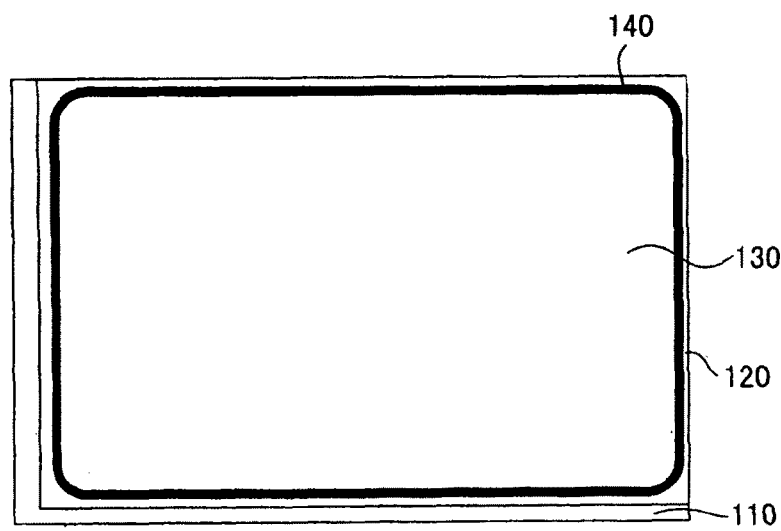
FIG. 49 is a plan view illustrating a method for manufacturing a liquid crystal display apparatus according to one embodiment of the present invention.

FIGS. 48, 48B and 49 illustrate the manufacturing method of a liquid crystal display apparatus according to EMBODIMENT 4 of the second aspect of the present invention.

In this embodiment, a TFT substrate and a counter substrate 120 are disposed with spacers in between. A liquid crystal having a negative dielectric constant anisotropy added with a reactive monomer is filled between these substrates 110 and 120. And as shown in FIGS. 9A and 9B, a bump 140 is grown from one of the substrates to contact the other. For example, when a liquid crystal 130 is sealed between the TFT substrate and the counter substrate 110 having a bump growing from one of the substrates and contacting the other by a dropping injection method, the liquid crystal 130 can be sealed inside of the bump 140. By this, the step of applying a sealant and the step of curing the sealant can be omitted, and accordingly, the manufacturing steps can be simplified.

Embodiment 5

Figure 21A:
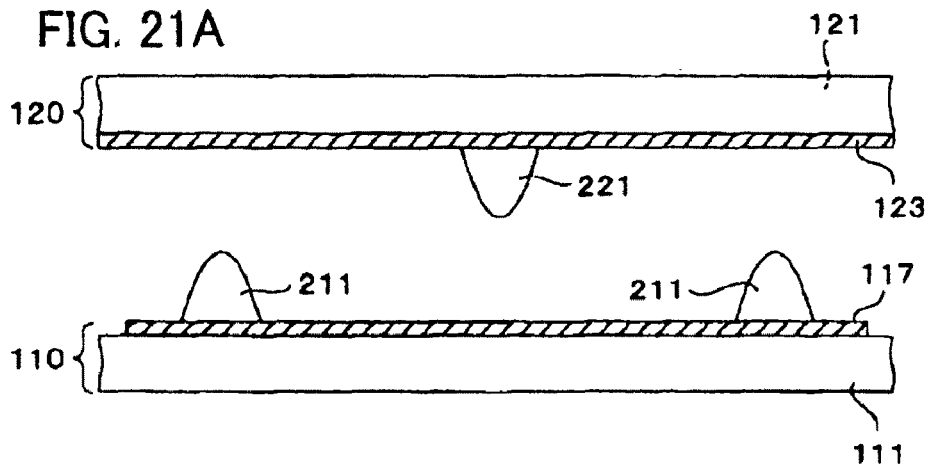
FIG. 21A is a model view illustrating a method for manufacturing a liquid crystal display apparatus according to an embodiment of the present invention.
Figure 21B:
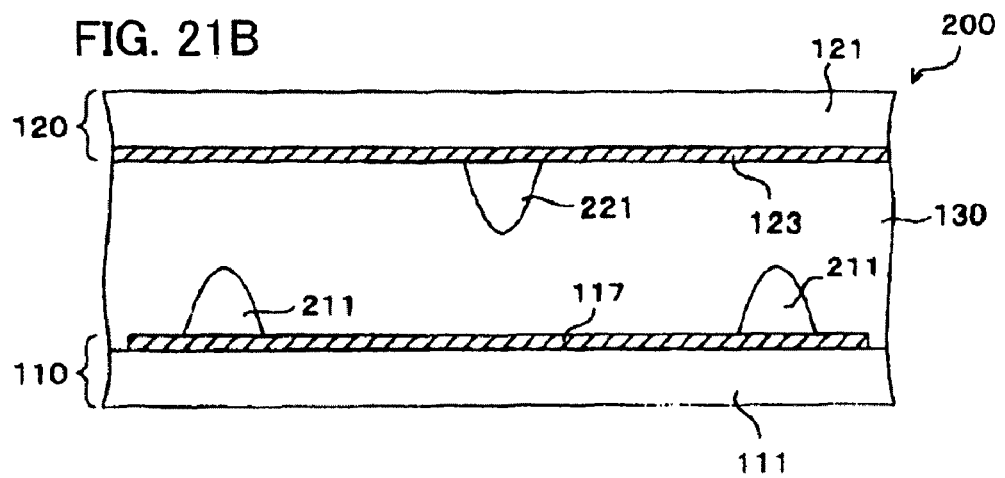
FIG. 21B is another model view illustrating a method for manufacturing a liquid crystal display apparatus according to an embodiment of the present invention.
Figure 21C:
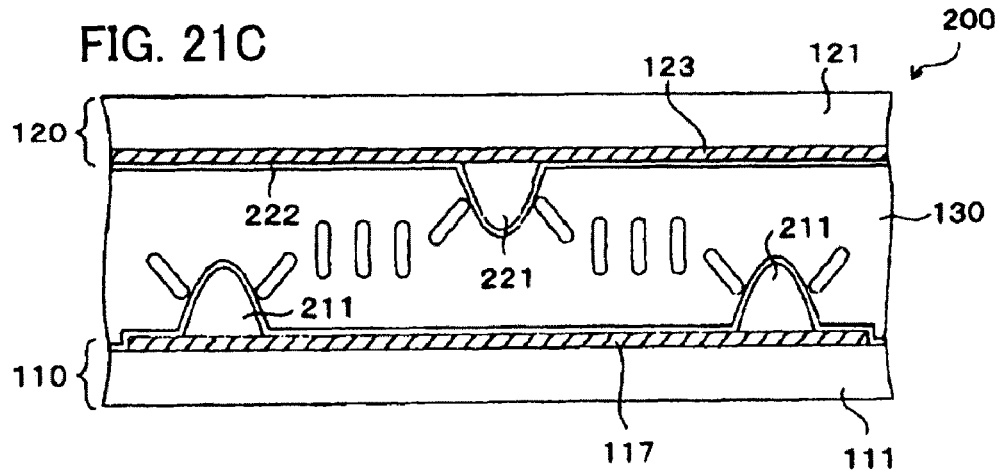
FIG. 21C is another model view illustrating a method for manufacturing a liquid crystal display apparatus according to an embodiment of the present invention.

FIGS. 21A to 21C are model views illustrating a method for manufacturing a liquid crystal display apparatus according to EMBODIMENT 5 of the second aspect of the present invention. It is to be noted that in FIGS. 21A to 21C, only major parts of a TFT substrate and counter substrate are illustrated for simplifying the explanation. The actual structures of the TFT substrate and counter substrate are basically the same as explained in EMBODIMENT 1.

First, a TFT substrate 110 and a counter substrate 120 are formed as shown in FIG. 21A in the same manner as in EMBODIMENT 1. Since, in this embodiment, the alignment control layer is also formed by a monomer added to the liquid crystal, electrodes (pixel electrode 117 or a common electrode 123) are exposed on the surfaces of the TFT substrate 110 and the counter substrate 120. Furthermore, in this embodiment, protrusions (or bumps) 211, 221 for domain regulation are formed in the TFT substrate 110 and counter substrate 120 respectively, as shown in FIG. 21A. These protrusions 211, 221 can be formed, for example, using a photoresist and performing a selective light exposure and developing treatment.

Next, the TFT substrate 110 and counter substrate 120 are arranged to face each other with spacers in between, and a liquid crystal 130 having a negative dielectric constant anisotropy added with a reactive monomer (UV-curable resin) and a polymerization initiator is introduced into the space between the substrates to form a panel 200. As a method for introducing a liquid crystal, there are a dropping injection method and a vacuum injection method. Either can be employed.

Figures 22, 23A, 23B, 23C:
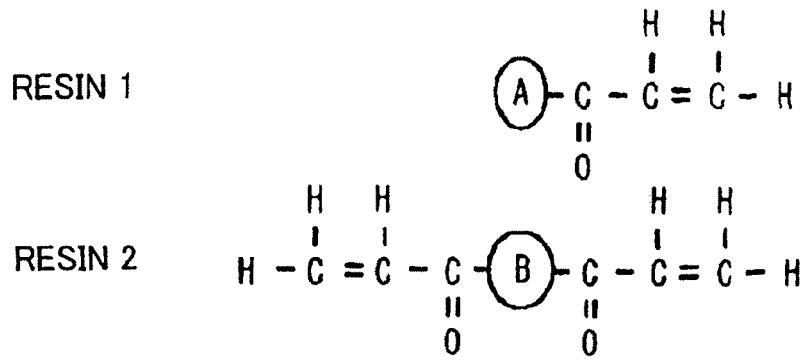
FIG. 22 shows chemical formulae of resins having a high wettability and a low wettability to a substrate.
FIG. 23A is a model view illustrating a method for manufacturing a liquid crystal display apparatus according to an embodiment of the present invention.
FIG. 23B is another model view illustrating a method for manufacturing a liquid crystal display apparatus according to an embodiment of the present invention.
FIG. 23C is another model view illustrating a method for manufacturing a liquid crystal display apparatus according to an embodiment of the present invention.

Into the liquid crystal 130, at least two types of resins, that is, a resin having a high wettability to a substrate (that is, having low vertical alignment controlling properties) and a resin having a low wettability to a substrate (that is, having high vertical alignment controlling properties) are added. FIG. 22 shows chemical formulae of a resin having a high wettability to a substrate and a resin having a low wettability to a substrate. In FIG. 22, resin 1 has a low wettability to a substrate and has a group showing vertical alignment in part A of the formula. A resin 2 has a high wettability to a substrate and has a group not showing vertical alignment in part B of the formula. These resins comprise photofunctional groups such as acrylate and methacrylate.

After liquid crystal 130 added with a reactive monomer is introduced into the panel 200, UV-ray irradiation with a mercury lamp was performed on the whole panel. In this case, since the light is irradiated to the liquid crystal through the glass substrate, UV rays with shorter wavelengths are cut by the glass substrate. Accordingly, it is necessary to use a polymerization initiator that can react to light that comes through the glass substrate. To be concrete, a polymerization initiator having an absorption length longer than 300 nm is used.

By means of this UV-ray irradiation, the monomer in the liquid crystal 130 polymerizes at the surfaces of the TFT substrate 110 and the counter substrate 120 to form alignment control layers 212, 222 on the surfaces of the TFT substrate 110 and the counter substrate 120. Accordingly, liquid crystal molecules that have been aligned roughly horizontally or in a random direction just after the injection, are aligned mostly vertically, as shown in FIG. 21C.

In this embodiment, protrusions 211, 221 are formed on the surfaces of the TFT substrate 110 and the counter substrate 120 as described above. Also, the liquid crystal 130 added with a reactive monomer is introduced into the space between the TFT substrate 110 and the counter substrate 120, followed by UV-ray irradiation to form the alignment control layers 212, 222 on the surfaces of the TFT substrate 110 and the counter substrate 120. Through this, liquid crystal molecules near the protrusions 211, 221 are aligned in the direction vertical to the surfaces of the protrusions 211, 221, while liquid crystal molecules in the other areas are aligned in the direction roughly vertical to the substrate surfaces. Therefore, light leakage at no voltage application is little. Furthermore, when a voltage is applied, the tilting direction of liquid crystal molecules about one of the side of a protrusion 211 or 221 is different from the tilting direction of liquid crystal molecules about the other side of the protrusion 211 or 221, and alignment division (multi-domain) is achieved. By this, a liquid crystal display apparatus having good contrast and viewing angle characteristics is obtained.

A liquid crystal display apparatus was prepared according to the above-described procedure, and the display characteristics were determined. As a result, the contrast ratio was not less than 300:1, the response speed (black→white→black) was 30 milliseconds and the transmittance was 5%. The visual angle was not less than 170 degrees both in the vertical and lateral (horizontal) directions, the same performance as or better performance than that of the conventional MVA type liquid crystal display apparatus wherein alignment control film was formed by printing.

In the above-described embodiments, explanation was made using protrusions (bumps) for regulating domains. However, it is to be noted that the domain regulations is possible by installing dents instead of the protrusions.

Furthermore, in the above-described embodiments, explanation was made regarding the case in which a polyimide and a polyamic acid were not used at all in order to make the present invention clearer. However, it is also possible to mix a polyimide and a polyamic acid into a UV-curable resin, or use a polyimide and a polyamic acid as part of a UV-curable resin.

Embodiment 6

FIGS. 23A to 23C are model views illustrating a method for manufacturing a liquid crystal display apparatus according to EMBODIMENT 6 of the second aspect of the present invention. First, a TFT substrate 110 and a counter substrate 120 are formed as shown in FIG. 23A in the same manner as in EMBODIMENT 1 (only the TFT substrate 110 is shown in FIG. 23A). Since, in this embodiment, too, the alignment control layer is formed by a UV-curable resin added to a liquid crystal, electrodes (pixel electrode 117 or a common electrode 123) are exposed on the surfaces of the TFT substrate 110 and the counter substrate 120. These electrode may be coated with SiN or other insulating films. Furthermore, different from EMBODIMENT 5, protrusions are not formed in this embodiment.

After that, a rubbing treatment is performed on the surfaces of the TFT substrate 110 and the counter substrate 120 as shown in FIG. 23B. The rubbing is achieved by rubbing the surfaces of the TFT substrate 110 and the counter substrate 120 along one direction, using, for example, a cloth roller 204.

Next, the TFT substrate 110 and counter substrate 120 are arranged to face each other with spacers in between as shown in FIG. 23C, and a liquid crystal 130 added with a photoreactive monomer (UV-curable resin) is introduced into the space between the substrates. After that, UV-irradiation is performed to form alignment control layers 212,222 on the surfaces of the TFT substrate 110 and the counter substrate 120.

Figures 24A, 24B, 24C:
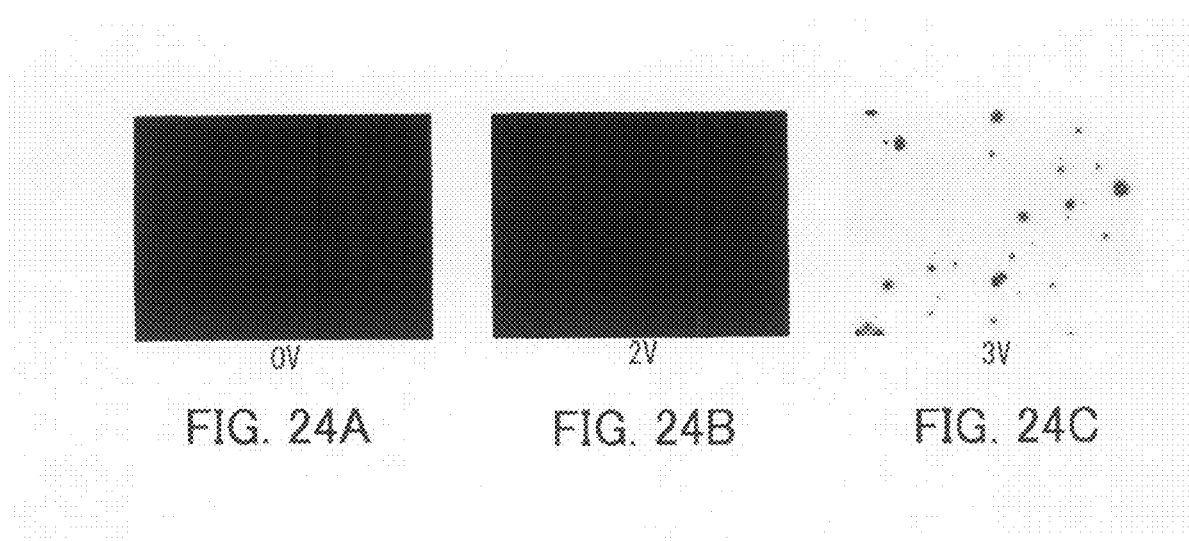
FIG. 24A shows a result of investigations to see the alignment state of a liquid crystal display apparatus.
FIG. 24B shows another result of investigations to see the alignment state of a liquid crystal display apparatus.
FIG. 24C shows another result of investigations to see the alignment state of a liquid crystal display apparatus.

FIGS. 24A to 24C show the results of investigation to see the alignment state of a liquid crystal display apparatus prepared by this embodiment. FIG. 24A shows a state to which no voltage was applied, FIG. 24B shows a state to which a voltage of 2V was applied, and FIG. 24C shows a state to which a voltage of 3V was applied. As shown in these figures, the transmittance changed as the voltage changed, and, accordingly, it is confirmed that the alignment direction of liquid crystal molecules was regulated by the rubbing direction. It is to be noted that streak lines were observed in FIG. 24B that were probably generated where the intensity of rubbing was a little too hard. This sort of display abnormalities can be considered as being avoidable by establishing appropriate rubbing conditions.

According to this embodiment, since the rubbed surfaces do not directly contact with the liquid crystal, minute particles (rubbing dusts) generated by the rubbing do not come into the liquid crystal 130 and contaminate it. Accordingly, the reliability of the liquid crystal display apparatus can be improved.

According to the conventional method in which an alignment control film is formed by printing, even though the base layer for the alignment control film is subjected to a rubbing treatment, the minute unevenness formed in the rubbing is buried during the printing, and accordingly, it is not possible to align liquid crystal molecules in the rubbing direction. However, when an alignment control layer is formed by polymerizing the resin added to the liquid crystal 130 as in this embodiment, it is possible to align liquid crystal molecules in the rubbing direction, if an rubbing treatment is performed on the base layer.

Embodiment 7

Figure 25:
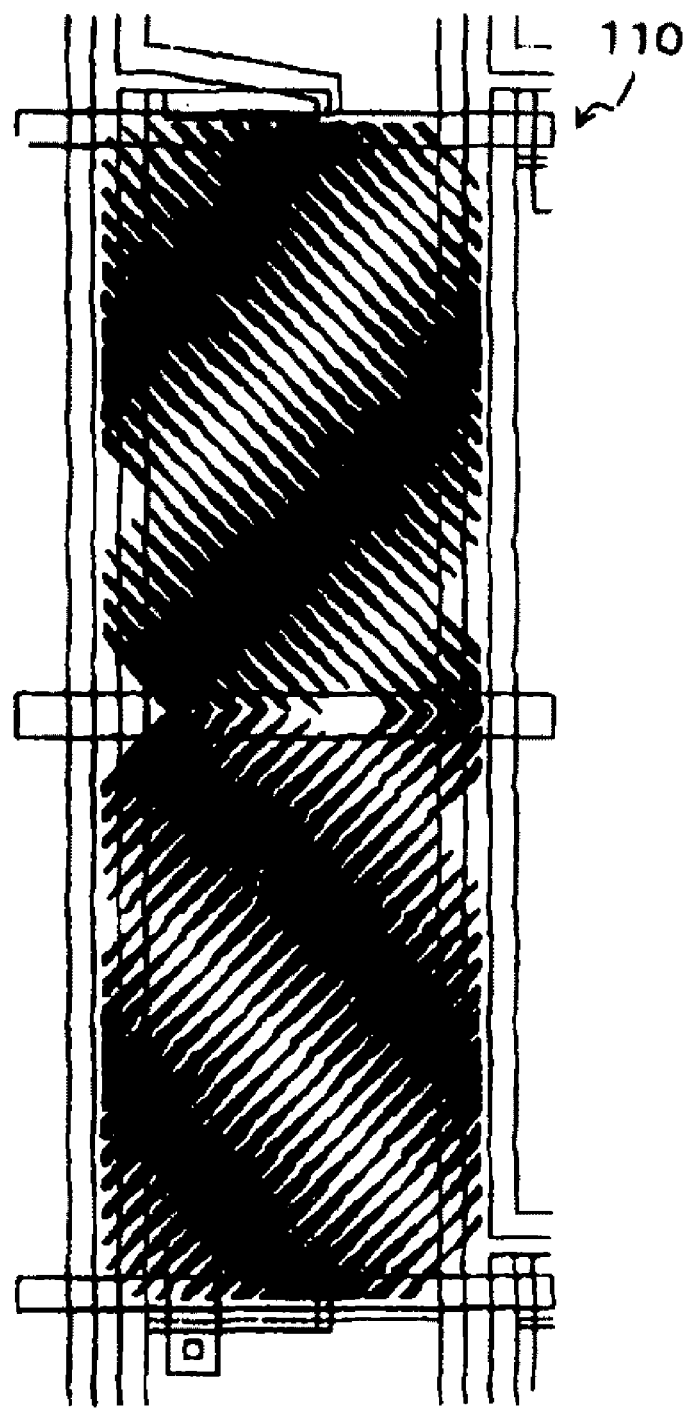
FIG. 25 is a model view illustrating a method for manufacturing a liquid crystal display apparatus according to an embodiment of the present invention.
Figure 26A:
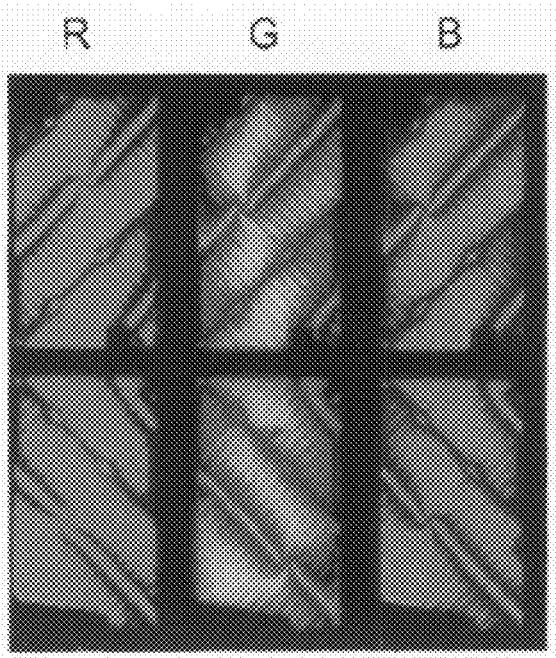
FIG. 26A is another model view illustrating a method for manufacturing a liquid crystal display apparatus according to an embodiment of the present invention.
Figure 26B:
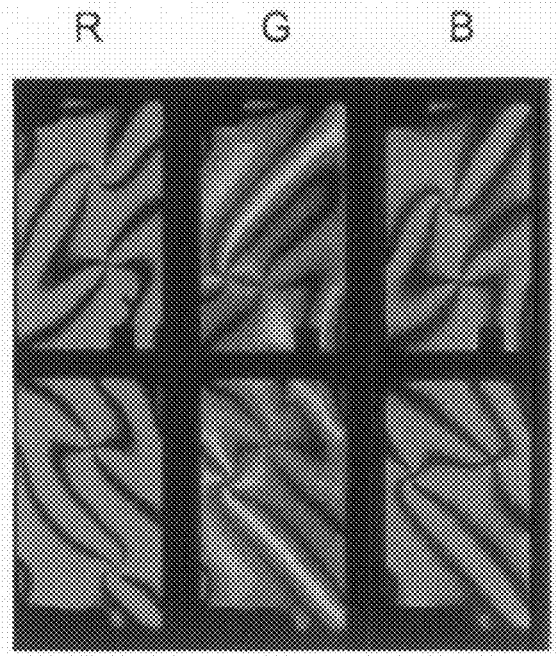
FIG. 26B is another model view illustrating a method for manufacturing a liquid crystal display apparatus according to an embodiment of the present invention.

FIGS. 25, 26A and 26B are model views illustrating a method for manufacturing a liquid crystal display apparatus according to EMBODIMENT 7 of the second aspect of the present invention.

First, a TFT substrate and a counter substrate are formed in the same manner as in EMBODIMENT 1, and a 3 μm-thick insulating layer made of an insulating material such as SiN is formed, on at least one of the TFT substrate and the counter substrate (the TFT substrate in this embodiment). Then, this insulating film is subjected to patterning by photolithography to form fine stripe patterns (uneven patterns) as indicated in black in FIG. 25. Then, the TFT substrate 110 and counter substrate are arranged to face each other with spacers in between, and a liquid crystal having a negative dielectric constant anisotropy added with a photoreactive monomer (UV-curable resin) is introduced into the space between the substrates. Then, UV irradiation is performed in the same manner as in EMBODIMENT 1 to polymerize the monomer on the surfaces of the TFT substrate and the counter substrate face to form alignment control layers. In this embodiment, too, the tilting direction of liquid crystal molecules can be controlled by the fine unevenness installed on the TFT substrate at a voltage application.

FIG. 26A shows the state of transmitted light at a voltage application of a liquid crystal display apparatus prepared according to this embodiment. To compare, FIG. 26B shows the state of transmitted light at a voltage application of a liquid crystal display apparatus prepared by forming the same uneven patterns as in the above-described embodiment, and forming an alignment control film by printing. As understood from FIG. 26A, regarding the liquid crystal display apparatus according to this embodiment, the liquid crystal alignment is controlled by the uneven patterns, while as understood from FIG. 26B, regarding the liquid crystal display apparatus according to a comparative example, minute uneven parts are buried with the alignment control film if the thickness of the uneven patterns is 0.03 µm or less, and accordingly, it is not possible to regulate the alignment direction of liquid crystal molecules at a voltage application, randomly generating areas that do not transmit light.

Figure 27A:
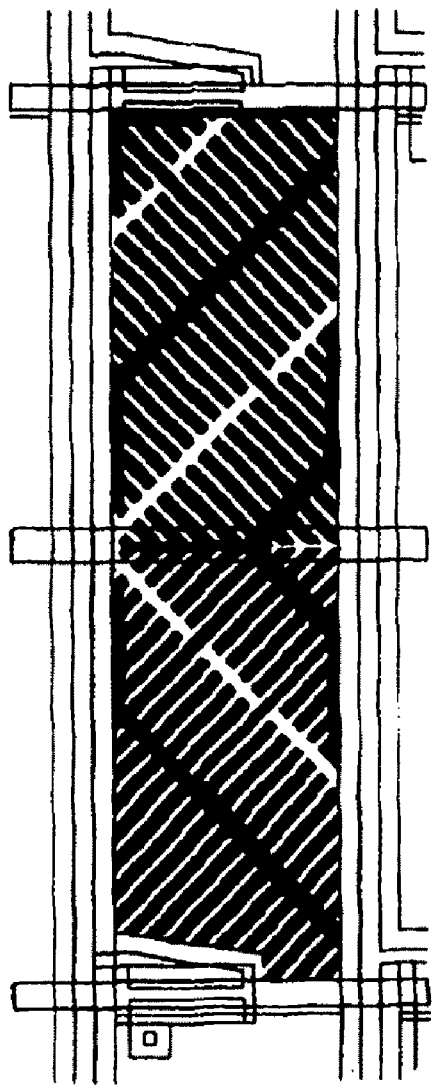
FIG. 27A is a view showing an example wherein the uneven patterns were changed in an embodiment of the present invention.
Figure 27B:
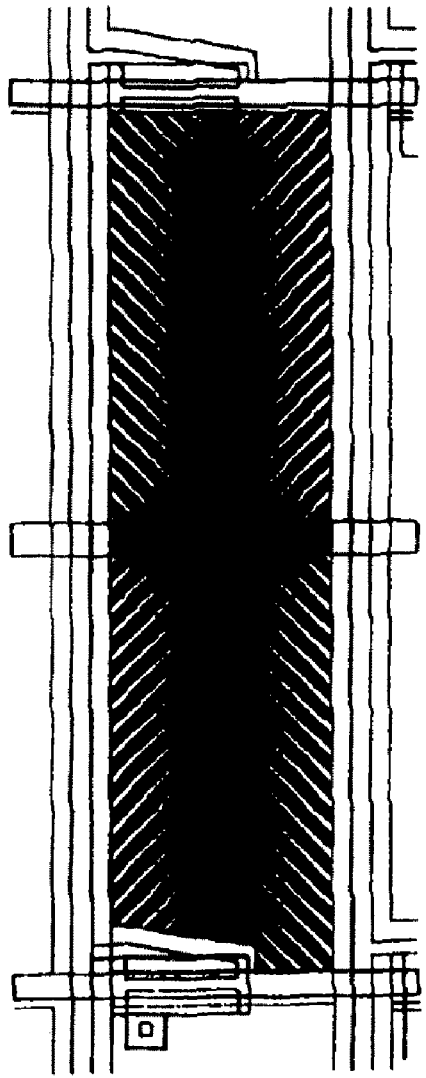
FIG. 27B is another view showing an example wherein the uneven patterns were changed in an embodiment of the present invention.
Figure 28:
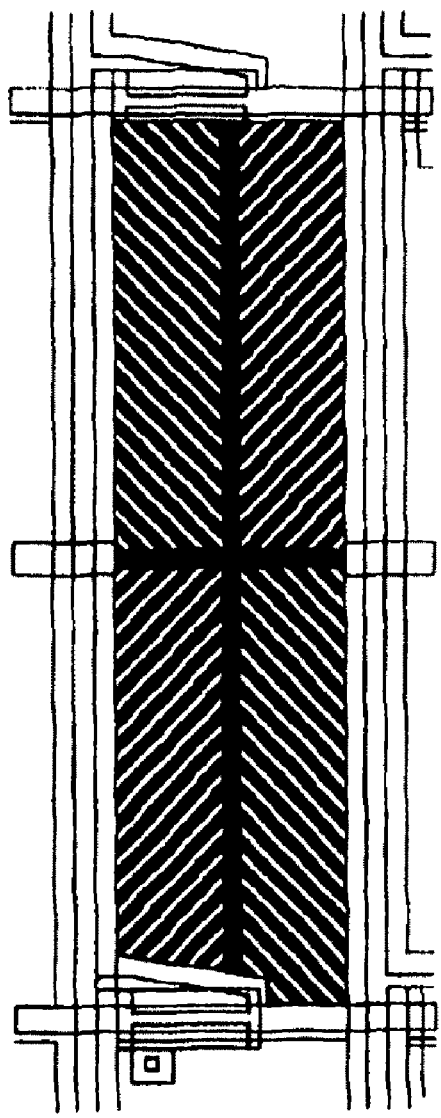
FIG. 28 is another view showing an example wherein the uneven patterns were changed in an embodiment of the present invention.

It is to be noted that when the uneven patterns were changed to those shown in FIGS. 27A, 27B and 28, good display characteristics were obtained. With the patterns of FIGS. 25 and 27A, domains with changes in alignment direction by 180 degrees are formed, and the patterns of FIGS. 27B and 27, domains with changes in alignment direction by 90 degrees are formed. In both cases, consistent alignment control was always possible. Furthermore, in the cases where the tips of the patterns are tapered (FIGS. 25 and 27B) as well as in the cases where the tips of the patterns are not tapered (FIGS. 27A and 28), provision of pretilting was possible.

Embodiment 8

The following is an explanation of EMBODIMENT 8 according to the second aspect of the present invention. In this embodiment, one pixel area is divided into multiple fine areas, and an alignment control layer is formed by changing the surface energy at the interface for each fine area.

Accordingly, a TFT substrate and a counter substrate are formed in the same manner as in EMBODIMENT 1. Then, a photoresist is coated on a least one of the TFT substrate and the counter substrate (the TFT substrate in this embodiment) to form a resist film, followed by baking at 120° C.

Figure 29:
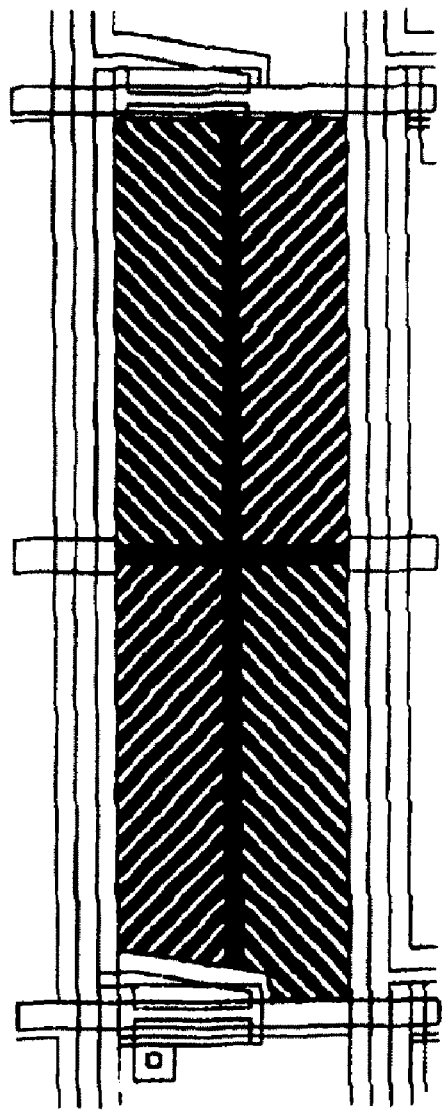
FIG. 29 is a model view depicting a photomask used in manufacturing a liquid crystal display apparatus according to an embodiment of the present invention.

Next, UV rays are irradiated onto the resist film using a mask as shown in black in FIG. 29. By means of this, the surface energy at the areas irradiated with UV rays becomes higher than the other areas.

Figure 30A:
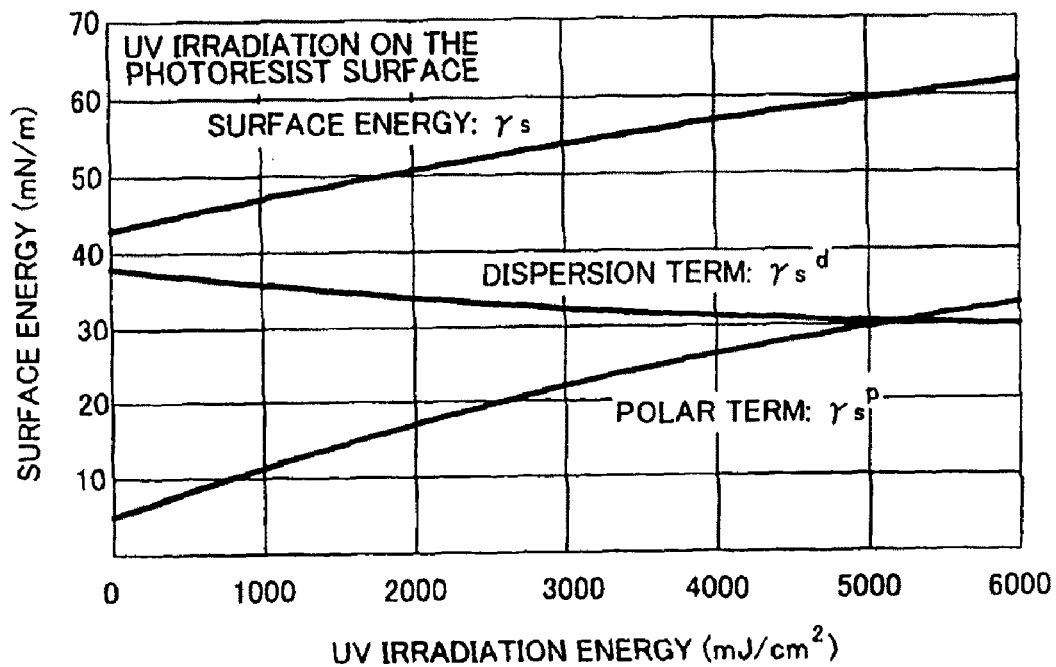
FIG. 30A is a graph indicating the relationship between the UV irradiation energy density and the surface energy when UV rays are irradiated on the surface of a photoresist film.
Figure 30B:
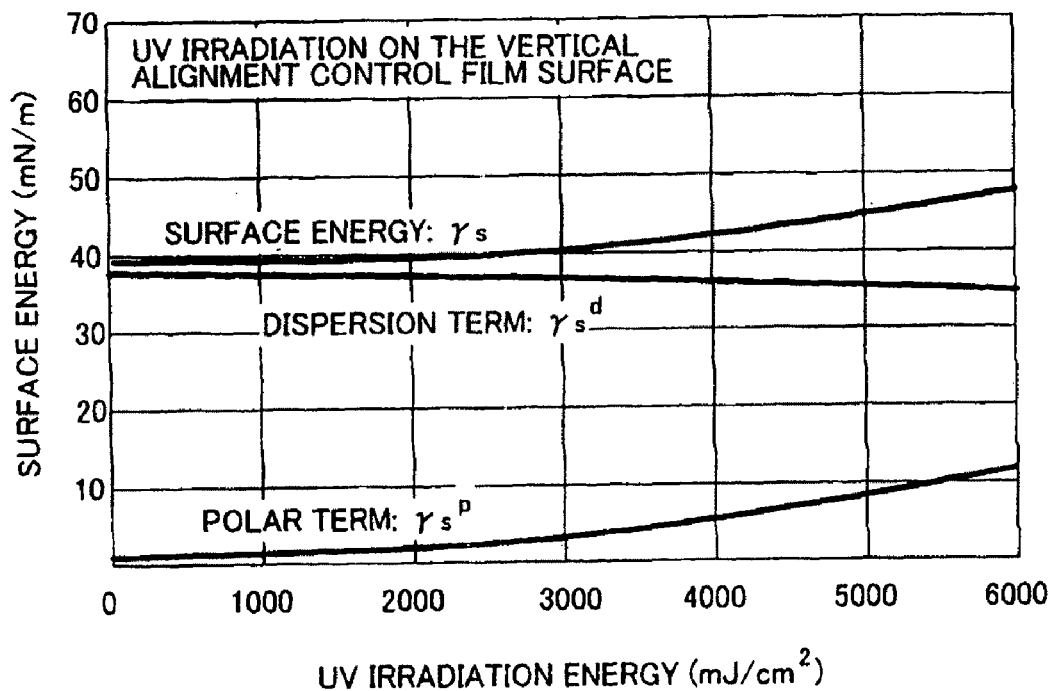
FIG. 30B is a graph indicating the relationship between the UV irradiation energy density and the surface energy when UV rays are irradiated on the surface of a vertical alignment control film.

FIG. 30A is a graph indicating the relationship between the UV irradiation energy density and the surface energy, when UV irradiation on to the photoresist film is performed, plotting the UV irradiation energy density as ordinate and the surface energy as abscissa. As FIG. 30A indicates, the surface energy can be enhanced by irradiating a photoresist film with UV rays. It is to be noted that FIG. 30B shows the relationship between the UV irradiation energy density and the surface energy when UV rays are irradiated onto the surface of a vertical alignment control film.

After the UV irradiation onto the resist film in this way, the TFT substrate and the counter substrate are bonded together with spacers in between and a liquid crystal having a negative dielectric constant anisotropy added with a photoreactive monomer is introduced to form a panel. Then, UV irradiation is performed on the whole surface of the panel to form an alignment control layer by polymerizing the monomer on the surface of the TFT substrate and the counter substrate. In this process, the degree of vertical alignment is weaker in the areas where the surface energy is lower than in the areas where the surface energy is high. That is, at a voltage application, the liquid crystal molecules are tilted towards the direction horizontal along the patterns of the mask used at the time of UV irradiation.

Figure 31:
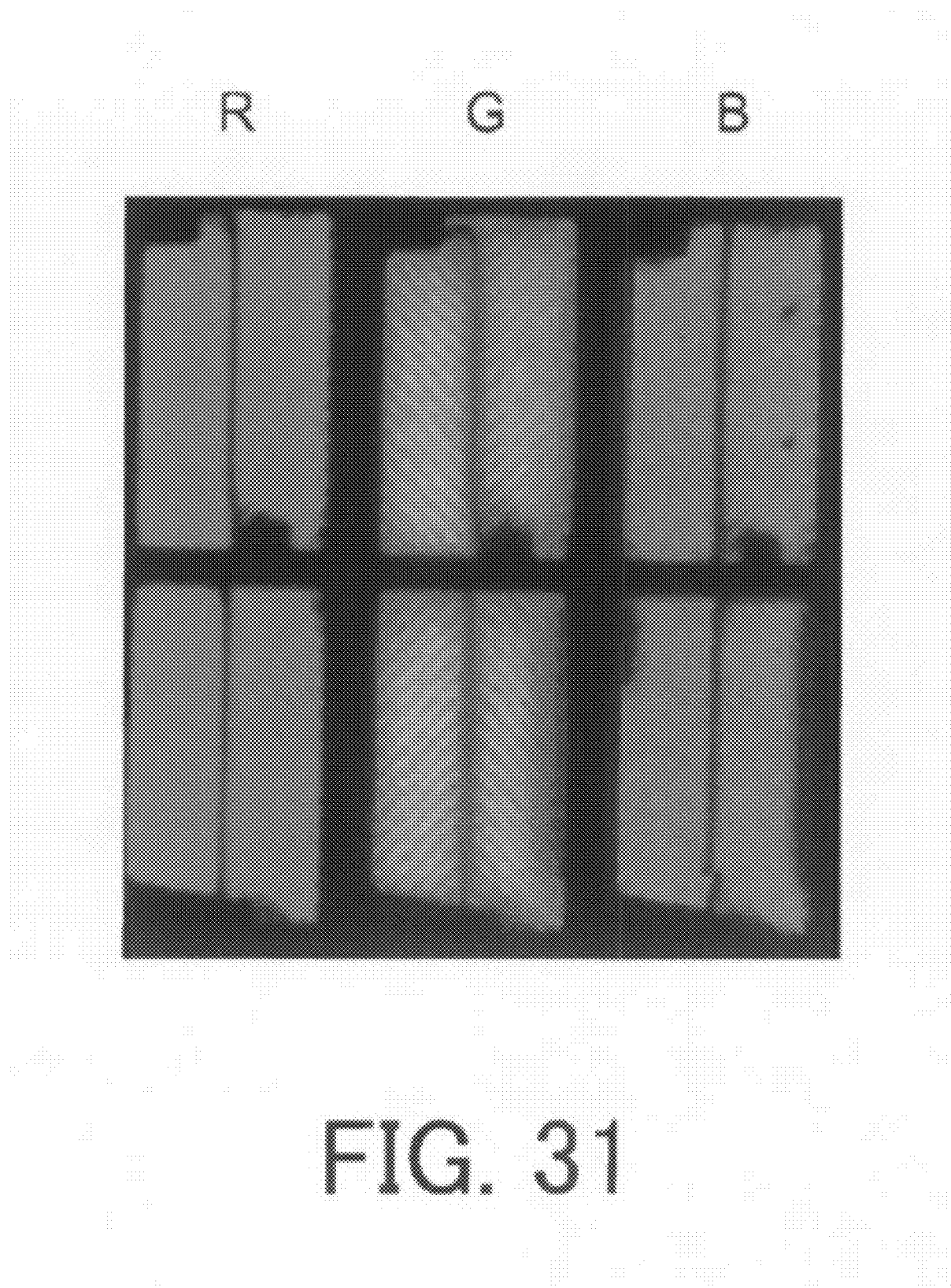
FIG. 31 shows a state of the liquid crystal display apparatus prepared according to an embodiment of the present invention.

FIG. 31 shows a state of the liquid crystal display apparatus prepared according to the embodiment at the time when the pixels are lighted. As shown in FIG. 31, this embodiment was also able to show display characteristics similar to those of EMBODIMENT 7.

The above-described explanation is made on the case where the surface energy is modified by irradiating a resist with UV rays. However, it is to be noted that the surface energy may be modified by other methods. For example, it is possible to change the surface energy of minute areas by the existence/nonexistence of ITO.

Embodiment 9

The following is an explanation of EMBODIMENT 9 according to the second aspect of the present invention. As explained previously, in the conventional MVA liquid crystal display apparatus, dark lines come to appear owing to the fact that the areas over the protrusions and the slits make the boundaries of the alignment division, with a result that the transmittance at the time of white display is lowered. Although, the transmittance can be raised if the spaces between the protrusions or slits are sufficiently widened, such an action results in that the time period from the start of the voltage application between the electrodes to the time when the alignment of the liquid crystal molecules is stabilized, will be longer for the areas distant from the protrusions or slits, and accordingly, the response speed will be decreased.

Figure 32:
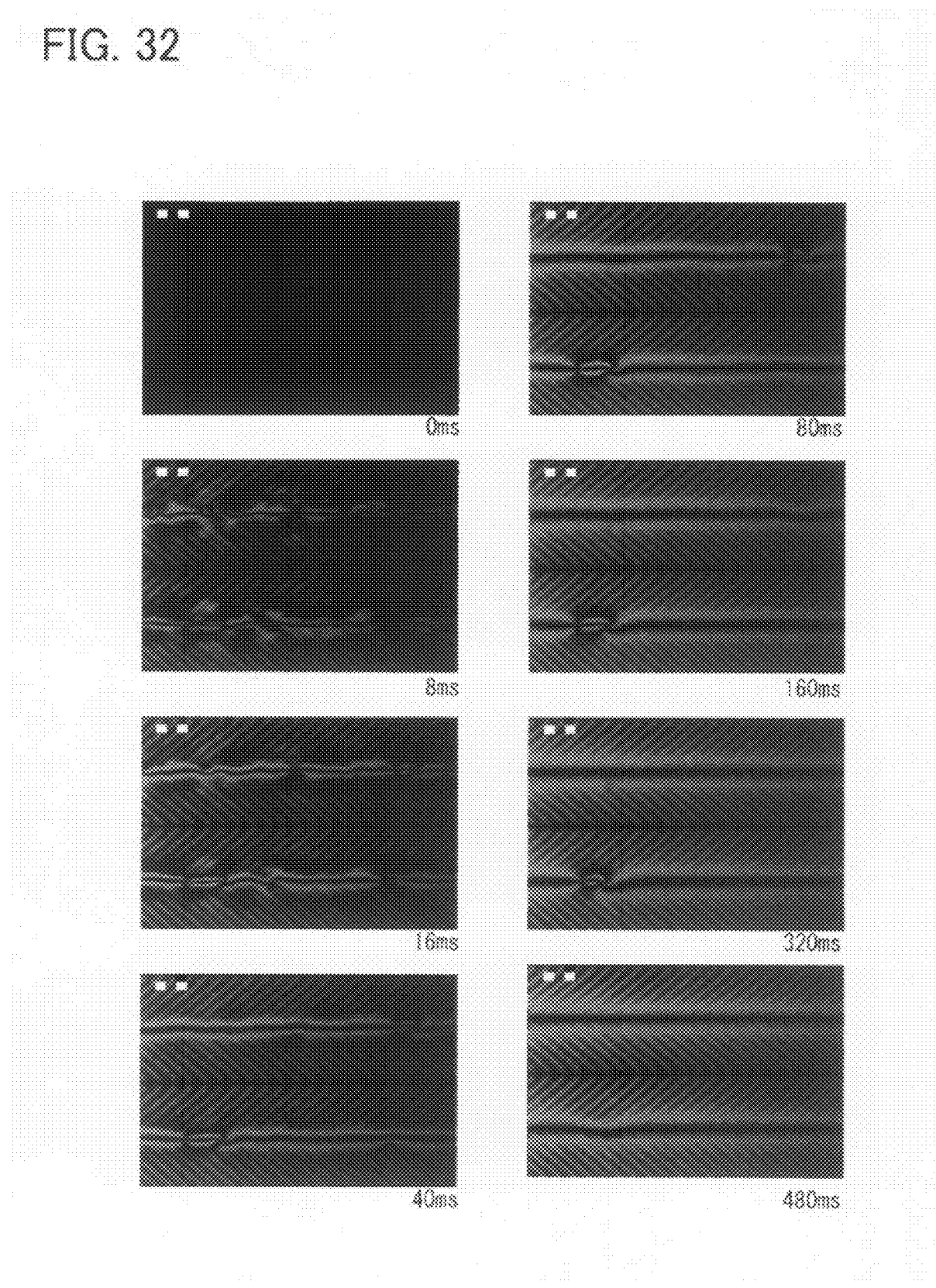
FIG. 32 is a collection of figures showing the transient response characteristics of a liquid crystal display apparatus that does not have a polymer network, at the time when the pixels are lighted.
Figure 33:
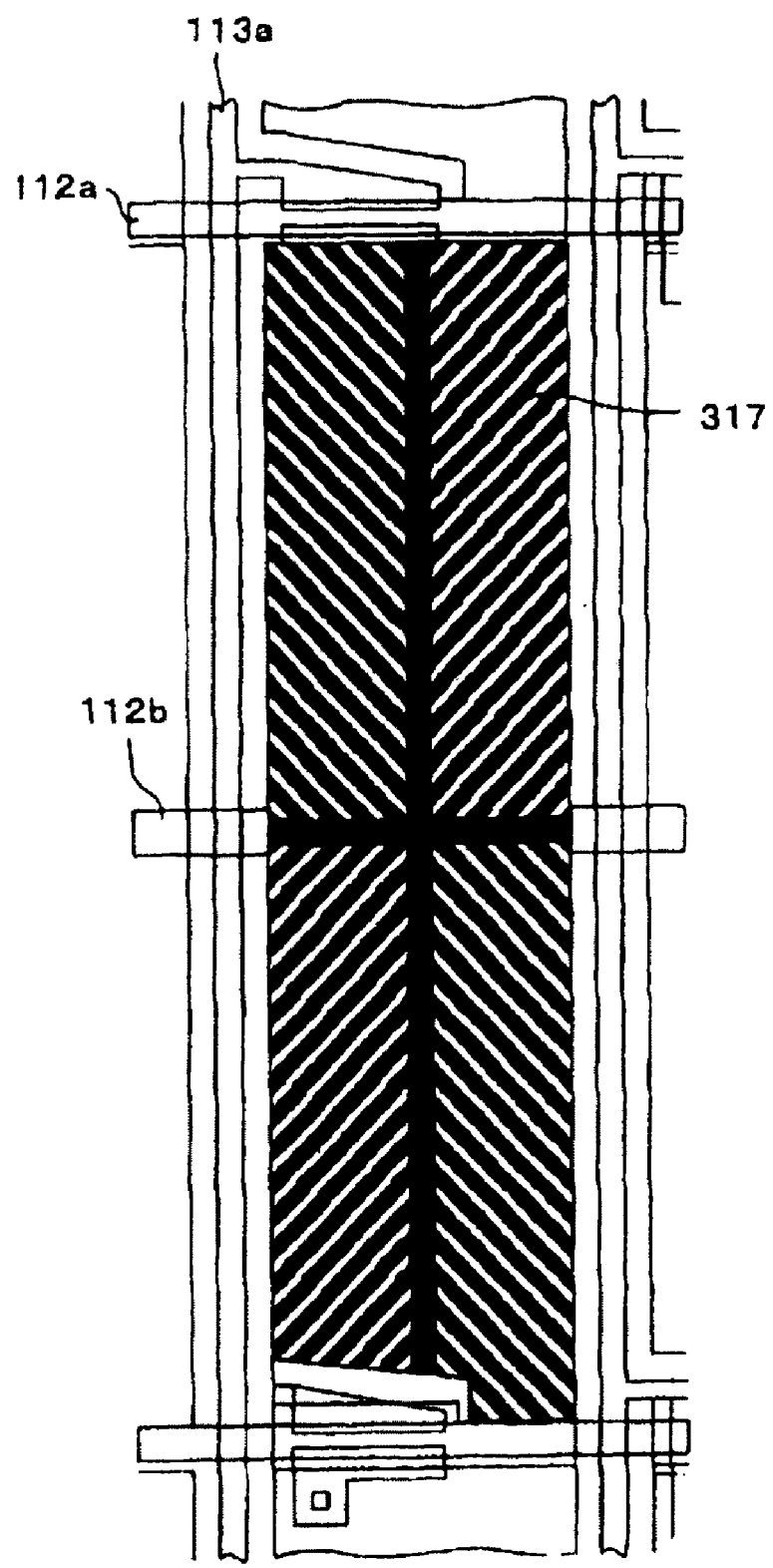
FIG. 33 is a model view depicting the shape of slits installed on the pixel electrodes of the liquid crystal display apparatus used for FIG. 32.

FIG. 32 is a collection of figures showing the transient response characteristics of a liquid crystal display apparatus that did not have a polymer network, at the time when the pixels were lighted. This liquid crystal display apparatus had pixel electrodes 317 with slits having a shape as shown in FIG. 33.

Figure 34:
FIG. 34 shows a final lighting state of the liquid crystal display apparatus used for FIG. 32.

This liquid crystal display apparatus showed a good lighting state finally as shown in FIG. 34. However, it took a long time for the apparatus to come to a static state as shown in FIG. 32. It can be considered that while the liquid crystal molecules in the vicinity of the edges of the slits of pixel electrodes are aligned along the direction determined by the slits almost at the time of voltage application, it takes time for the liquid crystal molecules distant from the edges of the slits to be aligned in a stable manner.

To solve this problem, a liquid crystal display apparatus is proposed that is obtained by introducing a liquid crystal added with a polymerizable compound (polymerizing component) such as a monomer and an oligomer into a space between a TFT substrate and counter substrate, irradiating with UV rays after stabilizing the alignment direction of the liquid crystal molecules while applying a voltage between the electrodes to form a polymer network by polymerizing the polymerizable compound. This type of liquid crystal display apparatus is called a polymer-stabilized type liquid crystal display apparatus. In the polymer-stabilized type liquid crystal display apparatus, the liquid crystal molecules between the electrodes are tilted in the direction determined by the polymer network simultaneously with the voltage application, improving the response characteristics.

However, in the polymer-stabilized type liquid crystal display apparatus, the productions steps are complicate and thus, the apparatus is not suitable for mass production, since irradiation with UV rays is performed while applying a voltage between the pixel electrodes and the common electrode, after connecting the electrodes installed on the TFT substrate or counter substrate with the external drive circuit. Also, when UV irradiation is performed while driving the TFT's, their characteristics may be changed owing to the UV rays, with a result that a normal voltage is not applied to the pixel electrodes. If the polymerizable compound is polymerized in this state, the alignment regulation powers by the polymer network become different from pixel to pixel, causing variations in the T-V (transmission-voltage) characteristics of a liquid crystal cell and leading to display defects such as display fluctuation or the like.

Accordingly, in this embodiment, a polymer network is formed by polymerizing a polymerizable compound added to a liquid crystal at no voltage application between the electrodes. Therefore, the regulating power to align the liquid crystal molecules vertically is intensified.

Liquid crystal molecules in the vicinity of the protrusions or slits are aligned in the direction determined by the protrusions or slits almost simultaneously at the time of a voltage application. The alignment of these liquid crystal molecules affects the liquid crystal molecules surrounding them and determines the alignment direction of the surrounding liquid crystal molecules. In this way, the alignment direction is propagated and determines the alignment direction of liquid crystal molecules distant from the protrusions or slits.

In an MVA liquid crystal display apparatus that do not have a polymer network, liquid crystal molecules distant from the protrusions or slits are aligned randomly almost simultaneously at the time of a voltage application, and when the alignment direction of the liquid crystal molecules in the vicinity of the protrusions or slits is propagated, change the alignment direction to the direction. It takes sometime to change the alignment direction of the liquid crystal molecules that have been aligned once, deteriorating the response speed of a liquid crystal display apparatus without a polymer network.

In this embodiment, the vertical alignment regulation power of liquid crystal molecules is enhanced. Owing to this, the liquid crystal molecules are aligned vertically until the alignment direction of the liquid crystal molecules in the vicinity of the protrusions or slits is propagated, and they are aligned in specific directions after the alignment direction has been propagated. Accordingly, the response time is shortened compared with a liquid crystal display apparatus without a polymer network.

FIGS. 35A and 35B are model views illustrating, in a step-wise way, a method for manufacturing a liquid crystal display apparatus according to this embodiment.

First, as shown in FIG. 35A, a TFT substrate 310 having pixel electrodes 311, TFT's, etc. and a counter substrate 320 having a common electrode 321 are formed in the same manner as for EMBODIMENT 1. However, protrusions 312, 322 and vertical alignment control films 313, 323 are formed on the liquid crystal side surfaces of the TFT substrate 310 and the counter substrate 320 in this embodiment. For example, the protrusions 312, 322 are formed by using a photoresist and performing a selective light exposure treatment and development treatment, and the vertical alignment control film 313, 323 are formed by applying polyimide.

Next, as shown in FIG. 35B, the TFT substrate 310 and the counter substrate 320 are placed facing each other and with spacers in between, and a liquid crystal 330 having a negative dielectric constant anisotropy added with a polymerizable compound is introduced between the two substrates to form a panel 300. In this case, the constitution, mixing ratio and amount to be added of the polymerizable compound is established in accordance with desired T-V characteristics and threshold values as explained later.

Next, UV irradiation is performed onto the panel 300 at no voltage application between the electrodes to form a polymer network by polymerizing the polymerizable compound. Owing to this, the liquid crystal molecules come to be aligned vertically to the surfaces of the alignment control film 313, 323 at no voltage application. In this way, a liquid crystal display apparatus according to this embodiment is completed.

FIG. 36 is a graph showing T-V characteristics of a liquid crystal display apparatus in which a bifunctional monomer in the capacity of a polymerizable compound was added in amounts of 0.5, 1 and 3 wt. %. Furthermore, FIG. 37 is a graph showing T-V characteristics of a liquid crystal display apparatus in which a monofunctional monomer in the capacity of a polymerizable compound was added in amounts of 1 and 2 wt. %. In FIGS. 36 and 37, T-V characteristics (indicated as "Ref. in the graphs) of a conventional MVA liquid crystal display apparatus are also shown for comparison.

As FIGS. 36 and 37 show, when a polyfunctional monomer in the capacity of a polymerizable compound is added to a liquid crystal layer 330 in a large amount, two- or three-dimensional polymer network is formed on the alignment control films 313, 323, and accordingly, restriction on the liquid crystal molecules is enhanced and the threshold voltage is changed greatly. On the other hand, when a monofunctional monomer in the capacity of a polymerizable compound is used even in a large amount, a polymer network is formed only mono-dimensionally, and accordingly, restriction on the liquid crystal molecules is weak and the threshold voltage is hardly changed, while the T-V characteristics change. Therefore, by controlling the constitution of the polymerizable compound, amount to be added and polymerization conditions (UV radiation amount, etc.), the anchoring energy or the vertical alignment ability can be changed greatly, with a result that it is possible to control the T-V characteristics and threshold values of a liquid crystal display apparatus.

In the above-described embodiments, explanations are made on the cases in which a monomer that is polymerizable by UV rays is used. However, it is to be noted that oligomers polymerizable by UV rays or monomers or oligomers polymerizable by heat may be used. Furthermore, by changing the UV radiation energy for each group of R pixels, G pixels and B pixels, it is possible to optimize the T-V characteristics and the threshold values according to each group of pixels. Furthermore, the T-V characteristics and the threshold values may be optimized by installing plural areas with different degrees of polymerization (anchoring energy) in one pixel.

FIG. 38 is a collection of figures showing the transient response characteristics from an unlighted state to a lighted state of a liquid crystal display apparatus (an example of the present invention) of this embodiment that was actually produced. Furthermore, FIG. 39 is a collection of figures showing the transient response characteristics from an unlighted state to a lighted state of an MVA liquid crystal display apparatus (comparative example) that did not have a polymer network, at the time when the pixels are lighted. Furthermore, FIG. 40 is a collection of figures showing the transient response characteristics from an unlighted state to a lighted state of an MVA liquid crystal display apparatus (conventional apparatus example) with a polymer network formed by irradiating UV rays while a voltage was applied between the electrodes.

As shown in FIGS. 38 to 40, the response speed of a liquid crystal display apparatus according to the present embodiment from the unlighted state to the lighted state is smaller than that of the MVA liquid crystal display apparatus of the conventional apparatus example but is sufficiently improved (larger) compared with the liquid crystal display apparatus of the comparative example without a polymer network.

In this way, if only the response characteristics from the unlighted state to the lighted state are considered, the MVA liquid crystal display apparatus of the conventional apparatus example is the best. However, it is necessary to apply a voltage between the electrodes during the irradiation with UV rays in the case of the MVA liquid crystal display apparatus of the conventional apparatus example. This leads to a defect of deteriorating the mass-productivity. Furthermore, there is another defect of fluctuating T-V characteristics caused by the polymer network formation by UV irradiation with TFT driving.

On the other hand, in the present embodiment, since the polymer network is formed by UV irradiation at no voltage application between the electrodes, an excellent mass-productivity is realized, and fluctuation in the T-V characteristics can be avoided. Furthermore, the response characteristics from the unlighted state to the lighted state are good, though it is smaller than that of the MVA liquid crystal display apparatus of the conventional apparatus example.

The reason that the response speed from the unlighted state to the lighted state of the MVA liquid crystal display apparatus of the conventional apparatus example is large, is that the liquid crystal molecules are tilted in a specific direction at no voltage application by the polymer network. However, the response speed from the lighted state to the unlighted state becomes smaller due to this polymer network, and the front contrast ratio would be deteriorated. On the other hand, in the liquid crystal display apparatus of the present embodiment, the anchoring energy to align the liquid crystal molecules vertically by the polymer network is enhanced. This leads to the effects that the response speed from the lighted state to the unlighted state is large, and the front contrast ratio is further improved.

Next, explanation of the third aspect of the present invention follows in reference to the attached figures.

FIGS. 41A and 41B illustrate the steps for manufacturing a liquid crystal display apparatus of FIRST EXAMPLE of this aspect. FIG. 41A illustrates a step for diagonal light irradiation with a mask, and FIG. 41B illustrates a step for diagonal light irradiation without a mask.

As shown in FIGS. 41A and 41B, in the liquid crystal display apparatus of this FIRST EXAMPLE, fine (ITO) electrodes 82 are installed on the first substrate 81, one-plane (ITO) substrate 84 is installed on the second substrate 83. A vertical alignment control film 85 with a vertical alignment treatment is attached to the fine electrodes 82 side of the first substrate 81, and a horizontal alignment control film 86 that has been subjected to a horizontal alignment treatment so as to make the pretilting angle as small as possible, is attached to the one-plane electrode 84 side of the second substrate 83.

Next, these two substrates 81 and 83 are set with their alignment control film facing each other, and sealed with a space in between to form a blank panel.

A liquid crystal comprising a reactive monomer (liquid crystal composition) 87 is introduced. This liquid crystal is in a normally black mode. It is to be noted that the liquid crystals used in the following examples are in a normally black mode.

Next, irradiation with a light is performed diagonally, that is in the direction tilted to the normal line direction of the surface of the first substrate 81 or the second substrate 82. As a light, UV rays are irradiated, for example. The liquid crystal molecules 88 are pretilted in the direction of the light irradiation on the liquid crystal 87 side of the one-plane electrode 84, and switching to the longitudinal direction of the slit stripes of the fine electrodes 82 occurs, when a voltage is applied between the fine electrodes 82 and the one-plane electrode 84. Next is an explanation of this point.

FIGS. 42A, 42B and 42C illustrate the electrode constitution of a liquid crystal display panel and the movements of the liquid crystal molecules of the FIRST EXAMPLE according to this aspect present invention. FIG. 42A illustrates a one-plane electrode and FIG. 42B illustrates fine slit electrodes, and FIG. 42C illustrates the movements of the liquid crystal molecules at a voltage application between the electrodes.

As shown in FIG. 42A, the one-plane electrode 84 is an ITO electrode that is uniformly formed all over a second substrate 83. As shown in FIG. 42B, the fine electrodes 82 are ITO electrodes that are processed to have fine slits. The directions of the liquid crystal molecules 88 are switched to the directions along the longitudinal direction of the slit stripes of the fine electrodes 82 (tilted in the directions of the arrows in FIG. 42C) as shown in FIG. 42C, owing to the fine and regular electric field distortion generated between the fine electrodes 82 and the one-plane electrode 84. A liquid crystal display panel having this type of movement is novel, and a high-performance liquid crystal display apparatus can be manufactured when this panel is applied.

In the above-described constitution, a liquid crystal display panel of the FIRST EXAMPLE utilizes fine electrodes 82 that are processed to have fine slits to switch the direction of the liquid crystal molecules 88 to the directions along the longitudinal direction of the slit stripes of the fine electrodes 82.

Furthermore, the FIRST EXAMPLE of the present invention can be realized in a different embodiment wherein the first substrate is formed by performing a vertical alignment treatment on a one-plane electrode with fine insulating bumps in the shape of a pattern as shown in FIG. 42B thereon, instead the fine electrodes 112 of ITO electrodes with fine slits formed thereon.

Figure 43:
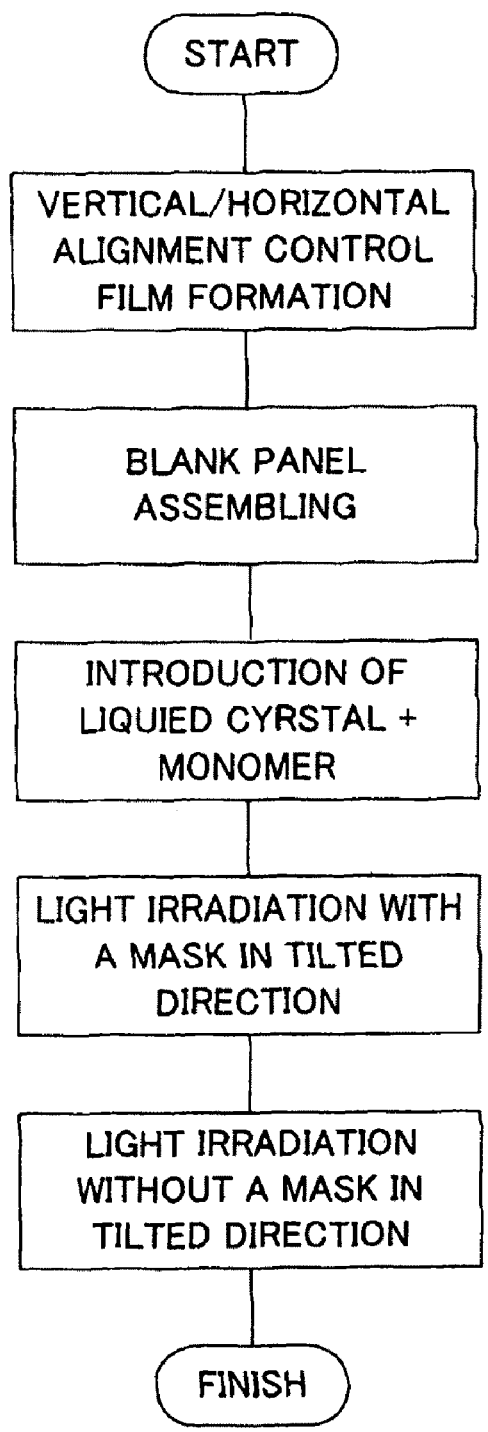
FIG. 43 is a flow chart illustrating the steps for manufacturing a liquid crystal display panel according to an embodiment of the present invention.

FIG. 43 is a flow chart illustrating the steps for manufacturing a liquid crystal display panel of the FIRST EXAMPLE of this aspect of the present invention. The structure of the liquid crystal display panel can be realized by performing light (UV, for example) irradiation twice (with a mask for the first irradiation, and without a mask for the second irradiation). Although UV rays are mainly used as a light, the present invention is not limited to this.

First, in step S1, an alignment control film 85 is formed on a first substrate 81 with fine electrodes 82 formed thereon, a horizontal alignment control film 86 is formed on a second substrate 83 with a one-plane electrode 84.

In step S2, the substrates prepared in step S1 are placed facing each other, and are sealed with a space in between to form a blank panel.

In step S3, a liquid crystal composition in which a polymerizable monomer is mixed with a liquid crystal is introduced into the space of the blank panel and sealing is performed.

In step S4, as shown in FIG. 41A, light irradiation with a mask is performed in a direction tilted to the normal line direction of the surface of the liquid crystal display panel having the liquid crystal composition containing the polymerizable monomer sealed therein.

In step S5, as shown in FIG. 41B, light irradiation without a mask is performed in a direction tilted to the normal line direction of the surface of the liquid crystal display panel having the liquid crystal composition containing the polymerizable monomer sealed therein.

Hereafter, "light irradiation in a direction tilted to the normal line direction of the surface of the liquid crystal display panel" is simply referred to as "light irradiation in a tilted direction". When irradiated in a tilted direction is performed in this way, alignment of the liquid crystal molecules is regulated in the tilted direction.

Hereupon, a negative-type ($\Delta\epsilon=-3.6$) liquid crystal is used as the liquid crystal, and a bifunctional acrylate is used as the reactive monomer. Experiments showed that similar results were obtained in a methacrylate system. Since a value on the level of 0.5% is needed for the rate of a monomer in a liquid crystal to achieve sufficient alignment characteristics, it is desirable to use a monomer having a chemical structure similar to that of a liquid crystal material from the viewpoint of solubility.

In the experiments, similar good results were obtained when 0.3-0.5% of a monomer is mixed with a liquid crystal. Irradiation angles in the range of 0-40 degrees were employed for giving pretilting angles the most efficiently. A mask corresponding to half of the pixels was used in the first irradiation (step S4) for the purpose of regulating the alignment of half of the liquid crystal layer, and subsequently, in the second irradiation (step S5), irradiation from the direction opposite to the irradiation direction for the first irradiation is performed all over the panel. In this case, the region that had been subjected to the first irradiation for alignment control was not affected by the second (over all) radiation. It is thought that the reason is that the amount of the reactive monomer (acrylate) in the corresponding half part was little, and accordingly, the effect was weakened.

In this way of passing through the treatments steps as shown in FIG. 43, it is possible to realize a liquid crystal display panel having two domains showing different alignment regulation directions when a voltage is applied to each pixel.

By developing the above-described alignment regulation technology, it is possible to realize a liquid crystal display panel having four-division alignment structure (SECOND EXAMPLE), having four domains at a voltage application (breaking-up into two areas by the microstructure, followed by breaking-up into two areas by UV irradiation onto each microstructure, and accordingly, making four domains). Explanation of SECOND EXAMPLE follows below.

Figure 44A:
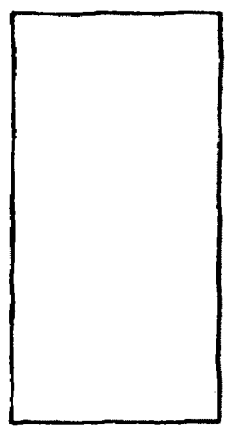
FIG. 44A is a view for illustrating the structure of the electrodes and the movement of the liquid crystal molecules in a liquid crystal display panel according to an embodiment of the present invention.
Figure 44B:
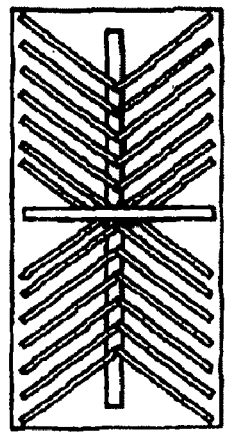
FIG. 44B is another view for illustrating the structure of the electrodes and the movement of the liquid crystal molecules in a liquid crystal display panel according to an embodiment of the present invention.
Figure 44C:
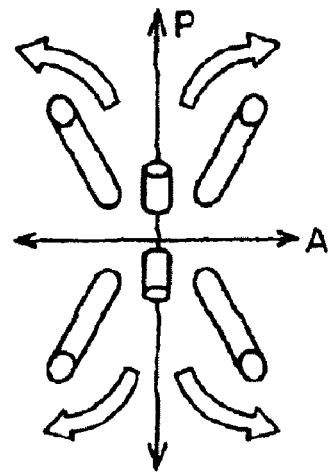
FIG. 44C is another view for illustrating the structure of the electrodes and the movement of the liquid crystal molecules in a liquid crystal display panel according to an embodiment of the present invention.

FIGS. 44A to 44C illustrate the structure of the electrodes and the movement of the liquid crystal molecules in a liquid crystal display panel according to this example. FIG. 44A illustrates a one-plane electrode, FIG. 44B illustrates electrodes with fine slits, and FIG. 44C illustrates the movement of the liquid crystal molecules when a voltage is applied. The electrodes with fine slits in FIG. 44B and the alignment regulation direction of the liquid crystal molecules shown in FIG. 44C are different from FIRST EXAMPLE shown in FIGS. 42A to 42C. The other features are the same as for FIRST EXAMPLE.

In short, in the liquid crystal display panel according to SECOND EXAMPLE, switching of the direction of the liquid crystal molecules to the longitudinal (4) directions of the stripes of the slits of the fine electrodes shown in FIG. 44B occurs at a voltage application by installing the electrode structure shown in FIG. 44B.

FIG. 45 illustrates the manufacturing steps of a liquid crystal display panel according to SECOND EXAMPLE, in which (I) shows a step of irradiating ¾ of the panel surface except the first domain from a first tilted direction through a mask with a light, (II) shows a step of irradiating ¾ of the panel surface except the second domain from a second tilted direction through a mask with a light, (III) shows a step of irradiating ¾ of the panel surface except the third domain from a third tilted direction through a mask with a light, and (IV) shows a step of irradiating ¾ of the panel surface except the fourth domain from a fourth tilted direction through a mask with a light.

By passing through the processing steps (I), (II), (III) and (IV) shown in FIG. 45, it is possible to realize a liquid crystal display panel having four domains in which alignment is controlled in four different directions when a voltage is applied to each pixel.

FIGS. 46A to 46C illustrate the structure of the electrodes and the movement of the liquid crystal molecules in a liquid crystal display panel according to THIRD EXAMPLE. FIG. 46A illustrates a one-plane electrode, FIG. 46B illustrates electrodes with fine slits, and FIG. 46C illustrates the movement of the liquid crystal molecules when a voltage is applied.

The liquid crystal display panel according to THIRD EXAMPLE is different from that of FIRST EXAMPLE in that a positive type liquid crystal ($\Delta\epsilon=5.0$) is used in this example. The other features are the same. In the case of THIRD EXAMPLE, the liquid crystal molecules rise when a voltage is applied, and a 2-domain structure is realized while rising, as opposed to the case of FIRST EXAMPLE. The structure according to THIRD EXAMPLE shown in FIGS. 46A to 46C resembles the structure according to FIRST EXAMPLE shown in FIGS. 41A and 41B. However, strictly speaking, a larger cell thickness ($\Delta n*d$) must be set for the liquid crystal.

FIGS. 47A to 47C illustrate the structure of the electrodes and the movement of the liquid crystal molecules in a liquid crystal display panel according to FOURTH EXAMPLE. FIG. 47A illustrates a one-plane electrode, FIG. 47B illustrates electrodes with fine slits, and FIG. 47C illustrates the movement of the liquid crystal molecules when a voltage is applied.

The liquid crystal display panel according to FOURTH EXAMPLE is different from that of SECOND EXAMPLE in that a positive type liquid crystal ($\Delta\epsilon=5.0$) is used in this example. The other features are the same. In the case of FOURTH EXAMPLE, the liquid crystal molecules rise when a voltage is applied, and a 4-domain structure is realized while rising, as opposed to the case of SECOND EXAMPLE. The structure according to FOURTH EXAMPLE shown in FIGS. 47A to 47C resembles the structure according to SECOND EXAMPLE shown in FIGS. 44A to 44C. However, strictly speaking, a larger cell thickness ($\Delta n*d$) must be set for the liquid crystal.

As described above, a multi-domain structure for each pixel of
a liquid crystal display panel is made possible by the present invention.

According to the present invention, by utilizing the alignment regulation by a reactive monomer and the electric field distribution having cyclic and directional features in the liquid crystal at a voltage application, or to be more concrete, by irradiating a light (UV-rays) from a tilted direction to endow a pretilting angle, and installing in a pixel domains having a plurality of differently regulated alignment directions, it is possible to manufacture a novel liquid crystal alignment structure that has been hard to be manufactured, to manufacture a liquid crystal display panel that has properties that have not been realized, and is brighter and excellent in various properties (visual angle, contrast, gradation characteristics, and productivity), compared with the liquid crystal display panel according to the conventional technologies, and thus, to provide a liquid crystal display apparatus having this high-quality panel. Hereupon, the excellent gradation properties means that the transmittance fluctuation caused by the applied voltage between the electrodes is small.

What is claimed is:

1. A liquid crystal apparatus having a liquid crystal layer and a pair of electrodes disposed on both sides of the liquid crystal layer for applying voltage on a liquid crystal enclosed between a pair of substrates, said apparatus comprising:

first and second substrates which are disposed facing each other;

a liquid crystal sealed between said first and second substrates;

tilt control sections formed by polymerizing a polymeizable compound comprising at least one photofunctional group selected from acrylate and methacrylate included in the liquid crystal by selectively irradiating active energy rays onto the substrate surface when no voltage is applied, and which are disposed on at least one of said first and second substrates and determine the tilting directions of the liquid crystal molecules when voltage is applied; and alignment control layers which are formed on the liquid crystal side faces of the first and second substrates and control the alignment direction of the liquid crystal molecules when no voltage is applied to be roughly vertical from the substrate face, wherein said alignment control layers are formed by polymerizing a polymerizable compound that has remained as a monomer after the selective irradiation of active energy rays.

2. A liquid crystal apparatus having a liquid crystal layer and a pair of electrodes disposed on both sides of the liquid crystal layer for applying voltage on a liquid crystal enclosed between a pair of substrates, said apparatus comprising:

first and second substrates which are disposed facing each other;

a liquid crystal sealed between said first and second substrates;

tilt control sections formed by polymerizing a polymerizable compound comprising at least one photofunctional group selected from acrylate and methacrylate included in the liquid crystal by selectively irradiating active energy rays onto the substrate surface when no voltage is applied, and which are disposed on at least one of said first and second substrates and determine the tilting directions of the liquid crystal molecules when voltage is applied; and alignment control layers which are formed on the liquid crystal side faces of the first and second substrates and control the alignment direction of the liquid crystal molecules when no voltage is applied to be roughly vertical from the substrate face, wherein said alignment control layers are formed by polymerizing a polymerizable compound that has remained as a monomer after the selective irradiation of active energy rays; and wherein said polymerizable compound comprises at least two different types of resins, defined as a first resin and a second resin, wherein said first resin is a resin having high wettability with respect to said substrates and said second resin is a resin having low wettability with respect to said substrates.

3. A liquid crystal apparatus having a liquid crystal layer and a pair of electrodes disposed on both sides of the liquid crystal layer for applying voltage on a liquid crystal enclosed between a pair of substrates, said apparatus comprising:

first and second substrates which are disposed facing each other;

a liquid crystal sealed between said first and second substrates;

tilt control sections formed by polymerizing a polymerizable compound comprising at least one photofunctional group selected from acrylate and methacrylate included in the liquid crystal by selectively irradiating active energy rays onto the substrate surface when no voltage is applied, and which are disposed on at least one of said first and second substrates and determine the tilting directions of the liquid crystal molecules when voltage is applied; and alignment control layers which are formed on the liquid crystal side faces of the first and second substrates and control the alignment direction of the liquid crystal molecules when no voltage is applied to be roughly vertical from the substrate face, wherein said alignment control layers are formed by polymerizing a polymerizable compound that has remained as a monomer after the selective irradiation of active energy rays, and wherein said liquid crystal also includes a polymerization initiator that has an absorption length longer than 300 nm.

* * * * *

UNITED STATES PATENT AND TRADEMARK OFFICE
CERTIFICATE OF CORRECTION

| | | |
|---|---|---|
| PATENT NO. | : 7,910,924 B2 | Page 1 of 1 |
| APPLICATION NO. | : 11/712695 | |
| DATED | : March 22, 2011 | |
| INVENTOR(S) | : Sasabayashi et al. | |

It is certified that error appears in the above-identified patent and that said Letters Patent is hereby corrected as shown below:

Col. 39, lines 29-30    Correct the spelling of "polymeizable" to --polymerizable--.

Signed and Sealed this
Twenty-eighth Day of June, 2011

David J. Kappos
*Director of the United States Patent and Trademark Office*